Figure 1:
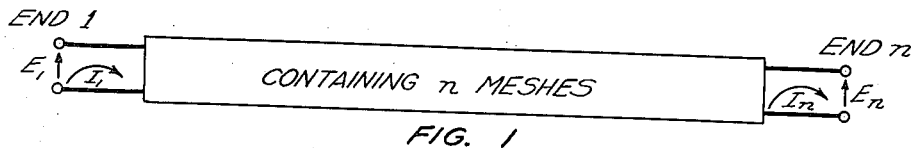

Jan. 12, 1937.   C. M:SON GEWERTZ   2,067,444
ELECTRICAL NETWORK
Filed May 5, 1932   11 Sheets-Sheet 1

INVENTOR
CHARLES M:SON GEWERTZ
PER
ATTORNEY

Jan. 12, 1937.  C. M:SON GEWERTZ  2,067,444
ELECTRICAL NETWORK
Filed May 5, 1932  11 Sheets-Sheet 2

INVENTOR
CHARLES M:SON GEWERTZ
PER
ATTORNEY

Jan. 12, 1937.  C. M:SON GEWERTZ  2,067,444
ELECTRICAL NETWORK
Filed May 5, 1932  11 Sheets-Sheet 3

INVENTOR
CHARLES M:SON GEWERTZ
PER
ATTORNEY

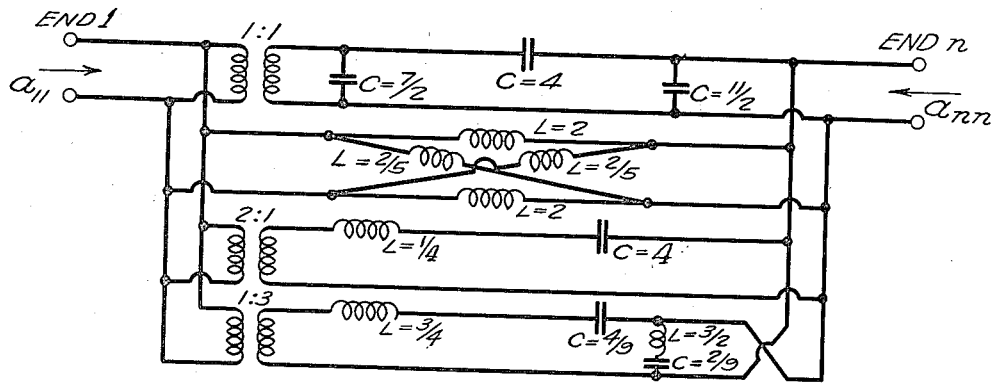
FIG. 20
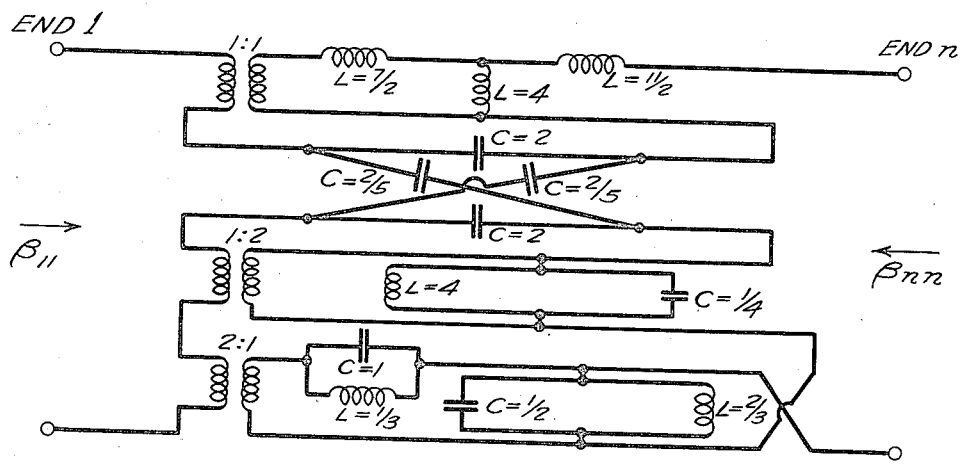
FIG. 21
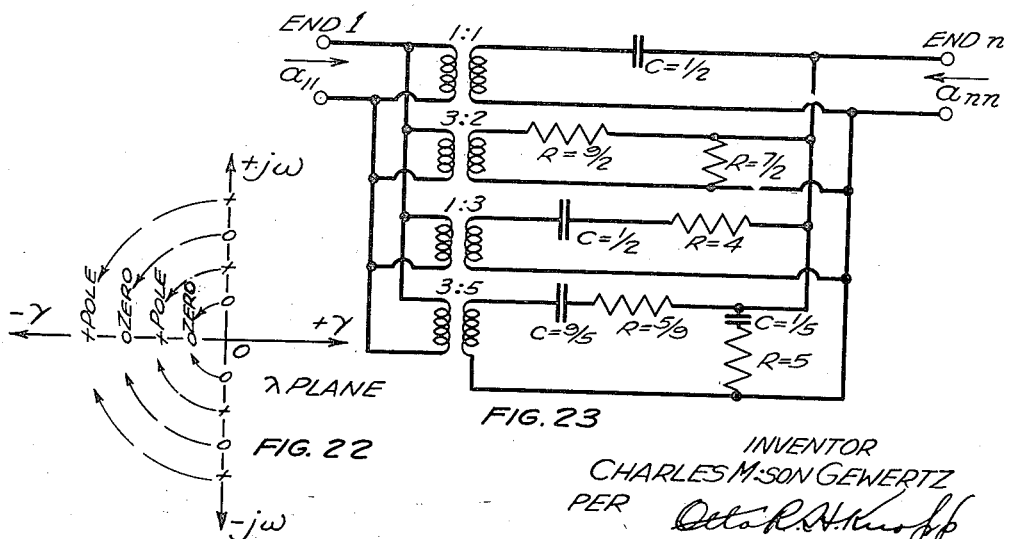
FIG. 22
FIG. 23

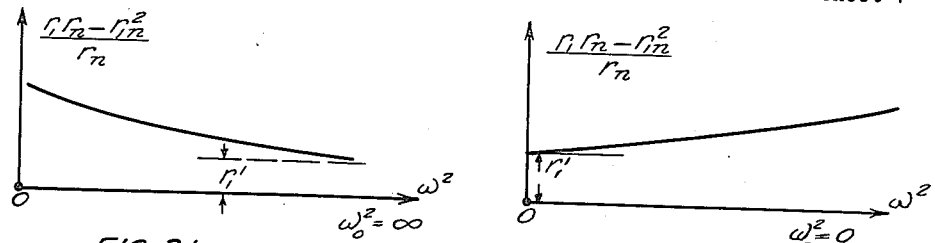
FIG. 31
FIG. 32
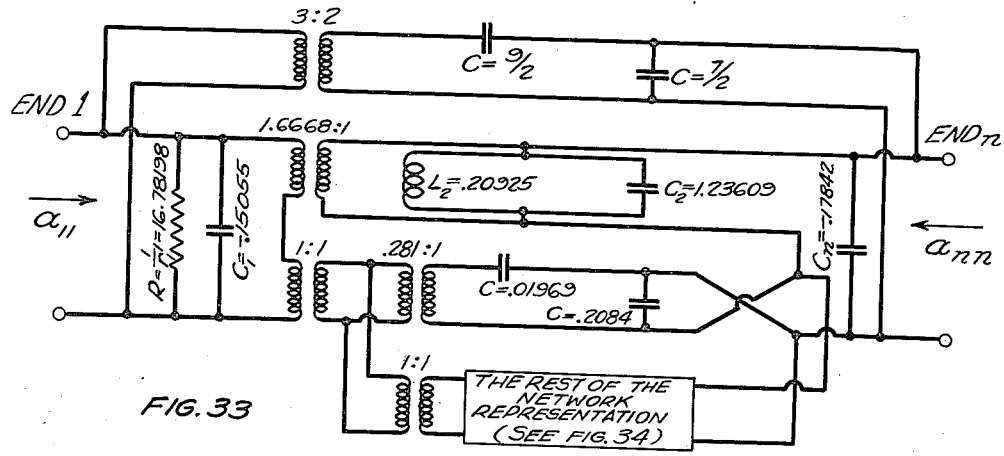
FIG. 33
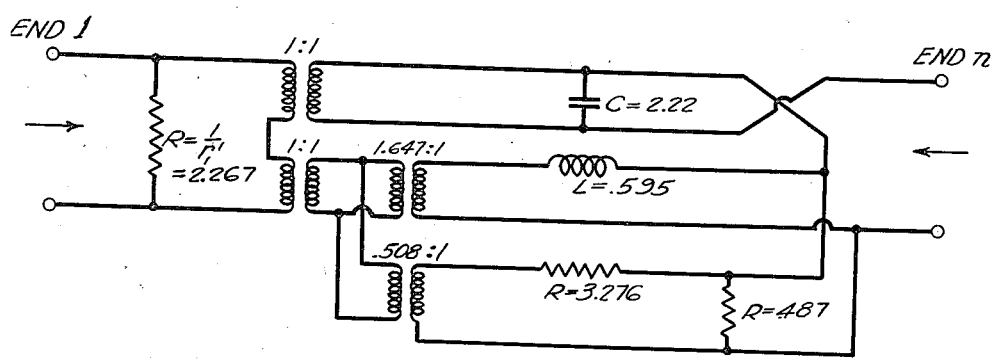
FIG. 34

Jan. 12, 1937.  C. M:SON GEWERTZ  2,067,444
ELECTRICAL NETWORK
Filed May 5, 1932   11 Sheets-Sheet 8

INVENTOR
CHARLES M:SON GEWERTZ
PER
ATTORNEY

Jan. 12, 1937.  C. M:SON GEWERTZ  2,067,444
ELECTRICAL NETWORK
Filed May 5, 1932  11 Sheets-Sheet 9

INVENTOR
CHARLES M:SON GEWERTZ
PER  *Otto R. Knopf*
ATTORNEY

Jan. 12, 1937.  C. M:SON GEWERTZ  2,067,444
ELECTRICAL NETWORK
Filed May 5, 1932    11 Sheets-Sheet 10

INVENTOR
CHARLES M:SON GEWERTZ
PER
ATTORNEY

Patented Jan. 12, 1937

2,067,444

UNITED STATES PATENT OFFICE 2,067,444

ELECTRICAL NETWORK

Charles M:son Gewertz, Cambridge, Mass.

Application May 5, 1932, Serial No. 609,429

51 Claims. (Cl. 178—44)

The present invention relates to electrical networks and more particularly to four-terminal networks having certain prescribed characteristics.

The principal object of the present invention is to provide a finite, purely reactive or dissipative, electrical four-terminal network whose two short-circuit driving-point admittances and short-circuit transfer admittance—or—two open-circuit driving-point impedances and open-circuit transfer impedance are prescribed functions of frequency.

Such a network, which has been wanted for a long period of time, is applicable to the solution of numerous problems arising in the field of electrical communication engineering and naturally it is also applicable to power engineering, where one single frequency is considered.

It may, for example, be required to join together two systems of communication circuits each having definite admittances (or impedances) by means of a four-terminal network having preassigned driving point admittances (or impedances) and transfer admittance (or impedance) in order to improve the desired electrical properties of the circuit in some way and secure the most desirable operation of the circuit as a whole.

On the other hand, it may be required to change the alternating current admittance (or impedance) of a system, in which case a four-terminal network having preassigned admittances (or impedances) may have to be connected in parallel or series—(or perhaps in chain connection) with it, etc.

Further, it may be desired to design a finite four-terminal network equivalent to a transmission line.

A four-terminal network may be used as a two-terminal network and in such a case the same network offers four driving-point admittances (impedances),—two for short circuit and two for open-circuit at the opposite end.

If the two short-circuit driving-point admittances (impedances), say, are prescribed, then we can readily select the short-circuit transfer admittance such that the necessary and sufficient conditions, to be stated in the following, are met with, whereupon we can apply one of my general methods of realization and build the network.

When used as a two-terminal network, a four-terminal network obtained from prescribed driving-point admittance or impedance functions can be used for solving the three general types of problems stated by T. C. Fry in his U. S. Patent 1,570,215, page 1, dealing with a two-terminal electrical network having preassigned driving-point impedance-function.

The three types of problems referred to are:

(1) The design of a balancing network employed, for example, in two-way repeater circuits.

(2) The design of a network having a prescribed driving-point impedance such that when two component parts of a circuit are adapted to one another the electrical properties of the circuit as a whole are improved; for instance, the reflection losses are decreased.

(3) The design of a network having such properties that it can be used for correcting for the distortion which a signal may experience when transmitted through a given system due to the unavoidable addition of appropriate apparatus at the sending or the receiving end. Here we need a network having such a prescribed impedance that the output current of the distorting system when connected to this impedance will be of the same wave form as the input E. M. F. of the system.

It will be apparent that there are also many other types of problems (for instance, related to relay circuits) to which my networks are applicable, but these need not be discussed here.

The networks according to the present invention have numerous advantages over the networks heretofore available. Practically all known methods in designing corrective and selective networks are based on continuous approximation methods and in order to get a satisfactory result more and more sections have to be added. The network obtained by applying my general methods is, however, in all cases an exact realization of the prescribed functions. It contains, furthermore, a finite number of meshes and elements.

I describe below three general methods of synthesizing four-terminal networks. Method I gives networks containing only two kinds of network elements plus necessary transformers and is claimed in my copending application Serial No. 609,428. Methods II and III on the other hand give networks which ordinarily contain all three kinds of network elements, i. e., inductance, capacitance and resistance plus necessary transformers. The networks obtained by methods I and III are all passive. With method II negative reactance elements may be introduced. In all cases, however, the network appears to contain the minimum number of elements for the prescribed conditions.

Further, it is only necessary to find the three short-circuit admittances or the three open-circuit impedances from the propagation function, generated from its amplitude frequency characteristic, and two characteristic impedances, whereupon my general methods can always be applied for the design of corrective (amplitude corrective or phase corrective networks or possibly networks which make both corrections simultaneously) and selective (electric filter networks) networks of any kind.

In practice the propagation curve and two characteristic impedances may be prescribed, in which case the first step would be to find an $\omega$-function (where $\omega$ is $=2\pi$ times frequency) as a quotient of two integral polynomials fitting this curve and then, as indicated above, this function may generate the propagation function itself, whereupon, after that the corresponding three short-circuit admittances or three open-circuit impedances are found, a four-terminal network having such properties that it "answers" in a prescribed manner to an applied E. M. F. of any frequency can then be designed by the aid of my general methods.

Having the three short-circuit admittances or the three open-circuit impedances given, my general methods of design furnish a possibility to go straight to the point and a compact finite four-terminal network, which embodies the preassigned requirements directly and mathematically exactly, is obtained.

Figure 2:
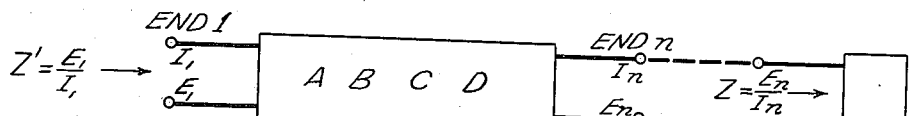
Figure 4:
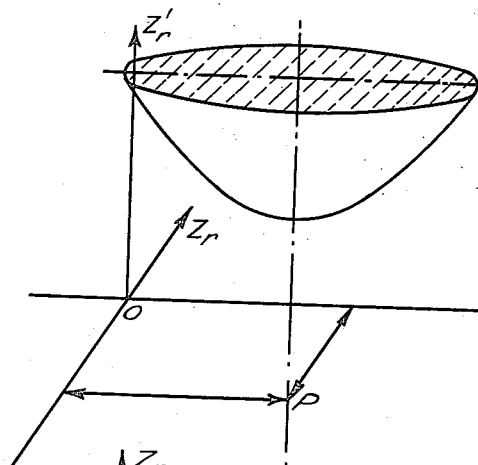
Figure 4:
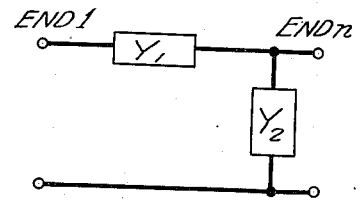
Figure 3:
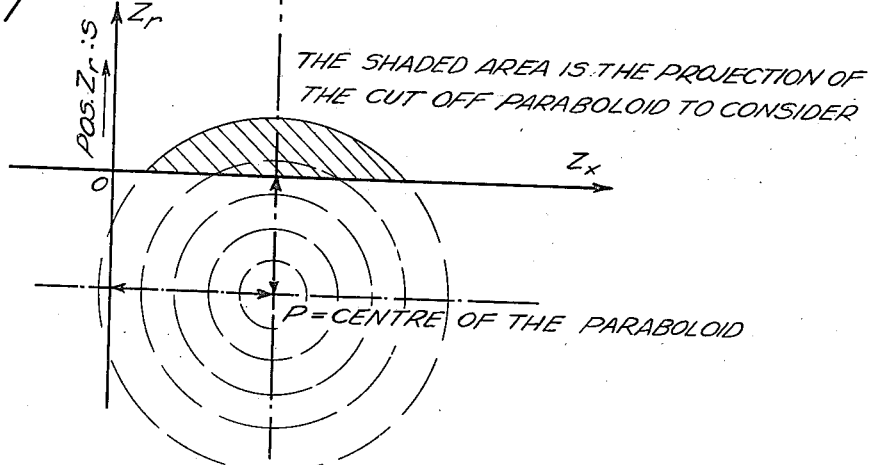
Figure 5:
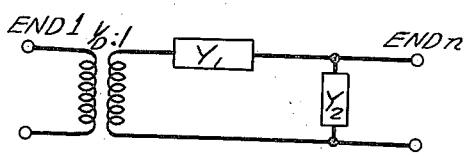
Figure 6:
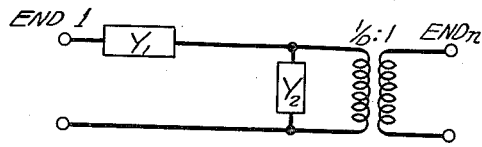
Figure 7:
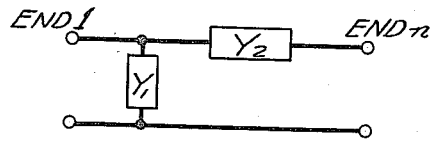
Figure 8:
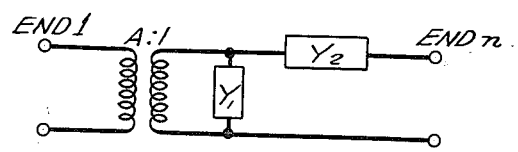
Figure 9:
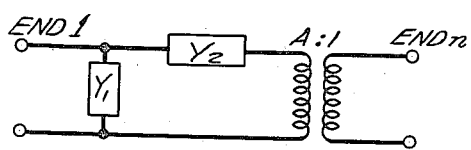
Figure 10:
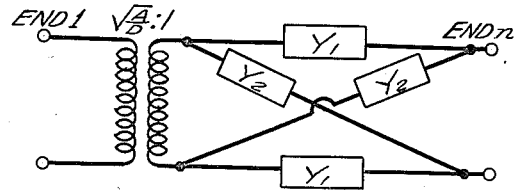
Figure 11:
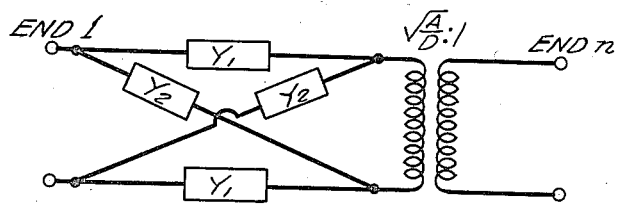
Figure 12:
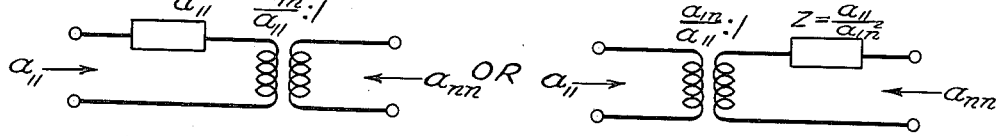
Figure 13:
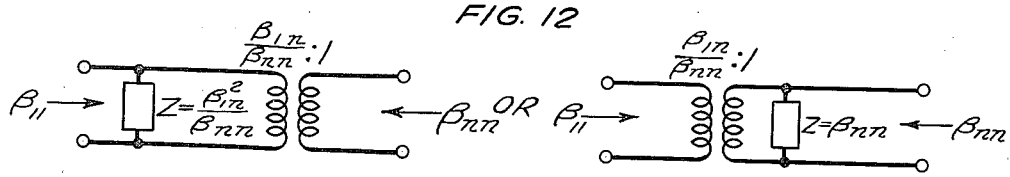
Figure 14:
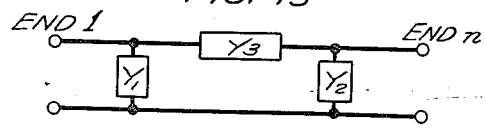
Figure 15:
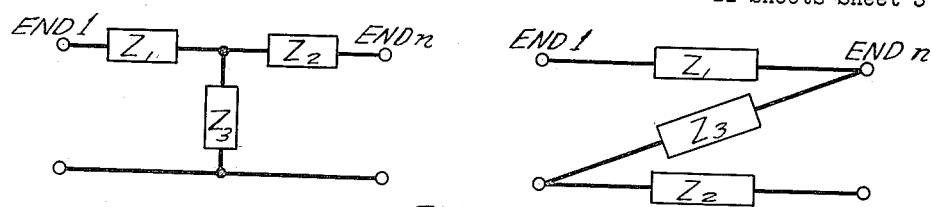
Figure 16:
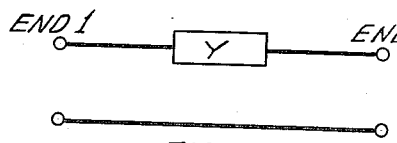
Figure 17:
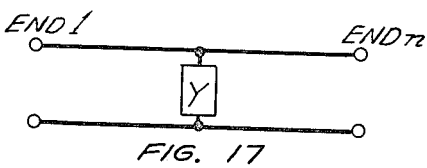
Figure 18:
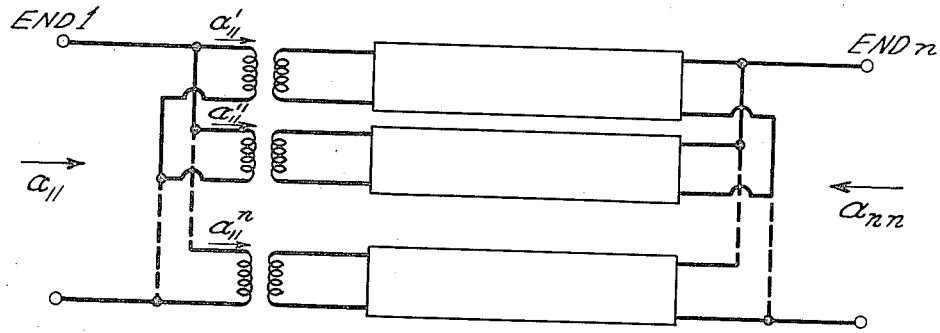
Figure 19:
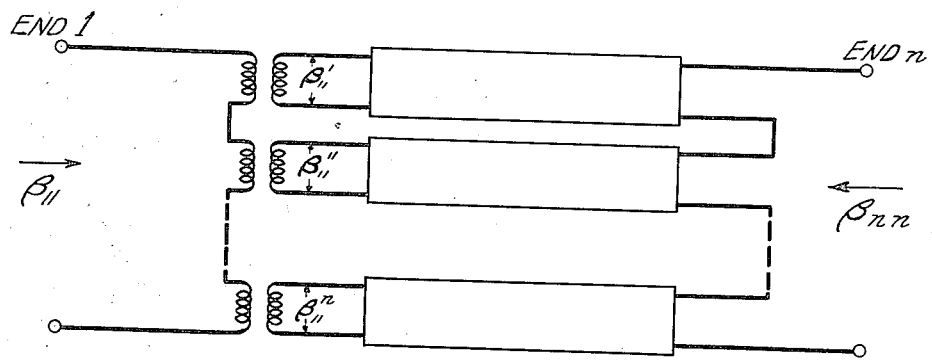
Figure 24:
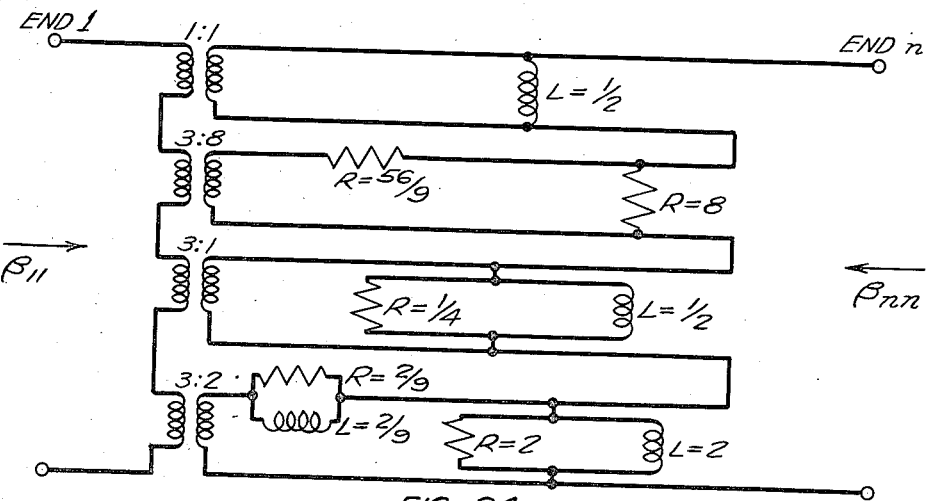
Figure 25:
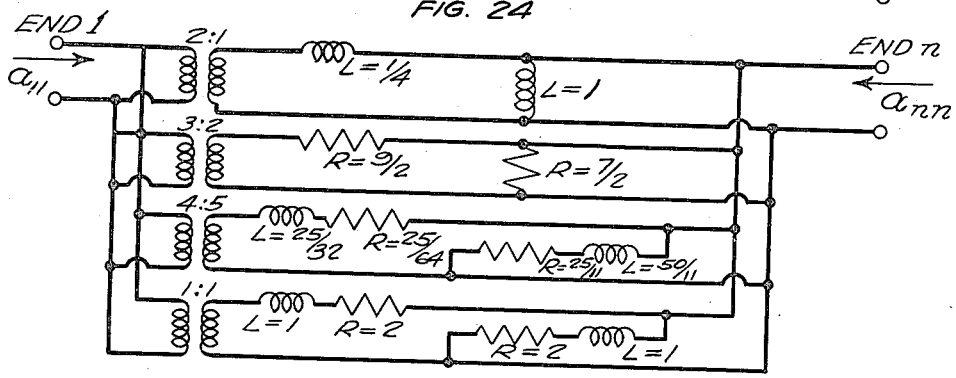

Further details of my invention may be obtained from the following detailed description and the accompanying drawings, in which Fig. 1 represents a finite passive four-terminal network containing $n$ meshes; Fig. 2 represents a four-terminal network terminated in a passive two-terminal network; Fig. 3 is a graph of the equation representing the real part of the impedance $Z'$ of the network of Fig. 2; Fig. 4 represents a component network termed an L-structure; Fig. 5 represents a four-terminal component network comprising a transformer and an L-structure; Fig. 6 represents a four-terminal component network comprising an L-structure and a transformer; Fig. 7 represents a component L-structure network; Fig. 8 represents a four-terminal component network comprising a transformer and an L-structure; Fig. 9 represents a four-terminal component network comprising an L-structure and a transformer; Fig. 10 represents a four-terminal component network comprising a transformer and a lattice structure; Fig. 11 represents a four-terminal component network comprising a lattice structure and a transformer; Figs. 12 and 13 represent further component networks having transformers; Fig. 14 shows a $\Pi$-structure component network; Fig. 15 represents a T-structure component network; Fig. 16 represents a component network whose short-circuit driving-point and transfer admittances are all equal; Fig. 17 represents a component network whose open-circuit driving-point and transfer impedances are all equal; Fig. 18 is a general representation of a four-terminal network comprising a plurality of component four-terminal networks in parallel; Fig. 19 is a general representation of a four-terminal network comprising a plurality of component four-terminal networks in series; Figs. 20, 21, 23, 24, 25 and 26 illustrate realizations of numerical examples, according to Method I; Fig. 22 is a diagram indicating a transformation of the location of the zeros and poles of a prescribed function.

Figure 27:
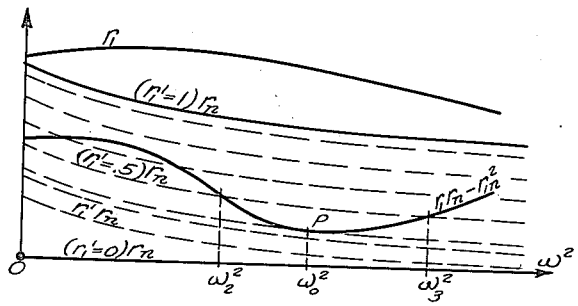
Figure 28:
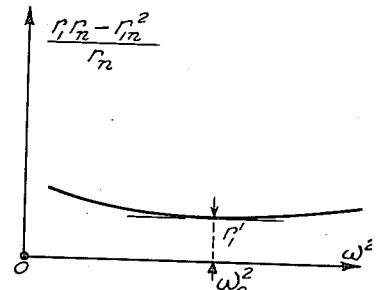
Figure 29:
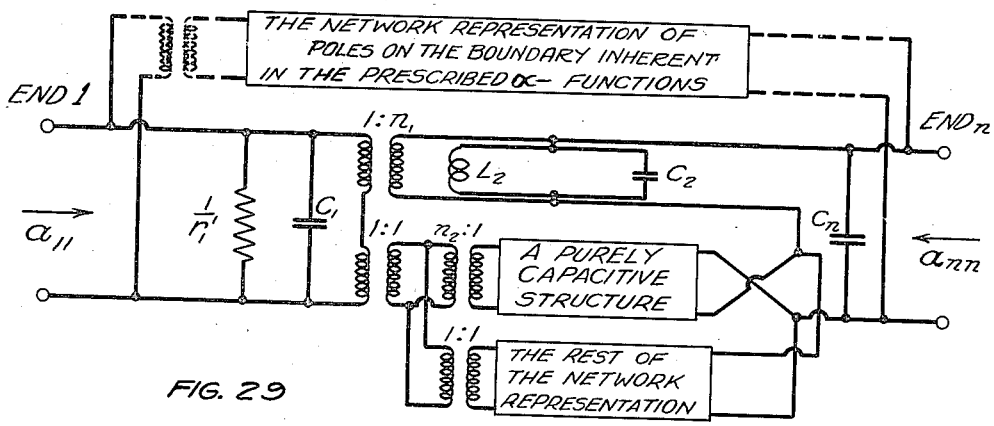
Figure 30:
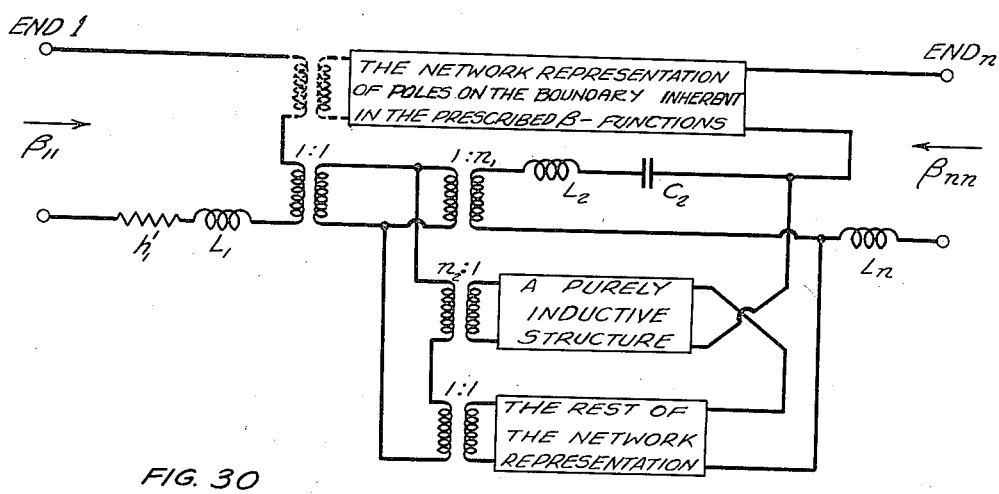
Figure 41:
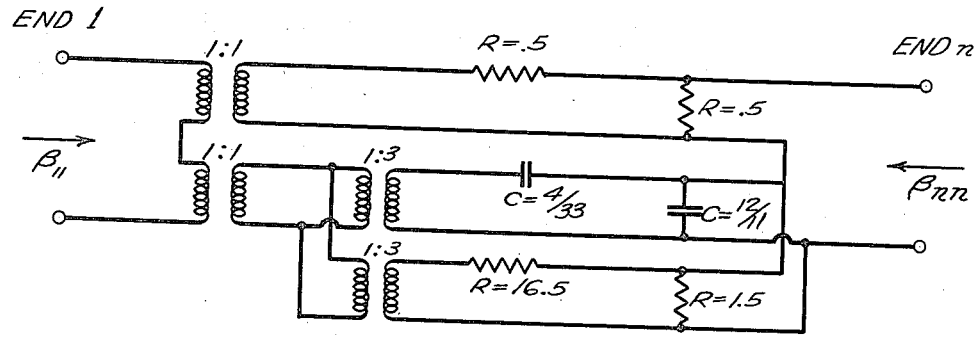
Figure 42:
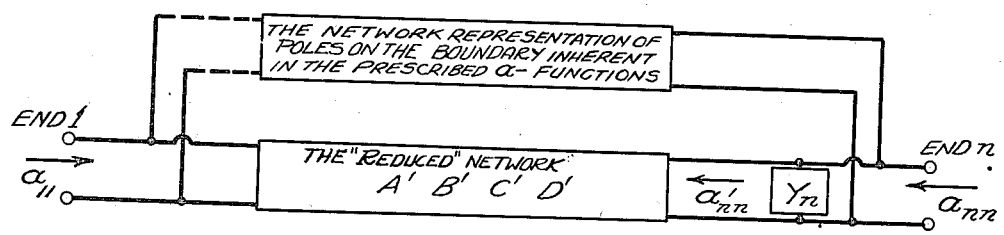
Figure 43:
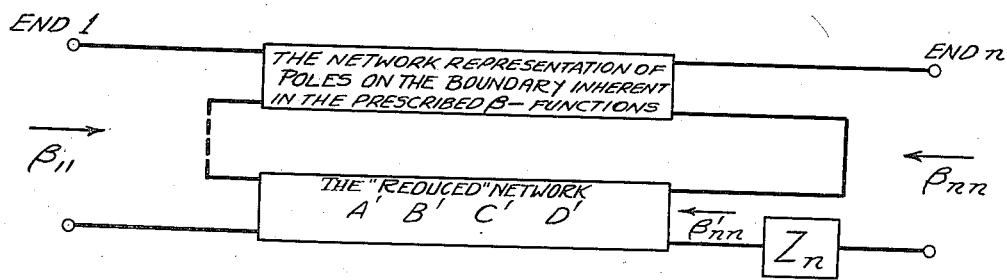
Figure 44:
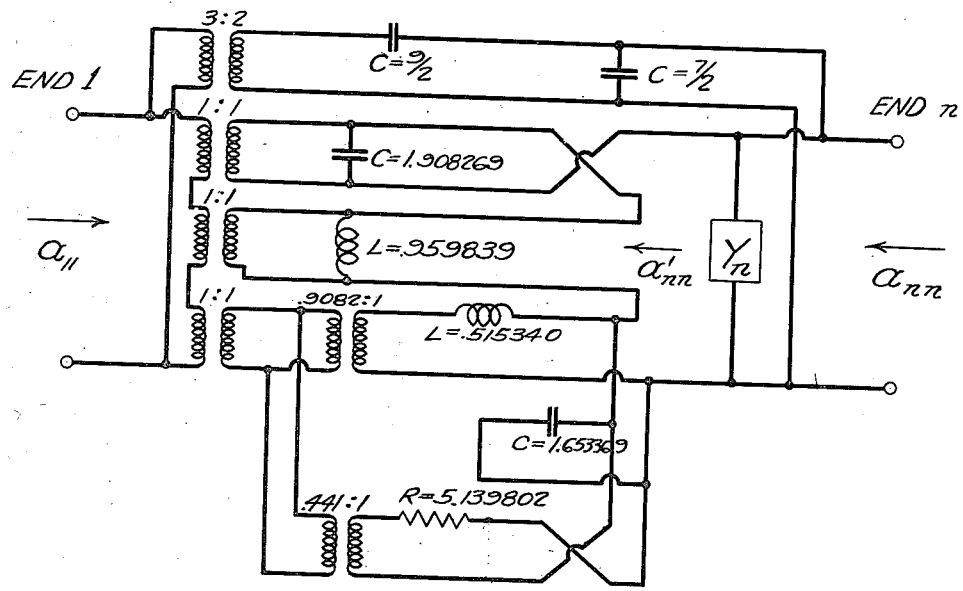
Figure 45:
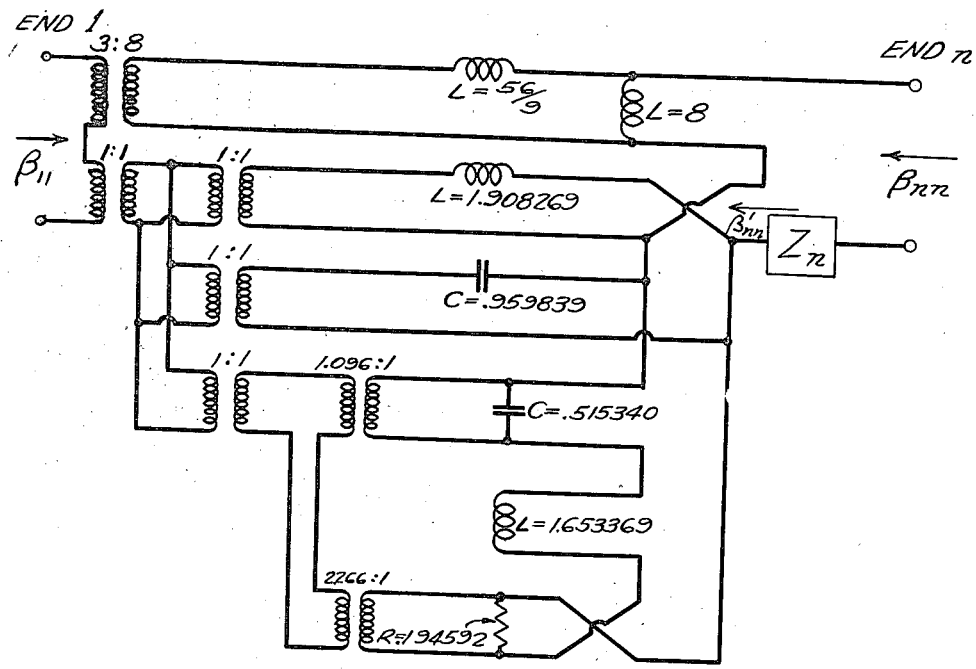
Figure 46:
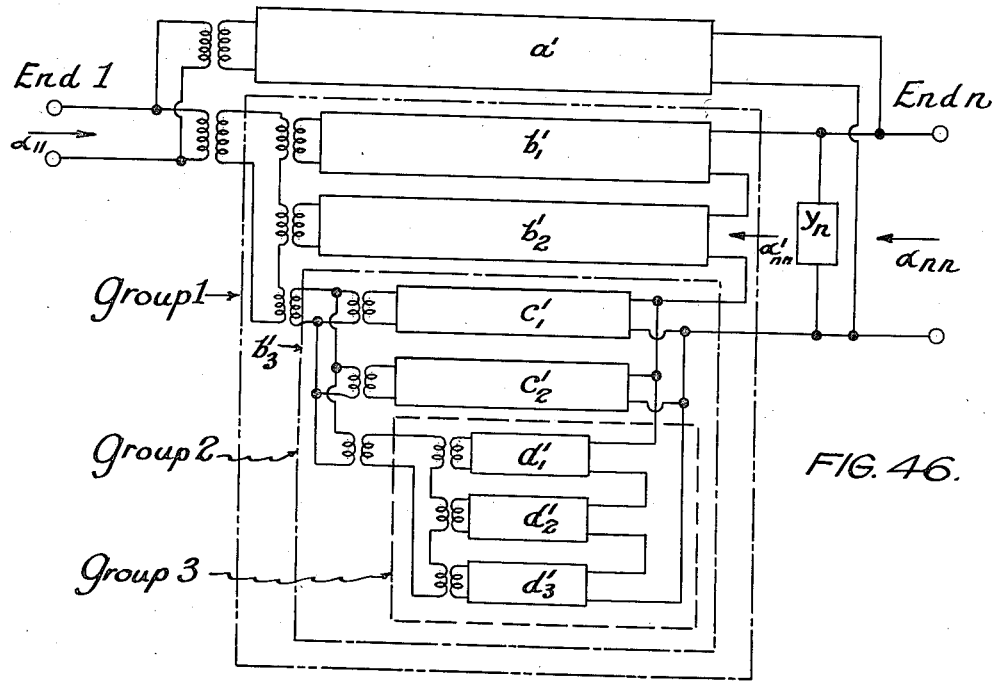
Figure 47:
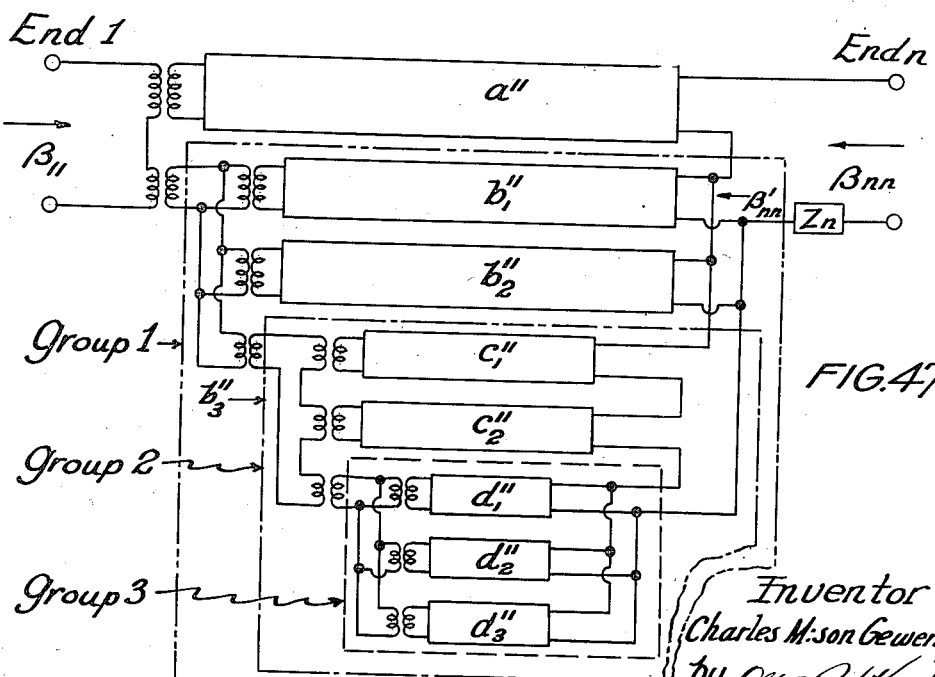

Figs. 27, 28, 31, 32, 37, 38 and 40 are graphs of some of the functions employed in Method II; Figs. 29 and 30 illustrate realizations according to Method II; Figs. 33, 34, 35 and 36 illustrate realizations of numerical examples according to Method II; Fig. 39 is a network representation of $\beta$-functions realizable into a structure having only two kinds of elements, according to Method II; Fig. 41 is an equivalent network to that of Fig. 39; Figs. 42 and 43 are general representations of networks obtained by Method III; Figs. 44 and 45 are network representations of numerical examples, when applying Method III. Fig. 46 is a schematic network representation in accordance with the invention designed from admittance functions. Fig. 47 is a similar schematic network representation designed from impedance functions.

*Methods of design*

The following sections give methods for the design of component networks as well as how to find the total network representation of the total prescribed functions.

Suppose we have a passive four-terminal network containing $n$ meshes, as indicated in Fig. 1. Assume the applied voltages at the respective ends to be sinusoidal, of the form $E\epsilon^{j\omega t}$. Then, as the currents must be of the same form, i. e. $I\epsilon^{j\omega t}$ the well-known Kirchhoff's equations for said network are:

$$\left.\begin{array}{l}z_{11}I_1+z_{12}I_2+z_{13}I_3+\ \ldots\ +z_{1n}I_n=E_1\\ z_{21}I_1+z_{22}I_2+z_{23}I_2+\ \ldots\ +z_{2n}I_n=0\\ z_{31}I_1+\ \ldots\ \ldots\ \ldots\ \ldots\ \ldots\ \ldots\ =0\\ \ldots\ \ldots\ \ldots\ \ldots\ \ldots\ \ldots\ \ldots\ \ldots\ \ldots\ \ldots\\ z_{n1}I_1+z_{n2}I_2+z_{n3}I_3+\ \ldots\ +z_{nn}I_n=-E_n\end{array}\right\} \quad (1)$$

where:

$$z_{rs}=z_{sr}=R_{sr}+L_{sr}p+\frac{S_{sr}}{p};\quad \left(S_{sr}=\frac{1}{C_{sr}}\right)$$

R, L and C are the three kinds of network elements i. e., capacitance, inductance and resistance, $$p=\frac{d}{dt}$$

$\omega=2\pi$ times the frequency.

Letting D be the determinant of the $z$:s, i. e.

$$D=\begin{vmatrix}z_{11}z_{12}\ \ldots\ z_{1n}\\ z_{21}z_{22}\ \ldots\ \ldots\ \\ \ldots\ \ldots\ \ldots\ \ldots\\ z_{n1}z_{n2}\ \ldots\ z_{nn}\end{vmatrix}$$

and $M_{sr}$ be the corresponding minor of the $s^{th}$ row and the $r^{th}$ column, i. e. for instance:

$$M_{11}=\begin{vmatrix}z_{22}z_{23}\ \cdot\cdot\ z_{2n}\\ z_{32}z_{33}\ \cdot\cdot\cdot\cdot\\ \ldots\ \ldots\ \ldots\ \ldots\\ z_{n2}z_{n3}\ \cdot\cdot\ z_{nn}\end{vmatrix}(-1)^{1+1}$$

then, when solving for the currents in the 1st and $n^{th}$ mesh, being the only ones which interest us, we get, by the aid of Cramer's rule:

$$\left.\begin{array}{l}I_1=\dfrac{M_{11}}{D}E_1+0+0+\ \ldots\ -\dfrac{M_{n1}}{D}E_n\\ \\ I_n=\dfrac{M_{1n}}{D}E_1+0+0+\ \ldots\ -\dfrac{M_{nn}}{D}E_n\end{array}\right\} \quad (2)$$

For short-circuit at the respective ends the corresponding voltages become zero and when writing Equations (2) as $$\left.\begin{array}{l}I_1=\alpha_{11}E_1-\alpha_{1n}E_n\\ I_n=\alpha_{1n}E_1-\alpha_{nn}E_n\end{array}\right\} \quad (3)$$

and knowing that, when dealing with quantities obtained at end $n$, either the sign of the two end currents or of the two end voltages have to be reversed, and then we see that:

$$\alpha_{11} = \frac{M_{11}}{D} = \frac{I_1}{E_1}$$

is the short-circuit driving-point admittance at end 1.

$$\alpha_{nn} = \frac{M_{nn}}{D} = \frac{I_n}{E_n}$$

is the short-circuit driving-point admittance at end $n$, and $$\alpha_{1n} = \frac{M_{n1}}{D} = \frac{M_{1n}}{D} = \frac{I_1}{E_n} = \frac{I_n}{E_1}$$

is the short-circuit transfer admittance between the two ends.

When solving for the two voltages contained in (3) we get:

$$\left. \begin{array}{l} E_1 = \frac{\alpha_{nn}}{\alpha_{11}\alpha_{nn} - \alpha_{1n}^2} I_1 - \frac{\alpha_{1n}}{\alpha_{11}\alpha_{nn} - \alpha_{1n}^2} I_n \\ E_n = \frac{\alpha_{1n}}{\alpha_{11}\alpha_{nn} - \alpha_{1n}^2} I_1 - \frac{\alpha_{11}}{\alpha_{11}\alpha_{nn} - \alpha_{1n}^2} I_n \end{array} \right\} \quad (4)$$

For open-circuit at the respective ends the corresponding currents become zero, and when writing (4) as:

$$\left. \begin{array}{l} E_1 = \beta_{11} I_1 - \beta_{1n} I_n \\ E_n = \beta_{1n} I_1 - \beta_{nn} I_n \end{array} \right\} \quad (5)$$

and applying the sign rule, then we see that:

$$\beta_{11} = \frac{E_1}{I_1}$$

is the open-circuit driving-point impedance at end 1.

$$\beta_{nn} = \frac{E_n}{I_n}$$

is the open-circuit driving-point impedance at end $n$.

$$\beta_{1n} = \frac{E_1}{I_n} = \frac{E_n}{I_1}$$

is the open-circuit transfer impedance between the two ends.

Again, solving for the two currents contained in (5), we get:

$$\left. \begin{array}{l} I_1 = \frac{\beta_{nn}}{\beta_{11}\beta_{nn} - \beta_{1n}^2} E_1 - \frac{\beta_{1n}}{\beta_{11}\beta_{nn} - \beta_{1n}^2} E_n \\ I_n = \frac{\beta_{1n}}{\beta_{11}\beta_{nn} - \beta_{1n}^2} E_1 - \frac{\beta_{11}}{\beta_{11}\beta_{nn} - \beta_{1n}^2} E_n \end{array} \right\} \quad (6)$$

i. e. we are back to (3).

Consequently, between the $\alpha{:}s$ and the $\beta{:}s$ the following relations hold:

$$\left. \begin{array}{l} \alpha_{11} = \frac{\beta_{nn}}{\beta_{11}\beta_{nn} - \beta_{1n}^2} \\ \alpha_{nn} = \frac{\beta_{11}}{\beta_{11}\beta_{nn} - \beta_{1n}^2} \\ \alpha_{1n} = \frac{\beta_{1n}}{\beta_{11}\beta_{nn} - \beta_{1n}^2} \end{array} \right\} \quad (7)$$

and:

$$\left. \begin{array}{l} \beta_{11} = \frac{\alpha_{nn}}{\alpha_{11}\alpha_{nn} - \alpha_{1n}^2} \\ \beta_{nn} = \frac{\alpha_{11}}{\alpha_{11}\alpha_{nn} - \alpha_{1n}^2} \\ \beta_{1n} = \frac{\alpha_{1n}}{\alpha_{11}\alpha_{nn} - \alpha_{1n}^2} \end{array} \right\} \quad (8)$$

Equations (7) and (8) reveal the interesting fact that generally the $\alpha{:}s$ and $\beta{:}s$, from a purely mathematical point of view, simply are elements of two non-singular inverse square matrices the product of which is equal to the unit matrix, often called idemfactor.

The prescribed matrix may be singular, however, in which case Equations (7) and (8) do not apply, but also in this case the situation can readily be handled and the singular matrix can be realized (see Charles M:son Gewertz, "Network Synthesis", The Williams and Wilkins Co., Baltimore, Md., pp. 186-193).

The four general circuit "constants", which in our case will be called the four general circuit parameters because they, when referring to a four-terminal communication network, are not constants but functions of frequency, are usually defined by the equations:

$$\left. \begin{array}{l} E_1 = A E_n + B I_n \\ I_1 = C E_n + D I_n \end{array} \right\} \quad (9)$$

On the other hand, when solving for $E_1$ and $I_1$ from Equation (3) we get:

$$\left. \begin{array}{l} E_1 = \frac{\alpha_{nn}}{\alpha_{1n}} E_n + \frac{1}{\alpha_{1n}} I_n \\ I_1 = \frac{\alpha_{11}\alpha_{nn} - \alpha_{1n}^2}{\alpha_{1n}} E_n + \frac{\alpha_{11}}{\alpha_{1n}} I_n \end{array} \right\} \quad (10)$$

and when solving for the same voltage and current from (5), we get:

$$\left. \begin{array}{l} E_1 = \frac{\beta_{11}}{\beta_{1n}} E_n + \frac{\beta_{11}\beta_{nn} - \beta_{1n}^2}{\beta_{1n}} I_n \\ I_1 = \frac{1}{\beta_{1n}} E_n + \frac{\beta_{nn}}{\beta_{1n}} I_n \end{array} \right\} \quad (11)$$

Comparing Equations (10) and (11) with (9), we have:

$$\left. \begin{array}{l} A = \frac{\alpha_{nn}}{\alpha_{1n}} = \frac{\beta_{11}}{\beta_{1n}} \\ B = \frac{1}{\alpha_{1n}} = \frac{\beta_{11}\beta_{nn} - \beta_{1n}^2}{\beta_{1n}} \\ C = \frac{\alpha_{11}\alpha_{nn} - \alpha_{1n}^2}{\alpha_{1n}} = \frac{1}{\beta_{1n}} \\ D = \frac{\alpha_{11}}{\alpha_{1n}} = \frac{\beta_{nn}}{\beta_{1n}} \end{array} \right\} \quad (12)$$

Using the quotients of the $\alpha{:}s$ (say) in (12) and forming $AD-BC$, we get:

$$\frac{\alpha_{nn}\alpha_{11}}{\alpha_{1n}\alpha_{1n}} - \frac{\alpha_{11}\alpha_{nn} - \alpha_{1n}^2}{\alpha_{1n}\alpha_{1n}}$$

which is equal to $+1$, i. e. between the general circuit parameters the relation:

$$AD - BC = 1 \quad (13)$$

holds.

Further, when forming the product $AD$ in two different ways, we get:

$$\frac{\alpha_{nn}\beta_{nn}}{\alpha_{1n}\beta_{1n}} = \frac{\alpha_{11}\beta_{11}}{\alpha_{1n}\beta_{1n}}$$

i. e.

$$\alpha_{11}\beta_{11} = \alpha_{nn}\beta_{nn} \quad (14)$$

Consequently, the products of the short-circuit driving-point admittance and the open-circuit driving-point impedance at the respective ends of a four-terminal network are equal.

It was stated that each one of the $\alpha{:}s$ and $\beta{:}s$, because they characterize a four-terminal network having a finite number of meshes, must be prescribed as a rational fraction, as shown below:

$$\left. \begin{array}{l} \alpha_{11} = \frac{g_1(\lambda)}{h(\lambda)} \\ \alpha_{nn} = \frac{g_n(\lambda)}{h(\lambda)} \\ \alpha_{1n} = \frac{g_{1n}(\lambda)}{h(\lambda)} \end{array} \right\} \quad (15)$$

where the $g_{(\lambda)}:s$ and $h_{(\lambda)}:s$ are rational integral polynomials in $\lambda$ and the variable $\lambda=\gamma+j\omega$ refers to the complex plane; $\lambda$ being equal to $2\pi$ times frequency.

Then, when comparing (15) and (8), we see that the $\beta:s$ fulfill the same requirement.

Each one of the $\alpha:s$ and $\beta:s$ must further be real, for real $\lambda$-values, which is the same as saying that for $\omega=0$ the response vector must be in phase with the impulse vector and both vectors must have the same direction.

Regarding the location of zeros and poles of the driving-point functions, it is known, and can readily be proved by the aid of the law of conservation of energy, that they all must lie in the left half of the complex plane, including the boundary (=the imaginary axis).

As to the transfer function ($\alpha_{1n}$ or $\beta_{1n}$, respectively), its poles are generally the same as those of the driving-point functions.

Its zeros, however, are found to make an exception as to their location, and it can be proved that they can lie at any point of the $\lambda$-plane without violating the law of conservation of energy.

From (7) and (8) it is clear that the zeros and poles of the $\alpha$- and $\beta$-determinants must lie within the same region as those of the driving-point functions.

Then we come to the question of positiveness of the real parts of the $\alpha:s$ and $\beta:s$ and the determinant of the real parts of either set of functions.

The real part of a driving-point function must necessarily be greater than or equal to zero for $\gamma$ greater than or equal to zero, as proved by O. Brune in his article in the Journal of Mathematics and Physics vol. X No. 3, 1931, p. 191.

As to the transfer function it should be understood that it has no physical meaning in terms of energy flow since it is equal to the quotient of the input voltage and the output current, or vice versa. Thus, its real part is allowed to take on positive as well as negative values, though the amplitudes of these values are limited by a determinant condition to be shown below.

This determinant condition is obtained in the following manner:

Terminate the four-terminal network in a passive two-terminal network, whose impedance is $Z=Z_r+jZ_x$, as shown in Fig. 2, and consider the whole right half of the $\lambda$-plane.

Form the ratio $$\frac{E_1}{I_1}$$

from (10), getting:

$$Z'=Z_r'+jZ_x'=\frac{\alpha_{nn}Z+1}{(\alpha_{11}\alpha_{nn}-\alpha_{1n}^2)Z+\alpha_{11}} \quad (16)$$

Split up the $\alpha:s$ as:

$$\left.\begin{array}{l}\alpha_{11}=r_1+jx_1\\ \alpha_{nn}=r_n+jx_n\\ \alpha_{1n}=r_{1n}+jx_{1n}\end{array}\right\} \quad (17)$$

Substitute (17) into (16) and solve for the real part ($Z'_r$), getting:

$$Z'_r=\frac{(Z_r^2+Z_x^2)[(r_1r_n-r_{1n}^2)r_n+r_nx_{1n}^2+r_1x_n^2-2x_nr_{1n}x_{1n}]+}{[Z_r(r_1r_n-r_{1n}^2-x_1x_n+x_{1n}^2)-Z_x(r_1x_n+r_nx_1-2r_{1n}x_{1n})+r_1]^2+}$$
$$\frac{Z_r(2r_1r_n-r_{1n}^2+x_{1n}^2)+Z_x(2r_{1n}x_{1n}-2r_1x_n)+r_1}{[Z_r(r_1x_n+r_nx_1-2r_{1n}x_{1n})+Z_x(r_1r_n-r_{1n}^2-x_1x_n+x_{1n}^2)+x_1]^2} \quad (18)$$

The denominator is a sum of two squares and as in the numerator each one of the two squares $Z_r^2$ and $Z_x^2$ have the same coefficient it is clear that (18) represents the equation of a paraboloid of revolution. Because in addition the $r:s$ and $x:s$ are functions of $\gamma$ and $\omega$ the paraboloid changes its location above and in respect to the $Z_r$–$Z_x$-plane with the values of the variables, at the same time as its parameter varies.

It is not correct, however, to require its vertex to stay above the $Z_r$–$Z_x$-plane, i. e. to require the distance between its vertex and said plane to be greater than or equal to zero, for all real values of $\gamma \geq \lambda\ 0$ and all real values of $\omega$, because this restriction need to hold only for $Z_r$-values which are greater than or equal to zero, and it can be proved that the axis of the paraboloid never crosses the $Z_x$-axis, but projects through the $Z_r$–$Z_x$-plane only at negative or zero values of $Z_r$.

Taking these facts into account, i. e. considering only that part of the paraboloid whose projection corresponds to positive or zero values of $Z_r$, as indicated in Fig. 3, then it can be shown that an important necessary condition, always to be satisfied if the designed network is to be passive, is that for all real $\omega:s$ the determinant $(r_1r_n-r_{1n}^2)$ must be greater than or equal to zero for real values of $\gamma$ greater than or equal to zero, i. e.

$$(r_1r_n-r_{1n}^2)\geq 0, \text{ for } \gamma \geq 0 \quad (19)$$

If we split up the $\beta:s$ as follows:

$$\left.\begin{array}{l}\beta_{11}=h_1+jv_1\\ \beta_{nn}=h_n+jv_n\\ \beta_{1n}=h_{1n}+jv_{1n}\end{array}\right\} \quad (20)$$

then in an analogous manner it can be proved that for all real $\omega:s$ the determinant:

$$(h_1h_n-h_{1n}^2) \text{ must be } \geq 0, \text{ for } \gamma \geq 0 \quad (21)$$

Further, it can be proved that when the condition (19) is satisfied for all real $\omega:s$, then the condition (21) is necessarily also satisfied, and vice versa. In addition, it can also be proved that if $r_1$, $r_n$ and $(r_1r_n-r_{1n}^2)$ are each $\geq 0$, for $\gamma \geq 0$ and all real $\omega:s$, then $h_1$ and $h_n$ are each also $\geq 0$, for $\gamma \geq 0$, and if $h_1$, $h_n$ and $(h_1h_n-h_{1n}^2)$ are each $\geq 0$, for $\gamma \geq 0$ and all real $\omega:s$, then $r_1$ and $r_n$ are each also $\geq 0$, for $\gamma \geq 0$.

In the foregoing we have been dealing with the whole right half of the $\lambda$ plane and all mentioned positiveness conditions refer to that region. As none of the $\alpha:s$ or $\beta:s$ have poles to the right of the boundary, however, it is clear that each one of the functions is regular in the right half of the $\lambda$-plane. Consequently, in this region the functions fulfill the well known Cauchy's line-integral requirements making it possible for us to limit our efforts to the boundary (the imaginary axis and corresponding to $\gamma=0$) only.

Further, all the potential functions (being the real and imaginary part of each $\alpha$ and $\beta$), as well as the determinant of these parts fulfill in the right half of the $\lambda$-plane the well known Poisson's line integral requirements which means that the minimum—(as well as the maximum)— value of these functions must fall on the boundary, thus making it necessary to investigate them there only.

It has to be remembered, however, that poles of any one of the $\alpha:s$ or $\beta:s$ may also fall on the boundary. When this happens the functions have to be given special attention close to such points, because such poles do not show up in the real part along the boundary of the corresponding λ-function.

Thus, it is stated by Brune in his article, referred to above, that if a driving-point function has poles on the boundary, then such poles must be simple and the residue of the function at such a pole must be a positive, real, constant.

This necessity is found when expanding the λ-function between two concentric circles around and infinitesimally close to the pole into a Laurent's series and solving for the real part.

All three α- or β-functions can readily be expanded in an analogous manner and when then solving for the real parts and applying the determinant conditions (19) or (21), respectively, then we reach the important necessary condition, applicable for a common pole on the boundary, saying that the determinant:

$$(k_1 k_n - k_{1n}^2) \text{ must be real and } \geq 0 \quad (22)$$

where $k_1$, $k_n$ and $k_{1n}$ are the residues of $\alpha_{11}$, $\alpha_{nn}$ and $\alpha_{1n}$ or of $\beta_{11}$, $\beta_{nn}$ and $\beta_{1n}$, respectively, at the pole in question.

As to zeros on the boundary, it is known that such zeros of a driving-point function must be simple and that the differential coefficient of the function at the point in question must be a positive, real, non-zero constant. This condition is arrived at by expanding the function inside a small circle, surrounding the zero, into a Taylor's series and solving for the real part.

When expanding all three $\alpha:s$ or $\beta:s$ in the same manner and applying (19) or (21), respectively, we then reach the necessary condition saying that the determinant:

$$(q_1 q_n - q_{1n}^2) \text{ must be real and } \geq 0 \quad (23)$$

where $q_1$, $q_n$ and $q_{1n}$ are the differential coefficients of the $\alpha:s$ or $\beta:s$ at the zero in question.

The necessary conditions referring to zeros on the boundary are not of fundamental importance, however, because they are automatically satisfied, when the conditions summarized in the following are satisfied.

*Definition*

The process of synthesizing a finite passive four-terminal network from a prescribed matrix whose elements are the short-circuit admittances or open-circuit impedances is, in analogy with Brune's notation when dealing with a single function, called "finding a network representation" of the matrix.

*Definition*

If a function $f_{(\lambda)}$ is real when λ is real, and if in addition the real part of $f_{(\lambda)}$ is $\geq 0$, for $\gamma \geq 0$, then such a function is after, Brune, called a "positive real" function. Brune also proved (see his article referred to) that such a function always can be given a network representation.

*Definition*

Let three functions $$f_{11(\lambda)} f_{nn(\lambda)} \text{ and } f_{1n(\lambda)},$$

each being real when λ is real, be elements of the symmetrical square matrix;

$$\left\| \begin{array}{c} f_{11(\lambda)} f_{1n(\lambda)} \\ f_{1n(\lambda)} f_{nn(\lambda)} \end{array} \right\|$$

If in this matrix the two elements which are located on the principal diagonal have such a property that the real part of each is $\geq 0$, for $\lambda \geq 0$ and if in addition:

$$\text{Re } f_{11(\lambda)} \times \text{Re } f_{nn(\lambda)} - [\text{Re } f_{1n(\lambda)}]^2 \text{ is } \geq 0, \text{ for } \gamma \geq 0$$

(where Re stands for "The real part of"), then such a matrix is called a "positive real" matrix.

The $f_{(\lambda)}:s$ may stand for either the $\alpha:s$ or the $\beta:s$, having corresponding subscripts, and when considering the boundary, a "positive real" matrix is also defined by:

(I) No poles of the prescribed functions lie to the right of the imaginary axis in the λ-plane.

(II) At poles on the imaginary axis residues of $f_{11(\lambda)}$ and $f_{nn(\lambda)}$ are finite, positive, real constants.

(III) The determinant of the residues ($k_1$, $k_n$ and $k_{1n}$) at a common pole on the imaginary axis, i. e. ($k_1 k_n - k_{1n}^2$) is a real constant and $\geq 0$.

(IV) Re $f_{11(j\omega)} \geq 0$ and Re $f_{nn(j\omega)} \geq 0$, for all real values of ω.

(V) Re $f_{11(j\omega)} \times$ Re $f_{nn(j\omega)} - [\text{Re } f_{1n(j\omega)}]^2 \geq 0$, for all real values of ω.

Naturally, the $f_{(\lambda)}:s$ must on the first hand fulfill the requirement of being real for real values of λ.

*Methods of realizing certain "positive real" matrices*

When a set of prescribed $\alpha:s$ or $\beta:s$ fulfil the requirements of being elements of a "positive real" matrix, in which the elements located on the principal diagonal are the two driving-point functions, then I have found that such a matrix can always be given a physical interpretation in a passive four-terminal network.

Below we shall show how to realize a "positive real" α- or β-matrix, having the specific feature that a constant ratio exists between certain or all of its elements. The network representations of such matrices will play an important rôle as component networks in the total network representation of the total functions.

In the event that the prescribed functions happen initially to be elements of such a matrix, they fall under the items below directly.

(a) Let us first consider the case when the ratio between $\alpha_{11}$ and $\alpha_{1n}$ (correspondingly, the ratio between $\beta_{nn}$ and $\beta_{1n}$) is a finite, real constant (positive or negative).

From (12) it is clear that this ratio is simply the general circuit parameter D, and when considering the $\alpha:s$ (say) we see that in this case the prescribed functions are:

$$\alpha_{11}, \alpha_{nn} \text{ and } \frac{\alpha_{11}}{D}$$

Suppose the prescribed functions fulfil the requirements of being elements of a "positive real" matrix corresponding to a matrix whose elements are the general circuit parameters ABCD. This latter matrix can then be split up as:

$$\left\|\begin{array}{cc} A & B \\ C & D \end{array}\right\| = \left\|\begin{array}{cc} \frac{1}{D} & 0 \\ 0 & D \end{array}\right\| \times \left\|\begin{array}{cc} DA & BD \\ \frac{C}{D} & 1 \end{array}\right\| = \left\|\begin{array}{cc} DA & \frac{B}{D} \\ CD & 1 \end{array}\right\| \times \left\|\begin{array}{cc} \frac{1}{D} & 0 \\ 0 & D \end{array}\right\| \quad (24)$$

⟵—Alternative I—⟶    ⟵—Alternative II—⟶

All component matrices of (24) we recognize immediately. The products evidently consist of a transformer matrix and a matrix specifying the L-structure shown in Fig. 4, and vice versa, for the two alternatives.

As to positiveness of the real parts, we know that:

$$\left. \begin{array}{c} r_1 \geq 0, \text{ for } \gamma \geq 0 \\ r_n \geq 0, \text{ for } \gamma \geq 0 \\ \left(r_1 r_n - \frac{r_1^2}{D^2}\right) = \frac{r_1}{D^2}(D^2 r_n - r_1) \geq 0, \text{ for } \gamma \geq 0 \end{array} \right\} \quad (25)$$

*Alternative I*

Adding a prime to the α:s which correspond to the L-structure, they are by the aid of (12) and (24) found to be:

$$\left. \begin{array}{c} \alpha_{11}' = \alpha_{1n}' = \frac{1}{BD} = \frac{\alpha_{11}}{D^2} \\ \alpha_{nn}' = \frac{AD}{BD} = \frac{A}{B} = \alpha_{nn} \end{array} \right\} \quad (26)$$

Consequently, we see that $\text{Re}\alpha_{11}'$ and $\text{Re}\alpha_{nn}'$ are each $\geq 0$, for $\gamma \geq 0$.

The determinant becomes:

$$\left(\frac{r_1}{D^2} r_n - \frac{r_1^2}{D^4}\right) = \frac{r_1}{D^4}(D^2 r_n - r_1)$$

which also is $\geq 0$, for $\gamma \geq 0$, because each part of the determinant of (25) is $\geq 0$, for $\gamma \geq 0$.

Thus, the L-structure is passive and we get the passive combination shown in Fig. 5. The admittances of this structure (the Y:s) expressed in the general circuit parameters are simply:

$$\left. \begin{array}{c} Y_1 = \frac{1}{BD} \\ Y_2 = \frac{C}{D} \end{array} \right\} \quad (27)$$

*Alternative II*

Letting the α:s, referring to the L-structure, in this case be α":s we get:

$$\left. \begin{array}{c} \alpha_{11}'' = \alpha_{1n}'' = \frac{D}{B} = \alpha_{1n} D = \alpha_{11} \\ \alpha_{nn}'' = \frac{D^2 A}{B} = D^2 \alpha_{nn} \end{array} \right\} \quad (28)$$

Thus, $\text{Re}\alpha_{11}''$ and $\text{Re}\alpha_{nn}''$ are each $\geq 0$, for $\gamma \geq 0$.

The determinant which in this case becomes:

$$(r_1 D^2 r_n - r_1^2) = r_1(D^2 r_n - r_1)$$

is also $\geq 0$, for $\gamma \geq 0$, due to (25).

Thus, we get the passive structure shown in Fig. 6, and the Y:s are simply:

$$\left. \begin{array}{c} Y_1 = \frac{D}{B} \\ Y_2 = CD \end{array} \right\} \quad (29)$$

The reality clause is fulfilled, and due to the above two alternatives we can state:

If a non-singular "positive real" α- or β-matrix is such that the general circuit parameter D, obtained from this matrix, is a finite, real (positive or negative; if negative we only transpose one pair of terminals or wind the transformer as to take care of the negative sign) constant, then this particular matrix satisfied both necessary and sufficient conditions for having a network representation in either one of the structures shown in Fig. 5 or 6.

Should, however, this parameter be unity, then the network representation of the corresponding matrix is shown in Fig. 4.

(b) Let us now consider the case when the ratio between $\alpha_{nn}$ and $\alpha_{1n}$ (correspondingly, the ratio between $\beta_{11}$ and $\beta_{1n}$) is a finite, real constant (positive or negative).

From (12) we see that this ratio simply is the general circuit parameter A, and thus in this case the prescribed functions are:

$$\alpha_{11}, \alpha_{nn} \text{ and } \frac{\alpha_{nn}}{A}$$

having the real parts:

$$r_1, r_n \text{ and } \frac{r_n}{A}$$

As these functions are elements of a "positive real" matrix we know that:

$$\left. \begin{array}{c} r_1 \geq 0, \text{ for } \gamma \geq 0 \\ r_n \geq 0, \text{ for } \gamma \geq 0 \\ \left(r_1 r_n - \frac{r_n^2}{A^2}\right) = \frac{r_n}{A^2}(A^2 r_1 - r_n) \geq 0, \text{ for } \gamma \geq 0 \end{array} \right\} \quad (30)$$

The corresponding matrix having as elements the general circuit parameters we in this case split up as:

$$\left\| \begin{array}{cc} A & B \\ C & D \end{array} \right\| = \left\| \begin{array}{cc} A & 0 \\ 0 & \frac{1}{A} \end{array} \right\| \times \left\| \begin{array}{cc} 1 & \frac{B}{A} \\ CA & DA \end{array} \right\| = \left\| \begin{array}{cc} 1 & AB \\ \frac{C}{A} & DA \end{array} \right\| \times \left\| \begin{array}{cc} A & 0 \\ 0 & \frac{1}{A} \end{array} \right\| \quad (31)$$

←Alternative I→     ←Alternative II→

The matrices of Alternative I evidently characterize the structure shown in Figure 8 while the matrices of Alternative II characterize the structure shown in Figure 9.

We then proceed in an analogous manner as in the previous case, and get:

*Alternative I*

$$\left. \begin{array}{c} \alpha_{11}' = \frac{A^2 D}{B} = A^2 \alpha_{11} \\ \alpha_{nn}'' = \alpha_{1n}' = \frac{A}{B} = \alpha_{nn} \end{array} \right\} \quad (32)$$

Thus, $\text{Re}\alpha_{11}'$ and $\text{Re}\alpha_{nn}'$ are each $\geq 0$, for $\gamma \geq 0$, and the determinant:

$$(A^2 r_1 r_n - r_n^2) = r_n(A^2 r_1 - r_n) \text{ is also } \geq 0, \text{ for } \gamma \geq 0, \text{ due to (30).}$$

Consequently, we get the passive combination shown in Fig. 8, and the Y:s are simply:

$$\left. \begin{array}{c} Y_1 = AC \\ Y_2 = \frac{A}{B} \end{array} \right\} \quad (33)$$

*Alternative II*

Here we have:

$$\left. \begin{array}{c} \alpha_{11}'' = \frac{AD}{AB} = \frac{D}{B} = \alpha_{11} \\ \alpha_{nn}'' = \alpha_{1n}'' = \frac{1}{AB} = \frac{\alpha_{nn}}{A^2} \end{array} \right\} \quad (34)$$

Thus, $\text{Re}\alpha_{11}''$ and $\text{Re}\alpha_{nn}''$ are each $\geq 0$, for $\gamma \geq 0$, and the determinant:

$$\left(\frac{r_1}{A^2} r_n - \frac{r_n^2}{A^4}\right) = \frac{r_n}{A^4}(A^2 r_1 - r_n)$$

is also $\geq 0$, for $\gamma \geq 0$, due to (30).

Consequently, we get the passive combination shown in Fig. 9, and the Y:s are simply:

$$\left. \begin{array}{c} Y_1 = \frac{C}{A} \\ Y_2 = \frac{1}{AB} \end{array} \right\} \quad (35)$$

The reality clause is fulfilled and thus we can state:

If a non-singular "positive real" α- or β-matrix is such that the general circuit parameter A, to be obtained from this matrix, is a finite, real constant, then this specific matrix satisfies both necessary and sufficient conditions for having a network representation in either one of the structures shown in Fig. 8 or 9—with the structure shown in Fig. 7 as a special case, corresponding to unity ratio between the functions dealt with.

(c) Now we proceed to the case when in a "positive real" $\alpha$- or $\beta$-matrix the two elements located on its principal diagonal bear to each other a finite real constant ratio. In this case we split up our matrix as:

$$\left\|\begin{matrix}A & B \\ C & D\end{matrix}\right\| = \left\|\begin{matrix}\sqrt{\frac{A}{D}} & 0 \\ 0 & \sqrt{\frac{D}{A}}\end{matrix}\right\| \times \left\|\begin{matrix}\sqrt{AD} & B\sqrt{\frac{D}{A}} \\ C\sqrt{\frac{A}{D}} & \sqrt{AD}\end{matrix}\right\| =$$

←—Alternative I—→

$$= \left\|\begin{matrix}\sqrt{AD} & B\sqrt{\frac{A}{D}} \\ C\sqrt{\frac{D}{A}} & \sqrt{AD}\end{matrix}\right\| \times \left\|\begin{matrix}\sqrt{\frac{A}{D}} & 0 \\ 0 & \sqrt{\frac{D}{A}}\end{matrix}\right\| \quad (36)$$

←—Alternative II—→

The product matrices evidently specify a transformer and a symmetrical lattice structure, and vice versa.

The given $\alpha{:}s$ (say) are in this case:

$$\alpha_{11}, \frac{A}{D}\alpha_{11} \text{ and } \alpha_{1n}$$

i. e. their real parts are $$r_1, \frac{A}{D}r_1 \text{ and } r_{1n}$$

We know that:

$$\left.\begin{matrix}r_1 \geq 0, \text{ for } \gamma \geq 0 \\ \frac{A}{D}r_1 \geq 0, \text{ for } \gamma \geq 0 \\ \left(\frac{A}{D}r_1^2 - r_{1n}^2\right) \geq 0, \text{ for } \gamma \geq 0\end{matrix}\right\} \quad (37)$$

*Alternative I*

Adding a prime to the $\alpha{:}s$ corresponding to the lattice structure matrix, then these are found to be:

$$\left.\begin{matrix}\alpha_{11}' = \alpha_{nn}' = \alpha_{1n}'\sqrt{AD} = \frac{A}{B} = \alpha_{nn} = \frac{A}{D}\alpha_{11} \\ \alpha_{1n}' = \sqrt{\frac{A}{D}}\alpha_{1n}\end{matrix}\right\} \quad (38)$$

Thus, we see that $\text{Re}\alpha_{11}' = \text{Re}\alpha_{nn}'$ is $\geq 0$, for $\gamma \geq 0$.
The determinant, which in this case becomes:

$$\left(\frac{A^2}{D^2}r_1^2 - \frac{A}{D}r_{1n}^2\right) = \frac{A}{D}\left(\frac{A}{D}r_1^2 - r_{1n}^2\right)$$

is, due to (36), evidently also $\geq 0$, for $\gamma \geq 0$.

Thus, we get as network-representation the passive combination shown in Fig. 10 and the $Y{:}s$ when expressed in the general circuit parameters, are simply:

$$\left.\begin{matrix}Y_1 = \frac{1}{B}\left(A - \sqrt{\frac{A}{D}}\right) \\ Y_2 = \frac{1}{B}\left(A + \sqrt{\frac{A}{D}}\right)\end{matrix}\right\} \quad (39)$$

*Alternative II*

Let the $\alpha{:}s$ corresponding to the lattice structure matrix in this case be $\alpha''{:}s$, and we get:

$$\left.\begin{matrix}\alpha_{11}'' = \alpha_{nn}'' = \alpha_{1n}''\sqrt{AD} = \frac{D}{B} = \alpha_{11} \\ \alpha_{1n}'' = \frac{1}{B}\sqrt{\frac{D}{A}} = \sqrt{\frac{D}{A}}\alpha_{1n}\end{matrix}\right\} \quad (40)$$

Thus $\text{Re}\alpha_{11}'' = \alpha_{nn}'' \geq 0$, for $\gamma \geq 0$.
The determinant, which here becomes:

$$\left(r_1^2 - \frac{D}{A}r_{1n}^2\right) = \frac{D}{A}\left(\frac{A}{D}r_1^2 - r_{1n}^2\right)$$

is, due to (36), also $\geq 0$, for $\gamma \geq 0$.

Consequently, we get the passive combination shown in Fig. 11 and the $Y{:}s$ expressed in the general circuit parameters, are:

$$\left.\begin{matrix}Y_1 = \frac{1}{B}\left(D - \sqrt{\frac{D}{A}}\right) \\ Y_2 = \frac{1}{B}\left(D + \sqrt{\frac{D}{A}}\right)\end{matrix}\right\} \quad (41)$$

The reality clause is fulfilled, and thus we can state:

If a non-singular "positive real" $\alpha$- or $\beta$-matrix is such that the ratio between the two elements which are located on its principal diagonal, corresponding to the ratio between the general circuit parameters A and D, is a finite, real constant, then this particular matrix satisfies both necessary and sufficient conditions for having a network representation in either one of the structures shown in Fig. 10 or 11. When said ratio is unity the lattice-structure alone is a network representation of the matrix considered.

(d) Finally, we take up the case when a "positive real" matrix is such that a constant ratio exists between any two of the three functions.

This is the case we continuously meet when applying my general methods of realization, because when removing sets of poles from the boundary, by the aid of a partial fraction expansion, any two members of the separate component families form always a constant ratio.

The simplest structure to use for this case is either one of the structures shown in Fig. 5, 6, 8 or 9.

If, in addition, the matrix is singular the above four structures, when considering the $\alpha{:}s$ (in which case the general circuit parameter C is zero), reduce to either one of the structures shown in Fig. 12, and when considering the $\beta{:}s$ (i. e. the general circuit parameter B is zero), they reduce to either one of the structures shown in Fig. 13.

It is evident that because functions under this item also fall under items (a), (b) and (c) any one of the structures arrived at under these items can be used as a network representation. Further, item (c) evidently falls in between items (a) and (b).

Considering Alternative II only and letting the transformer ratio $$\frac{1}{D}:1$$

as in Fig. 6 gradually become A:1 as in Fig. 9, then it can be found that for every transformer ratio, $n{:}1$, between the above mentioned limits we get simple passive structures, while for $n{:}s$ lying outside the range $$\frac{1}{D}$$

to A generally two transformers in chain connection are coming into play and when merged together the ratio is again found to lie in between the above values. Thus, it is evident that the structures of Figs. 6 and 9 form the limits for an infinite number of equivalent networks, wherefore we can state:

If a non-singular "positive real" $\alpha$- or $\beta$-matrix is such that any two of the three functions bear to each other finite, real, constant ratios, then this matrix satisfies both necessary and sufficient conditions for having a network representation in any one of an infinite number of equivalent structures, with those shown in Figs. 5 and 8 or 6 and 9, repectively, as limiting cases.

At least two more structures are of great importance for realization of certain "positive real" matrices or component families whose members are elements of such a matrix. The structures referred to are the Π- and the T-(Z) structures.

(e) The Π-structure, shown in Fig. 14, can be said to "belong" to the $\alpha:s$ because when expressing the $Y:s$ in the $\alpha:s$ it becomes immediately clear for which range of functions this structure can be used as a network representation, while when expressed in the $\beta:s$ we get equations which we cannot look through, and vice versa as to the T-structure.

The $\alpha:s$ of the Π-structure in Fig. 14 are:

$$\begin{aligned}\alpha_{11} &= Y_1 + Y_3 \\ \alpha_{nn} &= Y_2 + Y_3 \\ \alpha_{1n} &= Y_3 \end{aligned} \quad (42)$$

i. e.

$$\begin{aligned} Y_1 &= \alpha_{11} - \alpha_{1n} = (r_1 - r_{1n}) + j(x_1 - x_{1n}) \\ Y_2 &= \alpha_{nn} - \alpha_{1n} = (r_n - r_{1n}) + j(x_n - x_{1n}) \\ Y_3 &= \alpha_{1n} = r_{1n} + jx_{1n} \end{aligned} \quad (43)$$

Thus, we see that if a non-singular "positive real" $\alpha$-matrix is such that the differences $(\alpha_{11}-\alpha_{1n})$ and $(\alpha_{nn}-\alpha_{1n})$ are "positive real" functions and if in addition $\alpha_{1n}$ is a "positive real" function itself, then this particular matrix satisfies both necessary and sufficient conditions for having a network representation in a Π-structure.

(f) The T-structure, shown in Fig. 15, covers an exactly analogous range when considering the $\beta:s$. The $Z:s$ (which all have to be "positive real" functions) of this structure are readily found to be as follows:

$$\begin{aligned} Z_1 &= \beta_{11} - \beta_{1n} = (h_1 - h_{1n}) + j(v_1 - v_{1n}) \\ Z_2 &= \beta_{nn} - \beta_{1n} = (h_n - h_{1n}) + j(v_n - v_{1n}) \\ Z_3 &= \beta_{1n} = h_{1n} + jv_{1n} \end{aligned} \quad (44)$$

Thus, if a non-singular "positive real" $\beta$-matrix is such that the differences $(\beta_{11}-\beta_{1n})$ and $(\beta_{nn}-\beta_{1n})$ are "positive real" functions and if in addition $\beta_{1n}$ is a "positive real" function itself, then this particular matrix satisfies both necessary and sufficient conditions for having a network representation in a T-(Z) structure.

(g) Note, the Π- and T-structures as well as the two L-structures are composed of the two structures shown in Figs. 16 and 17. The former "belongs" to the $\alpha:s$ (it can not even be defined by the aid of the $\beta:s$) and is defined by the general circuit parameter matrix:

$$\left\| \begin{matrix} 1 & \frac{1}{Y} \\ 0 & 1 \end{matrix} \right\|$$

while the latter "belongs" to the $\beta:s$ in an analogous strict manner and is defined by the general circuit parameter matrix:

$$\left\| \begin{matrix} 1 & 0 \\ Y & 1 \end{matrix} \right\|$$

*Standard connection diagrams for the addition of the network representations of several "positive real component $\alpha$- or $\beta$-matrices*

Besides being confronted with such "positive real" $\alpha$- or $\beta$-matrices which can be realized in a single step into one of the structures considered we may meet a "positive real" matrix which cannot be realized in this simple manner but its elements have to be split up into several components, and while each component family may separately be realized into a known structure we need to know in addition how to connect these structures into a unit forming a total network representation of the total functions.

When considering a sum of $\alpha$-families the diagram of connections would essentially be as shown in Fig. 18, with the separate component networks connected in parallel, since they are realizations of admittance functions, and when considering a sum of $\beta$-families the diagram is essentially given by Fig. 19, with the separate component networks connected in series, since they are realizations of impedance functions.

The transformers shown at one end are included in order to force the entering and leaving currents of each component structure to be equal. For a symmetrical lattice component structure usually its transformer may be omitted, however.

The insertion of a 1:1 ratio transformer may also be omitted when being part of an unsymmetrical component structure if the entering and leaving currents in the component structure in question are equal without the transformer.

On the other hand, where the transformer ratio is different from 1:1 the transformer cannot be omitted.

Further, it cannot be omitted if therewith some part of the network representation would be shorted out, as illustrated in some of the examples in the following.

Where transformers are used, it is obvious that the transformer may be placed at either end of the component structure of which it is a part.

*I. General methods of realization of any "positive real" $\alpha$- or $\beta$-matrix having such properties, that it can characterize a passive four-terminal network having two kinds of elements only*

(a) We now have material enough for a complete solution of the above specific cases and start with the one when the prescribed matrix is found to have a network-representation in a purely reactive four-terminal network.

In his Reactance-Theorem (B. S. T. J. 1924 vol. 3, p. 259) Foster showed that every scalar function $f_{(\lambda)}$ can be considered as being the impedance function of a passive purely reactive two-terminal network, provided all zeros and poles lie on the imaginary axis in the $\lambda$-plane and there separate each other, i. e. alternate. Such a function or its reciprocal can always be expanded into partial fractions and each term can be given a physical interpretation, whereupon these are joined together in a proper way.

In our case more conditions must be satisfied, but the reality clause and the residue conditions embodied in the "positive real" matrix definition are found to be both necessary and sufficient.

The elements of a "positive real" $\alpha$- or $\beta$-matrix falling under this item have each the general form:

$$f_{(\lambda)} = \frac{a_0\lambda^{2n} + a_2\lambda^{2n-2} + a_4\lambda^{2n-4} + \ldots + a_{2n}}{b_1\lambda^{2n-1} + b_3\lambda^{2n-3} + \ldots + b_{2n-1}\lambda} \quad (45)$$

After removal of the pole at $\infty$, (45) can be expanded into partial fractions. This is accomplished in the usual well-known manner; thus the first partial fraction, formed by dividing the numerator of (45) by its denominator, is $$f_{(\lambda)} = \frac{a_0}{b_1}\lambda + \frac{\left(a_2 - \frac{a_0 b_3}{b_1}\right)\lambda^{2n-2} + \ldots + \left(a_{2n-2} - \frac{a_0}{b_1}b_{2n-1}\right)\lambda + a_{2n}}{\lambda(b_1\lambda^{2n-2} + b_3\lambda^{2n-4} + \ldots + b_{2n-1})} \quad (45a)$$

The denominator of the second rational fraction must then be factored. Since we know that every pole necessarily lies on the imaginary axis and that such poles must appear in complex pairs, the factors must be $\lambda$, $(\lambda + j\omega_1)$, $(\lambda - j\omega_1)$, $(\lambda + j\omega_2)$, $(\lambda - j\omega_2)$ ... etc. The fraction to the right can then be still further expanded, as will be evident to those skilled in the art. To save space we can now greatly simplify the resultant expansion by adopting an arbitrary set of coefficients, as indicated below, whereby the numerators of the fractions appear in the form generally obtained in partial fraction expansions. Thus we get:—

$$f_{(\lambda)} = k\lambda + \frac{k_0}{\lambda} + \frac{k_1 + jk_1'}{\lambda + j\omega_1} + \frac{k_1 - jk_1'}{\lambda - j\omega_1} + \frac{k_2 + jk_2'}{\lambda + j\omega_2} + \ldots \quad (46)$$

which can be simplified into:

$$f_{(\lambda)} = k\lambda + \frac{k_0}{\lambda} + \frac{2k_1\lambda + 2\omega_1 k_1'}{\lambda^2 + \omega_1^2} + \frac{2k_2\lambda + 2\omega_2 k_2'}{\lambda^2 + \omega_2^2} + \ldots \quad (47)$$

Because the numerators of the fractions of (46) are found to be nothing but residues of $f_{(\lambda)}$ at respective poles (located on the imaginary axis at $\infty$, the origin, and at points corresponding to $\pm\omega_1$, $\pm\omega_2$, $\pm\omega_3$, ... etc.) and because these residues, due to our necessary residue conditions, have to be real we see that all $k':s$ must be zero, wherefore (47) goes over into:

$$f_{(\lambda)} = k\lambda + \frac{k_0}{\lambda} + \frac{2k_1\lambda}{\lambda^2 + \omega_1^2} + \frac{2k_2\lambda}{\lambda^2 + \omega_2^2} + \frac{2k_3\lambda}{\lambda^2 + \omega_3^2} + \ldots \quad (48)$$

where $k$, $k_0$, $k_1$, $k_2$, etc. are the residues of $f_{(\lambda)}$ at respective poles along the boundary.

The coefficients in (48) may be evaluated from the completed expansion of which the first step is shown in (45a). Thus from this equation it is already evident that $$k = \frac{a_0}{b_1}$$

However, these coefficients, being residues, may also be found directly from (45). Thus since $k_0$ is the residue of $f_{(\lambda)}$ at the pole located at the origin, $$k_0 = \lim_{\lambda \to 0} \lambda f_{(\lambda)} = \frac{a_{2n}}{b_{2n-1}} \quad (48a)$$

As $f_{(\lambda)}$ may stand for any one of the three $\alpha:s$ or $\beta:s$ and as each member of the same family generally has the same denominator, a similar expansion as (48) is possible for each one of them and we get, when considering the $\alpha:s$, say:

$$\left.\begin{array}{l}\alpha_{11} = k\lambda + \dfrac{k_0}{\lambda} + \dfrac{2k_1\lambda}{\lambda^2 + \omega_1^2} + \dfrac{2k_2\lambda}{\lambda^2 + \omega_2^2} + \ldots \\[6pt] \alpha_{nn} = k'\lambda + \dfrac{k_0'}{\lambda} + \dfrac{2k_1'\lambda}{\lambda^2 + \omega_1^2} + \dfrac{2k_2'\lambda}{\lambda^2 + \omega_2^2} + \ldots \\[6pt] \alpha_{1n} = k''\lambda + \dfrac{k_0''}{\lambda} + \dfrac{2k_1''\lambda}{\lambda^2 + \omega_1^2} + \dfrac{2k_2''\lambda}{\lambda^2 + \omega_2^2} + \ldots\end{array}\right\} \quad (49)$$

Here, as well as in the following when meeting similar expansions of the three $\alpha:s$ or $\beta:s$ the different columns, i. e.

$$k\lambda, \ k'\lambda, \ k''\lambda; \ \frac{k_0}{\lambda}, \frac{k_0'}{\lambda}, \frac{k_0''}{\lambda};$$

$$\frac{2k_1\lambda}{\lambda^2 + \omega_1^2}, \frac{2k_1'\lambda}{\lambda^2 + \omega_1^2}, \frac{2k_1''\lambda}{\lambda^2 + \omega_1^2}, \text{etc.}$$

are called component families. The members of such a component family form elements of a component matrix and are called component $\alpha:s$ or component $\beta:s$ respectively, while the network representation of each component family is called a component network.

We now immediately see that (49) has a network representation in a structure as schematically shown in Fig. 18, and if (49) had been the expansions of the three $\beta:s$ then the network representation would have been a structure as schematically shown in Fig. 19, although in both cases any one of the four-terminal component networks shown in said figures may happen to be a two-terminal network.

The structure in question, whether in accordance with Figs. 18 or 19, can readily be built because any two members of each component family bear to each other a finite, real, constant ratio, i. e. each component family has a network representation in any one of an infinite number of equivalent structures.

Further, these component structures are all passive because the conditions of a "positive real" matrix, derived from the consideration of such structures, are satisfied. (Note, the only items, under the definition of such a matrix, to consider are (i), (ii), and (iii), i. e. the location of poles and the residue conditions.) Further, naturally the reality clause is fulfilled.

Thus, we can state:

If a prescribed "positive real" $\alpha$- or $\beta$-matrix is such that all zeros and poles of its elements lie on the imaginary axis in the $\lambda$-plane, then this particular matrix satisfies both necessary and sufficient conditions for having a network representation in a purely reactive structure in a combination as shown in Figs. 18 or 19, respectively.

For an illustration, consider the elements of a "positive real" matrix:

$$\left.\begin{array}{l}f_{11(\lambda)} = \dfrac{15\lambda^6 + 89\lambda^4 + 87\lambda^2 + 9}{2\lambda^5 + 8\lambda^3 + 6\lambda} \\[8pt] f_{nn(\lambda)} = \dfrac{19\lambda^6 + 91\lambda^4 + 97\lambda^2 + 9}{2\lambda^5 + 8\lambda^3 + 6\lambda} \\[8pt] f_{1n(\lambda)} = \dfrac{8\lambda^6 + 30\lambda^4 + 36\lambda^2 + 6}{2\lambda^5 + 8\lambda^3 + 6\lambda}\end{array}\right\}$$

The above functions fulfil all requirements of this item and after expansion according to (49) they become:

$$f_{11(\lambda)} = \frac{15}{2}\lambda + \frac{3}{2\lambda} + \frac{\lambda}{\lambda^2+1} + \frac{12\lambda}{\lambda^2+3}$$

$$f_{nn(\lambda)} = \frac{19}{2}\lambda + \frac{3}{2\lambda} + \frac{4\lambda}{\lambda^2+1} + \frac{2\lambda}{\lambda^2+3}$$

$$f_{1n(\lambda)} = 4\lambda + \frac{1}{\lambda} + \frac{2\lambda}{\lambda^2+1} - \frac{4\lambda}{\lambda^2+3}$$

(1) Suppose the $f$:s are the three short-circuit admittances (the $\alpha$:s).

Thus we have:

$$\alpha_{11} = \frac{15}{2}\lambda + \frac{3}{2\lambda} + \frac{\lambda}{\lambda^2+1} + \frac{12\lambda}{\lambda^2+3} = \alpha_{11}' + \alpha_{11}'' + \alpha_{11}''' + \alpha_{11}'^{v}$$

$$\alpha_{nn} = \frac{19}{2}\lambda + \frac{3}{2\lambda} + \frac{4\lambda}{\lambda^2+1} + \frac{2\lambda}{\lambda^2+3} = \alpha_{nn}' + \alpha_{nn}'' + \alpha_{nn}''' + \alpha_{nn}'^{v}$$

$$\alpha_{1n} = 4\lambda + \frac{1}{\lambda} + \frac{2\lambda}{\lambda^2+1} - \frac{4\lambda}{\lambda^2+3} = \alpha_{1n}' + \alpha_{1n}'' + \alpha_{1n}''' + \alpha_{1n}'^{v}$$

Let us choose a $\Pi$-structure for the left component family, that is $\alpha_{11}'$, $\alpha_{nn}'$ and $\alpha_{1n}'$. The capacitances of that structure then are (from (43) page (8) found as shown below:

$$Y_1 = \alpha_{11}' - \alpha_{1n}' = \frac{15}{2}\lambda - 4\lambda = \frac{7}{2}\lambda, \text{ i. e. } c_1 = \frac{7}{2}$$

$$Y_2 = \alpha_{nn}' - \alpha_{1n}' = \frac{19}{2}\lambda - 4\lambda = \frac{11}{2}\lambda, \text{ i. e. } c_2 = \frac{11}{2}$$

$$Y_3 = \alpha_{1n}' = 4\lambda, \text{ i. e. } c_3 = 4$$

The functions are used as they stand, so the ratio of the transformer will be 1:1.

In the second component family the driving point functions are equal, so that we may most conveniently use a symmetrical lattice structure such as is shown in Fig. 10; but since the structure will be symmetrical, the transformer may be omitted. Thus, dealing with the $Y$:s, we have:

$$Y_1 = \alpha_{11}'' - \alpha_{1n}'' = \frac{3}{2\lambda} - \frac{1}{\lambda} = \frac{1}{2\lambda}$$

$$Y_2 = \alpha_{11}'' + \alpha_{1n}'' = \frac{3}{2\lambda} + \frac{1}{\lambda} = \frac{1}{\frac{2}{5}\lambda}$$

i. e. $L_1$ is 2 and $L_2$ is 2/5.

For the third component family the general circuit parameter C is zero, as can be seen from (12) page 3. On the other hand, the network representation of this family cannot be like that shown in Fig. 16 because all the functions are not equal. A transformer is required and the structure selected is shown in Fig. 5, in which $Y_2$, however, is zero as is evident from (27) page 6. The ratio of the transformer and $Y_1$ are found with the help of (12) page 3 and (27) page 6. Thus $$\frac{1}{D} : 1 = \frac{\alpha_{1n}'''}{\alpha_{11}'''} : 1 = 2:1$$

and $$Y_1 = \frac{1}{BD} = \frac{(\alpha_{1n}''')^2}{\alpha_{11}'''} = \frac{4\lambda}{\lambda^2+1}$$

Turning this expression upside down, the corresponding impedance $$z_1 \text{ is} = \frac{\lambda^2+1}{4\lambda} = \frac{\lambda}{4} + \frac{1}{4\lambda}$$

which stand for an inductance $$\left(L = \frac{1}{4}\right)$$

in series with a condenser ($C=4$).

We now come to the last component family. Let us again select a structure like that in Fig. 5. Then we get $$\frac{1}{D} : 1 = \frac{\alpha_{1n}'^{v}}{\alpha_{11}'^{v}} = \frac{1}{3} : 1$$

i. e. 1:3.

$$Y_1 = \frac{1}{BD} = \frac{(\alpha_{1n}'^{v})^2}{\alpha_{11}'^{v}} = \frac{4\lambda}{3\lambda^2+9}$$

i. e. the corresponding impedance $$Z_1 \text{ is} = \frac{3\lambda^2+9}{4\lambda} = \frac{3}{4}\lambda + \frac{1}{4/9\lambda},$$

which means an inductance $$\left(L = \frac{3}{4}\right)$$

in series with a condenser $$\left(C = \frac{4}{9}\right)$$

$$Y_2 = \frac{C}{D} = \frac{\alpha_{11}'^{v}\alpha_{nn}'^{v} - (\alpha_{1n}'^{v})^2}{\alpha_{11}'^{v}} = \frac{2\lambda}{3\lambda^2+9}$$

i. e. the corresponding impedance $$Z_2 \text{ is} = \frac{3\lambda^2+9}{2\lambda} = \frac{3}{2}\lambda + \frac{1}{2/9\lambda}$$

which means an inductance ($L=3/2$) in series with a condenser $$\left(C = \frac{2}{9}\right)$$

Since the functions were assumed to be admittance functions, the four component structures must be connected in parallel as shown in Fig. 20.

The above example has been worked out in detail to show clearly the steps to be followed in actually realizing the component families of terms resulting from the expansion of the functions. In the subsequent examples an analogous procedure is to be employed as will be apparent to those skilled in the art.

Note the necessity of the transformers as indicated. Those having ratios different from 1:1 must under all circumstances stay in. Further, should here the 1:1 transformer contained in the upper component structure be omitted, then the inductance-coil of the lower horizontal arm of the symmetrical lattice structure would be shorted out, and the structure as a whole would not be a network representation of the total prescribed $\alpha$-functions.

(2) Now, suppose the $f$:s are the three open-circuit impedances (the $\beta$:s).

Then, the network-representation is, for instance, the one shown in Fig. 21.

Again, note here the necessity of the transformers. Should in this case the 1:1 transformer be omitted then the condenser of the upper horizontal arm of the symmetrical lattice structure would be shorted out, and again the total structure would not be a true network representation of the total functions.

(b) The above method of realization can readily be extended to all those "positive real" $\alpha$- or $\beta$-matrices whose elements are such that all their poles lie on the negative real axis, where the zeros of the elements located on the principal diagonal also lie. These zeros and poles mutually separate each other. On the other hand, the zeros of the elements located on the "secondary" diagonal lie anywhere on the real axis.

First, consider the case when the sequency of zeros and poles of the elements located on the principal diagonal of a "positive real" $\alpha$- or $\beta$-matrix is proceeding from and including the origin, thus zero—pole—zero—pole,—etc.

Let us start out from function (45) and transform it into a form corresponding to the case considered here.

Thus, multiply its expansion, i. e. (48), by $\lambda$ on both sides of the equality sign, getting:

$$\lambda f(\lambda) = k\lambda^2 + k_0 + \frac{2k_1\lambda^2}{\lambda^2 + \omega_1^2} + \frac{2k_2\lambda^2}{\lambda^2 + \omega_2^2} + \ldots \quad (50)$$

Then, substituting $\lambda^2 = \lambda'$ and writing A:s in place of $k$:s and $c$:s in place of $\omega^2$:s, we have:

$$\lambda f(\lambda) = A\lambda' + A_0 + \frac{2A_1\lambda'}{\lambda' + c_1} + \frac{2A_2\lambda'}{\lambda' + c_2} + \ldots \quad (51)$$

By these two procedures we have removed the pole from the origin and have moved all zeros and poles from the imaginary axis to the negative real axis, thereby reducing their number by half, as indicated in Fig. 22, and if (48) stands for a driving-point function of a purely reactive structure, then the separation property is still fulfilled by zeros and poles of (51), which function thus may represent the driving-point function of a dissipative structure, having only two kinds of elements. All zeros and poles lie now, however, on the negative real axis in a sequence proceeding from and including the origin, thus zero—pole—zero—pole, etc. Note that the constant $A_0$ is nothing more than the ratio of the constant terms of the numerator and denominator of the original function before expansion. Naturally, if there is no constant term in the numerator of the original function, then $A_0$ will not appear. Further, note the form of the fractions in the expansion. The function must, in this case, be expanded in the manner shown.

$\lambda f_{(\lambda)}$ is our new function, and as all $\alpha$:s or $\beta$:s can be expanded in an analogous manner we get, when dropping the prime of $\lambda$ and considering a set of $\alpha$:s (say), the system of equations:

$$\left.\begin{array}{l} \alpha_{11} = A\lambda + A_0 + \dfrac{2A_1\lambda}{\lambda + c_1} + \dfrac{2A_2\lambda}{\lambda + c_2} + \cdots \\[4pt] \alpha_{nn} = B\lambda + B_0 + \dfrac{2B_1\lambda}{\lambda + c_1} + \dfrac{2B_2\lambda}{\lambda + c_2} + \cdots \\[4pt] \alpha_{1n} = C\lambda + C_0 + \dfrac{2C_1\lambda}{\lambda + c_1} + \dfrac{2C_2\lambda}{\lambda + c_2} + \cdots \end{array}\right\} \quad (52)$$

The A:s, B:s, C:s and c:s in (52) are numerically the same as the $k$:s, $k'$:s, $k''$:s and $\omega^2$:s, respectively, (49), though their significance is changed, because of the A:s, B:s and C:s, only those of the left component family (A$\lambda$, B$\lambda$, C$\lambda$) are residues. The others are real constants only. Further, while the $\omega$:s represented conjugate points along the imaginary axis the $c$:s are single points along the negative real axis.

This, however, does not violate the fact that the functions of Equation (52), like (49), always are realizable into a combination of standard structures to be connected according to the Diagram 18, as only the variable is affected by the performed transformations but not the constants. In this case, however, only resistance and capacitance elements together with needed transformers are contained in the network representation to be obtained from the above expansions.

Should (52) be a set of expanded $\beta$:s, then the network representation would be in accordance with Diagram 19 and only resistance and inductance elements together with needed transformers are contained in the network.

In both cases any one of the component structures may happen to be a two-terminal network, however. This occurs when, in any component family, the terms corresponding to the transfer function and one of the driving-point functions are both zero.

For an illustration, consider the elements of a "positive real" $\alpha$-matrix:

$$\left.\begin{array}{l} f_{11(\lambda)} = \dfrac{\lambda^3 + 20\lambda^2 + 16\lambda + 2}{2\lambda^2 + 3\lambda + 1} \\[6pt] f_{nn(\lambda)} = \dfrac{\lambda^3 + 22\lambda^2 + 27\lambda + 8}{2\lambda^2 + 3\lambda + 1} \\[6pt] f_{1n(\lambda)} = \dfrac{\lambda^3 + 15\lambda^2 + 14\lambda + 3}{2\lambda^2 + 3\lambda + 1} \end{array}\right\}$$

The above functions fulfil all requirements of this item and after being expanded according to (52) they become:

$$\left.\begin{array}{l} f_{11(\lambda)} = \dfrac{\lambda}{2} + 2 + \dfrac{4.5\lambda}{2\lambda + 1} + \dfrac{5\lambda}{\lambda + 1} \\[6pt] f_{nn(\lambda)} = \dfrac{\lambda}{2} + 8 + \dfrac{.5\lambda}{2\lambda + 1} + \dfrac{2\lambda}{\lambda + 1} \\[6pt] f_{1n(\lambda)} = \dfrac{\lambda}{2} + 3 + \dfrac{1.5\lambda}{2\lambda + 1} + \dfrac{3\lambda}{\lambda + 1} \end{array}\right\}$$

(1) Suppose the $f$:s are the three short circuit admittances (the $\alpha$:s).

Then, by the aid of the foregoing, their total network representation is, for instance, the one shown in Fig. 23, though naturally each one of the different component-structures can be replaced with some other equivalent structure.

The upper structure, for instance, could as well have been selected as a symmetrical one having equal admittances in each of the two horizontal branches.

If symmetrical or not its 1:1 ratio transformer may in this case be omitted.

(2) Now, suppose the $f$:s are the three open-circuit impedances (the $\beta$:s).

Then, the network representation is, for instance, the one shown in Fig. 24, though again some of the different component structures can be replaced with some other equivalent structures. Also in this case the 1:1 transformer may be omitted.

(c) Let us now consider the case when the sequence of zeros and poles of the elements located on the principal diagonal of a "positive real" $\alpha$- or $\beta$-matrix is proceeding from and including the origin, thus pole—zero—pole—zero— etc., along the negative real axis.

Again we start out from function (45) and transform it into a form corresponding to the case considered here. Thus, in this case divide the expansion of (45), i. e. (48), by $\lambda$ on both sides of the equality sign.

Then, substitute $\lambda^2 = \lambda'$ and write A:s in place of $k$:s and $c$:s in place of $\omega^2$:s, and we get:

$$\frac{f_{(\lambda)}}{\lambda} = A + \frac{A}{\lambda'} + \frac{2A_1}{\lambda' + c_1} + \frac{2A_2}{\lambda' + c_2} + \cdots \quad (53)$$

Thus, $$\frac{f_{(\lambda)}}{\lambda}$$

is our new function, and, dropping the prime and expanding all three $\alpha$:s (say) in an analogous manner, we obtain:

$$\left.\begin{array}{l}\alpha_{11}=A+\dfrac{A_0}{\lambda}+\dfrac{2A_1}{\lambda+c_1}+\dfrac{2A_2}{\lambda+c_2}+\ \cdots\\[6pt]\alpha_{nn}=B+\dfrac{B_0}{\lambda}+\dfrac{2B_1}{\lambda+c_1}+\dfrac{2B_2}{\lambda+c_2}+\ \cdots\\[6pt]\alpha_{1n}=C+\dfrac{C_0}{\lambda}+\dfrac{2C_1}{\lambda+c_1}+\dfrac{2C_2}{\lambda+c_2}+\ \cdots\end{array}\right\} \quad (54)$$

Here a similar discussion as given under item (b) applies, but note that in this case the numerators of all fractions containing $\lambda$ in the denominator are residues. Also note that here the constant terms (A, B, C) are simply the ratios of the coefficients of the highest equal powers of $\lambda$ in the numerator and denominator of the original functions. It is clear that, if $\alpha$:s, the functions characterize a four-terminal network having only resistance and inductance elements together with needed transformers, and if $\beta$:s then the functions of (54) characterize a four-terminal network having only resistance and capacitance elements plus needed transformers.

If $\alpha$:s, the total network representation will substantially be in accordance with the diagram in Fig. 18 and if $\beta$:s substantially in accordance with the diagram in Fig. 19, though any one of the component networks may happen to be a two-terminal network, however, as under the preceding item (i).

For an illustration, consider the elements of a "positive real" matrix:

$$\left.\begin{array}{l}f_{11(\lambda)}=\dfrac{4\lambda^3+18\lambda^2+18\lambda+2}{2\lambda^3+5\lambda^2+2\lambda}\\[6pt]f_{nn(\lambda)}=\dfrac{16\lambda^3+57\lambda^2+49\lambda+10}{2\lambda^3+5\lambda^2+2\lambda}\\[6pt]f_{1n(\lambda)}=\dfrac{6\lambda^3+24.2\lambda^2+23.4\lambda+4}{2\lambda^3+5\lambda^2+2\lambda}\end{array}\right\}$$

The above functions fulfil all requirements of this item and after being expanded according to (54) they become:

$$\left.\begin{array}{l}f_{11(\lambda)}=\dfrac{1}{\lambda}+2+\dfrac{4}{2\lambda+1}+\dfrac{1}{\lambda+2}\\[6pt]f_{nn(\lambda)}=\dfrac{5}{\lambda}+8+\dfrac{3}{2\lambda+1}+\dfrac{2}{\lambda+2}\\[6pt]f_{1n(\lambda)}=\dfrac{2}{\lambda}+3+\dfrac{3.2}{2\lambda+1}+\dfrac{1}{\lambda+2}\end{array}\right\}$$

(1) Suppose the $f$:s are the three short-circuit admittances (the $\alpha$:s).

Then, their total network representation is, for instance, the one shown in Fig. 25, though again naturally other component structures could have been selected. The 1:1 transformer contained in the lower component-structure may in this case be omitted.

(2) Now, suppose the $f$:s are the three open-circuit impedances (the $\beta$:s).

Figure 26:
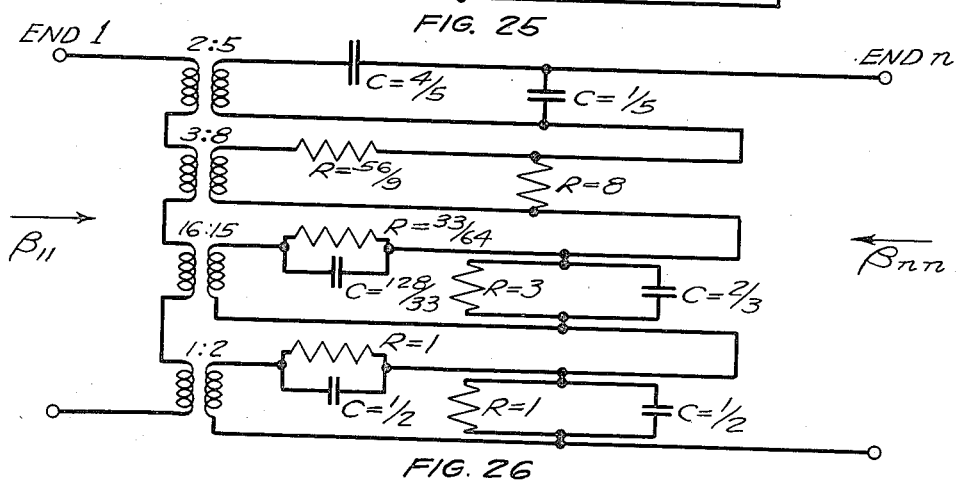

Then, the network representation is, for instance, the one shown in Fig. 26. Again different component structures could have been selected, but note that if using those as indicated all transformers must stay in because each one has a ratio different from 1:1. Had the other L-structure been selected for the lower component structure, then the ratio of its transformer would have become 1:1 and could have been omitted.

With the content of the last two items in mind, and remembering that, naturally, the reality clause is met with, we can now state:

If a positive real $\alpha$- or $\beta$-matrix is such that the zeros and poles of the elements located on its principal diagonal lie on the negative real axis and have there separation property; the poles of the elements located on the "secondary" diagonal lie also there, while zeros of these latter elements lie anywhere along the real axis, then this particular matrix satisfies both necessary and sufficient conditions for having a network representation in a dissipative four-terminal network having only two kinds of network elements.

II. *A general method for realization of any "positive real" $\alpha$- or $\beta$-matrix found to characterize a dissipative four-terminal network*

The $\alpha$:s of (15) were:

$$\left.\begin{array}{l}\alpha_{11}=\dfrac{g_{1(\lambda)}}{h_{(\lambda)}}\\[6pt]\alpha_{nn}=\dfrac{g_{n(\lambda)}}{h_{(\lambda)}}\\[6pt]\alpha_{1n}=\dfrac{g_{1n(\lambda)}}{h_{(\lambda)}}\end{array}\right\} \quad (15)$$

All $\alpha$:s are regular in the right half of the $\lambda$-plane, i. e. no poles are falling there, and in case poles on the boundary (= the imaginary axis) are inherent in a set of prescribed functions they can be removed in a simple manner by the aid of partial fraction expansions of the functions in question, in which expansions they constitute the purely imaginary terms when substituting $j\omega$ for $\lambda$.

Such removed poles are readily separately realized into purely reactive structures which may be four- or two-terminal networks, depending upon whether corresponding poles are contained in all three functions or in one of the driving-point functions only. Should a pole on the boundary be contained in two functions only, then these functions must be the two driving-point functions, because common poles of either one of the driving-point functions and the transfer function cannot be given any physical interpretation.

Common poles on the boundary of the driving-point functions only are most simply given a physical interpretation in two two-terminal networks, although such poles can also be given a network representation in a lattice structure in which the element in each horizontal arm is equal to the element in one of the cross arms. Thus, we can now, after removal of eventually inherent poles on the boundary, consider our functions as regular there also and, by the aid of (17), we find the $\alpha$-determinant along the boundary to be:

$$(\alpha_{11}\alpha_{nn}-\alpha_{1n}^2)_{(j\omega)}=(r_1r_n-r_{1n}^2)-(x_1x_n-x_{1n}^2)+j(r_1x_n+r_nx_1-2r_{1n}x_{1n}) \quad (55)$$

In case (15) had contained the $\beta$:s instead of the $\alpha$:s, then the same discussion as to regularity and removal of inherent poles on the boundary would apply, and the expansion of the $\beta$-determinant along the boundary would, by the aid of (20), be:

$$(\beta_{11}\beta_{nn}-\beta_{1n}^2)_{(j\omega)}=(h_1h_n-h_{1n}^2)-(v_1v_n-v_{1n}^2)+j(h_1v_n+h_nv_1-2h_{1n}v_{1n}) \quad (56)$$

*Definition*

By "switching" we shall in the following always mean a transformation from $\alpha$-functions to $\beta$- functions and vice versa according to the general relations (7) and (8).

From (7) and (8) it is clear that a pole of the $\alpha$:s corresponds to a zero of the $\beta$-determinant and vice versa, that is, if the $\alpha$- or $\beta$-determinants, respectively, of (55) and (56) are made equal to zero by "extraction" of certain real and imaginary quantities, then corresponding poles on the boundary will appear in the members of the next family after a "switching" procedure has been performed, and as shown, such poles can then be removed and separately realized into purely reactive structures.

It should be understood, however, that in case the zero of one of the two determinants is produced at the origin or at $\infty$, then the members of the next family, obtained by a "switching" procedure, will have a single pole at the corresponding point while if the zero is produced at a finite frequency, then naturally the members of the next family are made to contain a conjugate pair of poles.

Considering the $\alpha$-determinant of (55), say, we know that in order to become zero at a certain $\omega$ the real part and the imaginary part of said determinant must become zero simultaneously.

The real part contains one $r$-determinant and one $x$-determinant; let us make each of them equal to zero individually at a certain $\omega$.

Extracting a certain positive constant value $r_1'$, from $r_1$ making the $r$-determinant equal to zero at some $\omega$, we get:

$$F_{(\omega^2)} = \frac{f_{(\omega^2)}}{h^2_{(\omega^2)}} = (r_1 - r_1')r_n - r_{1n}^2 = (r_1 r_n - r_{1n}^2) - r_1' r_n \geq 0 \quad (57)$$

Instead of extracting a positive constant value $r_1'$ from $r_1$ we could as well have extracted a positive constant value $r_n'$ from $r_n$, but in either case the extracted constant value must be $\leq r_{1\,min}$ and $\leq r_{n\,min}$, respectively, where $r_{1\,min}$ is the value of $r_1$ which is obtained when substituting in it the $\omega^2$-value at which the $r_1 - \omega^2$ curve between the origin and $+\infty$ has its lowest point, and $r_{n\,min}$ is the analogous $r_n$-value.

After having extracted the proper $r_1'$ value, say, then $F(\omega^2)$ has a zero at $\omega^2 = \omega_0^2$ say, but is $\geq 0$ for $0 < \omega^2 < +\infty$, and when the found $\omega_0^2$-value is finite, then naturally $F(\omega^2)$ has a double-zero at the point in question.

That a proper $r_1'$ value always can be found is clear from the following considerations:

Let the $r_1 - \omega^2$, $r_n - \omega^2$ and $(r_1 r_n - r_{1n}^2) - \omega^2$ curves be those shown in Fig. 27.

Thus, an infinite number of $r_1' r_n - \omega^2$ curves (or $r_n' r_1 - \omega^2$ curves in case the extraction is made from $r_n$ would fall as indicated in the figure, and because all values on the $(r_n - \omega^2)$, $(r_1 - \omega^2)$ and the $(r_1 r_n - r_{1n}^2) \omega^2$ curves are $\geq 0$, for $0 < \omega^2 < +\infty$, there is always a constant positive $r_1'$-value such that when multiplied by $r_n$ (or a constant positive $r_n'$ value such that when multiplied by $r_1$) this respective curve is made to touch the $(r_1 r_n - r_{1n}^2) - \omega^2$ curve, at which point (P) we have our $\omega_0^2$ making $F(\omega^2)$ in (57) equal to zero at that particular frequency.

The method evidently also gives us a tool to attack another problem, i. e. the design of a four-terminal network which fulfils the requirements inherent in the prescribed functions within a certain frequency range, while outside this range its behavior is not controlled by these functions.

In practice both $\omega_0^2$ and $r_1'$ (say) can be found in a very simple manner:

From (57) we see that $$(r_1 r_n - r_{1n}^2) - r_1' r_n \geq 0$$

Thus:

$$r_1 r_n - r_{1n}^2 \geq r_1' r_n$$

We know that $r_n$ is a quantity $\geq 0$ and thus the above inequality can be written:

$$\frac{r_1 r_n - r_{1n}^2}{r_n} \geq r_1' \quad (58)$$

i. e. the $r_1'$ corresponding to the touching point between the $r_1' r_n - \omega^2$ and the $(r_1 r_n - r_{1n}^2) - \omega^2$ curves in Fig. 27 is simply the lowest value on the $$\frac{r_1 r_n - r_{1n}^2}{r_n} - \omega^2$$

curve, shown, for instance, in Fig. 28 and $\omega_0^2$ is obtained as shown in the following.

Should the lowest point of above curve fall at the origin, then $\omega_0^2$ is $=0$ and $r_1'$ is found from:

$$r_1' = \left[\frac{r_1 r_n - r_{1n}}{r_n}\right]_{\omega^2 = 0} \quad (59)$$

Should the lowest point fall at $\infty$, then $\omega_0^2 = \infty$ and $r_1'$ is found from:

$$r_1' = \left[\frac{r_1 r_n - r_{1n}^2}{r_n}\right]_{\omega^2 = \infty} \quad (60)$$

Finally, should the lowest point fall at a finite $\omega^2$-value: then $\omega_0^2$ is most conveniently found from the derivative:

$$\frac{d}{d\omega^2}\left[\frac{r_1 r_n - r_{1n}^2}{r_n}\right] = 0 \quad (61)$$

whereupon $r_1'$ can be obtained from the equation:

$$r_1' = \left[\frac{r_1 r_n - r_{1n}^2}{r_n}\right]_{\omega^2 = \omega_0^2} \quad (62)$$

Then, in case $\omega_0$ is finite, we have to find two constant values $x_1'$ and $x_n'$ such that when extracted from $x_1$ and $x_n$ all three parts to the right of the equal sign in (55) become equal to zero at $\omega = \omega_0$.

Thus, we get the set of equations:

$$\left.\begin{array}{r}(r_1 - r_1')r_n - r_{1n}^2 = 0\\(x_1 - x_1')(x_n - x_n') - x_{1n}^2 = 0\\(r_1 - r_1')(x_n - x_n') + r_n(x_1 - x_1') - 2r_{1n}x_{1n} = 0\end{array}\right\} \quad (63)$$

Then, by substituting the first two equations of (63) into the last one in two different ways, we get:

$$\left.\begin{array}{r}[r_{1n}x_{1n} - r_n(x_1 - x_1')]^2_{\omega = \omega_0} = 0\\ [r_{1n}(x_n - x_n) - r_n x_{1n}]^2_{\omega = \omega_0} = 0\end{array}\right\}$$

And finally, when solving for $x_1'$ and $x_n'$, we have:

$$\left.\begin{array}{r}x_1' = \left[\dfrac{r_n x_1 - r_{1n} x_{1n}}{r_n}\right]_{\omega = \omega_0}\\[1em] x_n' = \left[\dfrac{r_{1n} x_n - r_n x_{1n}}{r_{1n}}\right]_{\omega = \omega_0}\end{array}\right\} \quad (64)$$

(a) Now we are ready to show how our functions can be exhausted of all their zeros and poles.

Thus, let us start out from a "positive real" $\alpha$-matrix, say, whose elements after removal of originally existing poles on the boundary, are of the $$\frac{(n)\text{th}}{(n)\text{th}} \text{ degree in } \lambda$$

(i. e. the numerators as well as the denominators are of the $n$th degree) and for which $\omega_0$ comes out finite. Then, by the aid of (15), we have:

$$\left.\begin{aligned} \alpha_{11} &= r_1' + \frac{x_1'}{\omega_0}\lambda + \frac{g_{1(\lambda)}'}{h_{(\lambda)}} \\ \alpha_{nn} &= \frac{x_n'}{\omega_0}\lambda + \frac{g_{n(\lambda)}'}{h_{(\lambda)}} \\ \alpha_{1n} &= \frac{g_{1n(\lambda)}'}{h_{(\lambda)}} \end{aligned}\right\} \quad (65)$$

where $g_{1(\lambda)}'$ and $g_{n(\lambda)}'$ are each of one degree higher in $(\lambda)$ than $g_{1(\lambda)}$ and $g_{n(\lambda)}$ in (15) because the introduced poles at $\infty$ in $\alpha_{11}$ and $\alpha_{nn}$ have to be balanced for by similar poles having the same residues but of opposite sign.

Letting the component family to the right be $\alpha':s$, then we see that the determinant $(\alpha_{11}'\alpha_{nn}' - \alpha_{1n}'^2)$ is of the $$\frac{(2n+2)\text{th}}{(2n)\text{th}} \text{ degree,}$$

Further, because $\omega_0$ here is finite, this determinant must contain $(\lambda^2 + \omega_0^2)$ as a factor in the numerator, the remaining part of which may be denoted $\Delta_{(\lambda)}$ It can readily be proved, however, that $\Delta_{(\lambda)}$ should become a factor in the numerator of the determinant of the next family of functions after a conjugate pair of poles have been removed from the boundary.

Thus, we can write:

$$(\alpha_{11}'\alpha_{nn}' - \alpha_{1n}'^2) = \frac{(\lambda^2 + \omega_0^2)\Delta_{(\lambda)}}{h^2_{(\lambda)}}$$

and, forming the corresponding $\beta':s$, we get:

$$\left.\begin{aligned} \beta_{11}' &= \frac{g_{n(\lambda)}' h_{(\lambda)}}{(\lambda^2 + \omega_0^2)\Delta_{(\lambda)}} = \frac{2k_{1\lambda}}{\lambda^2 + \omega_0^2} + \frac{g_{1(\lambda)}''}{\Delta_{(\lambda)}} \\ \beta_{nn}' &= \frac{g_{1(\lambda)}' h_{(\lambda)}}{(\lambda^2 + \omega_0^2)\Delta_{(\lambda)}} = \frac{2k_{n\lambda}}{\lambda^2 + \omega_0^2} + \frac{g_{n(\lambda)}''}{\Delta_{(\lambda)}} \\ \beta_{1n}' &= \frac{g_{1n(\lambda)}' h_{(\lambda)}}{(\lambda^2 + \omega_0^2)\Delta_{(\lambda)}} = \frac{2k_{1n\lambda}}{\lambda^2 + \omega_0^2} + \frac{g_{1n(\lambda)}''}{\Delta_{(\lambda)}} \end{aligned}\right\} \quad (66)$$

where the $k:s$ are the residues of the $\beta':s$ at either one of their conjugate pair of poles.

Here it is clear than the $\beta':s$ are of the $$\frac{(2n+1)\text{th}}{(2n+2)\text{th}} \text{ degree,}$$

and consequently the members of the component family to the right ($\beta'':s$ say) are of the $$\frac{(2n-1)\text{th}}{(2n)\text{th}} \text{ degree,}$$

i. e. they have a zero at making it possible to remove a pole at that point from the members of the next family.

Now forming the $\beta''$-determinant:

$$\beta_{11}''\beta_{nn}'' - \beta_{1n}''^2 = \frac{\Delta_{(\lambda)}\Delta_{1(\lambda)}}{\Delta_{(\lambda)}^2} = \frac{\Delta_{1(\lambda)}}{\Delta_{(\lambda)}}$$

and then forming the corresponding $\alpha'':s$, we get:

$$\left.\begin{aligned} \alpha_{11}'' &= \frac{g_{n(\lambda)}''}{\Delta_{1(\lambda)}} = k_1\lambda + \frac{g_{1(\lambda)}'''}{\Delta_{1(\lambda)}} \\ \alpha_{nn}'' &= \frac{g_{1(\lambda)}''}{\Delta_{1(\lambda)}} = k_n\lambda + \frac{g_{n(\lambda)}'''}{\Delta_{1(\lambda)}} \\ \alpha_{1n}'' &= \frac{g_{1n(\lambda)}''}{\Delta_{1(\lambda)}} = k_{1n}\lambda + \frac{g_{1n(\lambda)}'''}{\Delta_{1(\lambda)}} \end{aligned}\right\} \quad (67)$$

where the $k:s$ are the residues of the $\alpha'':s$ at their pole at $\infty$.

In (67) the $\alpha'':s$ are of the $$\frac{(2n-1)\text{th}}{(2n-2)\text{th}} \text{ degree,}$$

and thus the members of the component family to the right ($\alpha''':s$ say) are of the $$\frac{(2n-2)\text{th}}{(2n-2)\text{th}} \text{ degree,}$$

The $\alpha'''$-determinant is, after cancellation of $\Delta_{1(\lambda)}$, also of the $$\frac{(2n-2)\text{th}}{(2n-2)\text{th}} \text{ degree,}$$

Thus the switching has now been carried through a complete cycle.

The determinant of the $\alpha:s$, from which we started out, was of the $$\frac{(2n)\text{th}}{(2n)\text{th}} \text{ degree,}$$

and consequently we see that in one cycle the power of $\lambda$, in the numerator as well as in the denominator, is decreased by two units, and the same decrease takes place in every cycle, until the given functions generally are exhausted of all their zeros and poles.

The "network representation" for each cycle, when starting out from a set of $\alpha:s$, would then be as shown in Fig. 29.

On the other hand, if starting out from a set of $\beta:s$ then the "network representation" would be as shown in Fig. 30.

Instead of starting out with introducing two poles at $\infty$, as shown in Equation (65), we could as well have introduced two poles at the origin, getting:

$$\left.\begin{aligned} \alpha_{11} &= r_1' + \frac{\omega_0 x_1'}{\lambda} + \frac{g_{1(\lambda)}'}{h_{(\lambda)}'} \\ \alpha_{nn} &= \frac{\omega_0 x_n'}{\lambda} + \frac{g_{n(\lambda)}'}{h_{(\lambda)}'} \\ \alpha_{1n} &= \frac{g_{1n(\lambda)}}{h_{(\lambda)}} \end{aligned}\right\} \quad (68)$$

where the two upper members of the component family to the right are made to "balance" the introduced poles again, but they naturally are different from those of the corresponding family in (65).

Then we proceed in a similar manner with a "switching" procedure, etc., and again we will find that in each cycle the power in $\lambda$ goes down to the same extent as already shown, though naturally the "network representation" will be different.

During the evaluation procedure the component-family to the right may happen to form a singular matrix. In this case the functions cannot be exhausted of all their zeros and poles as outlined above, but it can readily be proved that every singular positive real matrix is realizable into a structure comprising one two-terminal network only, and this structure, except when all matrix elements are equal, contains in addition a transformer.

It should be added that in each cycle for which $\omega_0$ comes out finite generally poles on the boundary having negative residues are coming into play, and as such poles of a driving-point function should correspond to negative reactance elements the "feeling" at the terminals due to these elements has to be produced by means of positive ones if the total structure is to be passive.

For an illustration, consider the elements of a "positive real" $\alpha$-matrix:

$$\alpha_{11} = \frac{2\lambda^3 + 5\lambda^2 + 5\lambda + 2}{\lambda^2 + 2\lambda + 2}$$

$$\alpha_{nn} = \frac{8\lambda^3 + 18\lambda^2 + 18\lambda + 1}{\lambda^2 + 2\lambda + 2}$$

$$\alpha_{1n} = \frac{3\lambda^3 + 7\lambda^2 + 7\lambda - 1}{\lambda^2 + 2\lambda + 2}$$

After removal of inherent poles on the boundary (in this case at $\infty$) we get:

$$\alpha_{11} = 2\lambda + \frac{\lambda^2 + \lambda + 2}{\lambda^2 + 2\lambda + 2}$$

$$\alpha_{nn} = 8\lambda + \frac{2\lambda^2 + 2\lambda + 1}{\lambda^2 + 2\lambda + 2}$$

$$\alpha_{1n} = 3\lambda + \frac{\lambda^2 + \lambda - 1}{\lambda^2 + 2\lambda + 2}$$

Then, proceeding as outlined we find, when considering the $$\frac{r_1 r_n - r_{1n}^2}{r_n} - \omega^2$$

curve, for instance:

$$\omega_0^2 = 3.8661$$
$$r_1' = .0595877$$
$$x_1' = -.296030$$
$$x_n' = -.350828$$

Thus, the remainder of the prescribed $\alpha$:$s$, after removal of inherent poles on the boundary, can be written:

$$\alpha_{11} = .0595877 - \frac{.296030}{\sqrt{3.8661}}\lambda + \frac{.15055\lambda^3 + 1.24152\lambda^2 + 1.18193\lambda + 1.88082}{\lambda^2 + 2\lambda + 2}$$

$$\alpha_{nn} = -\frac{.350828}{\sqrt{3.8661}}\lambda + \frac{.17842\lambda^3 + 2.35685\lambda^2 + 2.35685\lambda + 1}{\lambda^2 + 2\lambda + 2}$$

$$\alpha_{1n} = \frac{\lambda^2 + \lambda - 1}{\lambda^2 + 2\lambda + 2}$$

Then, continuing with a "switching" procedure as outlined we find the realization for the first cycle to be, for instance, the one shown in Fig. 33.

When then starting the second cycle the $\alpha$:$s$ to consider are:

$$\alpha_{11} = \frac{.81879\lambda^2 + 1.27875\lambda + .97301}{.51723\lambda^2 + 1.03425\lambda + 1.03387}$$

$$\alpha_{nn} = \frac{1.18214\lambda^2 + 1.36758\lambda + .51730}{.51723\lambda^2 + 1.03425\lambda + 1.03387}$$

$$\alpha_{1n} = \frac{.29521\lambda^2 - .007656\lambda - .51734}{.51723\lambda^2 + 1.03425\lambda + 1.03387}$$

In this cycle $\omega_0$ is $=0$ giving a $r_1'$ value $=.441$. Further, $x_1'$ and $x_n'$ are both zero, and proceeding in the same manner as during the first cycle we find the network representation for this cycle to be, for instance, the one shown in Fig. 34.

Figure 35:
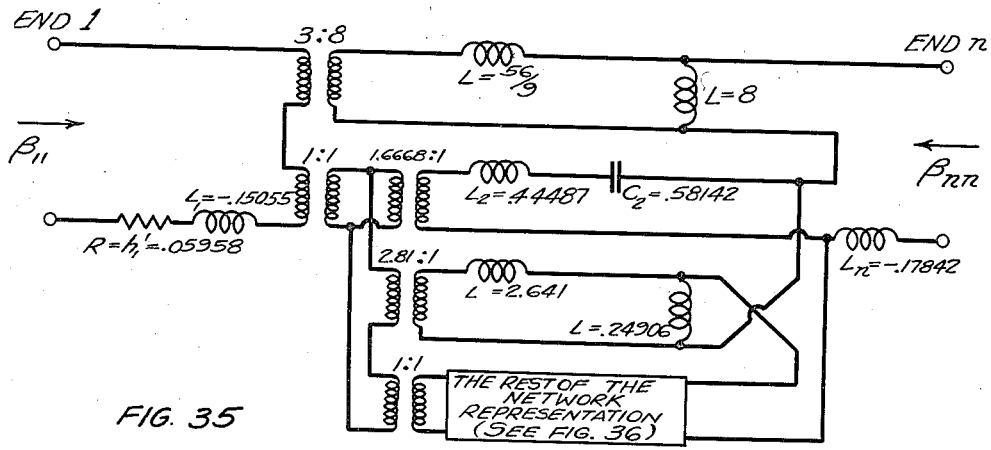
Figure 36:
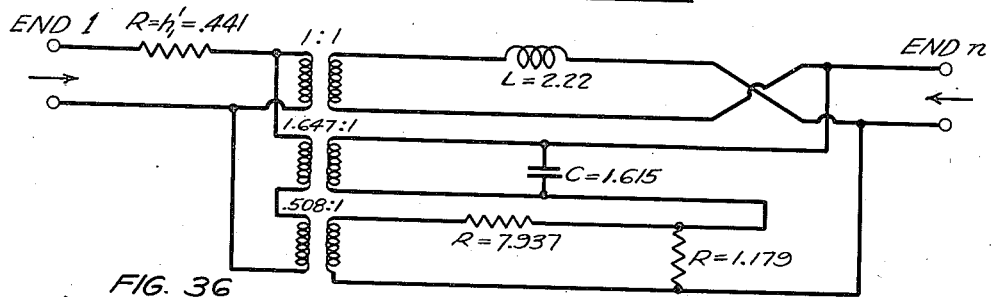

On the other hand, had the prescribed functions been $\beta$:$s$ the realization procedure would have been the same, but the realization for the first cycle would, for instance, have been the one shown in Fig. 35, and for the second cycle the one shown in Fig. 36.

(b) It is not always, however, that the lowest point of the $$\frac{r_1 r_n - r_{1n}^2}{r_n} - \omega^2$$

curve, say, is falling at a finite frequency making negative reactance elements to come into play.

For functions corresponding to a dissipative four-terminal network containing only two kinds of elements the lowest point of the above curve, and of the analogous curves, is found to fall at the origin or at infinity, respectively, where the imaginary part of each one of the $\alpha$:$s$ and $\beta$:$s$ is zero.

Thus, when considering a "positive real" $\alpha$-matrix corresponding to a network having only resistance and inductance elements, the lowest point of the $$\frac{r_1 r_n - r_{1n}^2}{r_1} - \omega^2$$

or the $$\frac{r_1 r_n - r_{1n}^2}{r_n} - \omega^2$$

curve falls at $\infty$, as shown in Fig. 31, and when corresponding to a network having only resistance and capacitance elements it falls at the origin, as shown in Fig. 32. The reverse is true regarding the lowest point of the $$\frac{h_1 h_n - h_{1n}^2}{h_1} - \omega^2$$

or the $$\frac{h_1 h_n - h_{1n}^2}{h_n} - \omega^2$$

curve, when considering the $\beta$:$s$.

In this case, however, an extraction of a constant minimum value has to be made before every "switching", i. e. (when starting out from a set of $\beta$:$s$, say) besides extracting $h_1'$, corresponding to the lowest point on the $$\frac{h_1 h_n - h_{1n}^2}{h_n} - \omega^2$$

curve, when starting, we, after one "switching", also have to extract an analogous $r_1'$-value.

Note, however, that the lowest point of each one of the separate $r_1 - \omega^2$ and $r_n - \omega^2$ curves, or of the $h_1 - \omega^2$ and $h_n - \omega^2$ curves, for cases considered in this item falls at the same limiting frequency as that at which the lowest point of the above corresponding curves fall, and it seems that when this happens we can always extract these "minimum" values together with the corresponding value from the real part of the transfer function, making the separate $r$:$s$ or $h$:$s$, as well as their determinants, have a zero at the same point in question.

Consequently, from the content of this item we see that for the realization of a "positive real" matrix, generally corresponding to a dissipative four-terminal network having only two kinds of elements, the general method outlined under this heading is perfectly good and always leading to a passive structure.

For an illustration, consider the elements of a "positive real" matrix:

$$\beta_{11} = \frac{2\lambda + 3}{2\lambda + 1}$$

$$\beta_{nn} = \frac{\lambda + 2}{2\lambda + 1}$$

$$\beta_{1n} = \frac{\lambda + 1}{2\lambda + 1}$$

From the location of the zeros and poles of all $\beta$:$s$ and from the sequence of the zeros and the poles of $\beta_{11}$ and $\beta_{nn}$ we see that the above functions generally characterize a four-terminal network containing only capacitance and resistance elements.

Figures 37, 38:
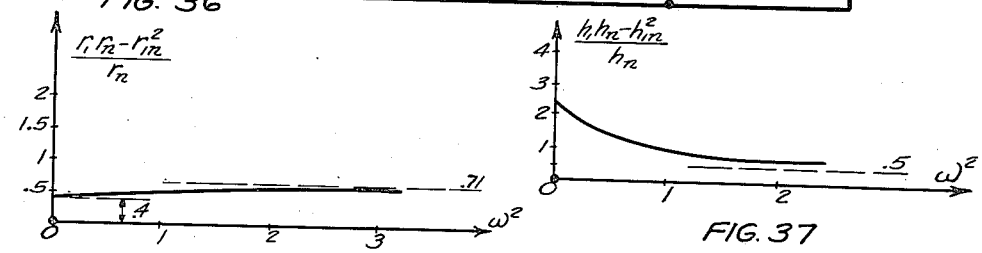
Figure 39:
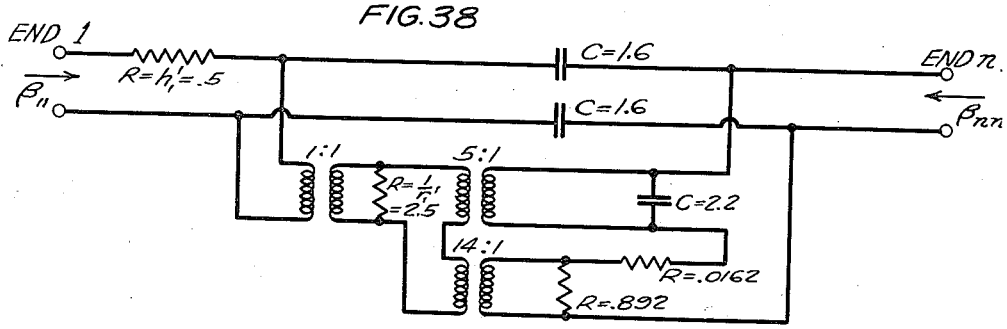

Considering the $$\frac{h_1 h_n - h_{1n}^2}{h_n} - \omega^2$$

curve, say, shown in Fig. 37, then we see that, as required, its lowest point falls at $\infty$ and .5 unit above the $\omega^2$-axis. Thus, $\omega_0^2$ is $= \infty$ and $h_1'$ is $= .5$. Further, the imaginary parts of the prescribed $\beta$:s are all equal to zero at $\infty$, wherefore we can write:

$$\left. \begin{array}{l} \beta_{11} = .5 + \dfrac{\lambda + 2.5}{2\lambda + 1} \\[4pt] \beta_{nn} = \dfrac{\lambda + 2}{2\lambda + 1} \\[4pt] \beta_{1n} = \dfrac{\lambda + 1}{2\lambda + 1} \end{array} \right\}$$

Then, transforming above three fractions shown to the right into corresponding $\alpha$:s, we get:

$$\left. \begin{array}{l} \alpha_{11} = 8\lambda + \dfrac{1.8\lambda + 2}{2.5\lambda + 4} \\[4pt] \alpha_{nn} = 8\lambda + \dfrac{2.8\lambda + 2.5}{2.5\lambda + 4} \\[4pt] \alpha_{1n} = 8\lambda + \dfrac{-.2\lambda + 1}{2.5\lambda + 4} \end{array} \right\}$$

Considering now the $$\frac{r_1 r_n - r_{1n}^2}{r_n} - \omega^2$$

curve, say, we find, as required, its lower point to fall at the origin, and .4 unit above the $\omega^2$-axis, as shown in Fig. 38. Thus, for this "half cycle" $\omega_0^2$ is $=0$ and $r_1'$ is $=.4$, wherefore we can write the component family to the right as:

$$\left. \begin{array}{l} \alpha_{11} = .4 + \dfrac{.8\lambda + .4}{2.5\lambda + 4} \\[4pt] \alpha_{nn} = \dfrac{2.8\lambda + 2.5}{2.5\lambda + 4} \\[4pt] \alpha_{1n} = \dfrac{-.2\lambda + 1}{2.5\lambda + 4} \end{array} \right\}$$

Then, transforming above three fractions into corresponding $\beta$:s, we get:

$$\left. \begin{array}{l} \beta_{11} = \dfrac{2.8\lambda + 2.5}{.88\lambda} = \dfrac{125}{44\lambda} + \dfrac{70}{22} \\[4pt] \beta_{nn} = \dfrac{.8\lambda + .4}{.88\lambda} = \dfrac{20}{44\lambda} + \dfrac{20}{22} \\[4pt] \beta_{1n} = \dfrac{-.2\lambda + 1}{.88\lambda} = \dfrac{50}{44\lambda} + \dfrac{5}{22} \end{array} \right\}$$

and the total network representation is, for instance, the one shown in Fig. 39.

Figure 40:
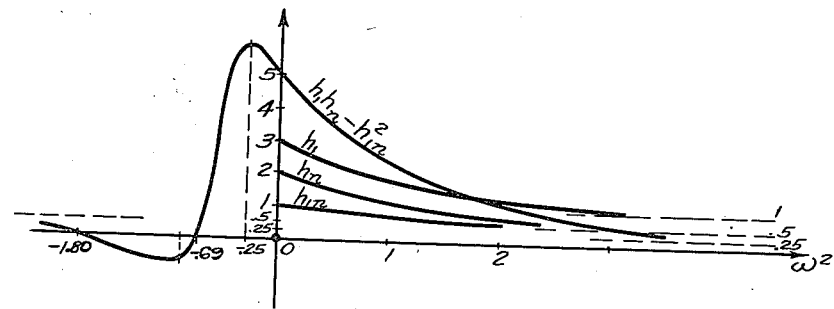

As mentioned, however, functions falling under this item have the feature that the separate $r_1 - \omega^2$ and $r_n - \omega^2$ curves or the separate $h_1 - \omega^2$ and $h_n - \omega^2$ curves have their lowest point at the same limiting frequency as where the corresponding determinant of the real parts $-\omega^2$ curves have their lowest point, as shown in Fig. 40, making it possible to get a zero of the real parts of both driving-point functions simultaneously with a zero of the proper determinant of the real parts. $h_{1\,\mathrm{min}}$ and $h_{n\,\mathrm{min}}$ are readily found to be equal to 1 and .5, respectively, and the prescribed functions:

$$\left. \begin{array}{l} \beta_{11} = \dfrac{2\lambda + 3}{2\lambda + 1} \\[4pt] \beta_{nn} = \dfrac{\lambda + 2}{2\lambda + 1} \\[4pt] \beta_{1n} = \dfrac{\lambda + 1}{2\lambda + 1} \end{array} \right\}$$

can thus be written:

$$\left. \begin{array}{l} \beta_{11} = 1 + \dfrac{2}{2\lambda + 1} \\[4pt] \beta_{nn} = .5 + \dfrac{1.5}{2\lambda + 1} \\[4pt] \beta_{1n} = .5 + \dfrac{.5}{2\lambda + 1} \end{array} \right\}$$

Then, transforming the component family to the right into corresponding $\alpha$:s, we get:

$$\left. \begin{array}{l} \alpha_{11} = \dfrac{3\lambda + 1.5}{2.75} = \dfrac{12}{11}\lambda + \dfrac{6}{11} \\[4pt] \alpha_{nn} = \dfrac{4\lambda + 2}{2.75} = \dfrac{16}{11}\lambda + \dfrac{8}{11} \\[4pt] \alpha_{1n} = \dfrac{\lambda + .5}{2.75} = \dfrac{4}{11}\lambda + \dfrac{2}{11} \end{array} \right\}$$

Note that here the prescribed functions are exhausted of all their zeros and poles after one single switching and their network representation is, for instance, the one shown in Fig. 41.

If considering the prescribed functions as being $\alpha$:s instead of $\beta$:s the evaluation procedure would naturally be exactly the same as shown in above two alternatives, though the network representations would be different.

III. A general method for finding a network representation of any "positive real" $\alpha$- or $\beta$-matrix Below we shall outline a general method which completely solves the problem of synthesizing a passive, finite, four-terminal network from its prescribed driving-point functions and transfer function; the purely reactive case, independently solved in the foregoing under heading "I", being included in this method.

The general realization method under this heading is based upon the following principles:

(1) Every "positive real" $\alpha$- or $\beta$-matrix whose complex determinant has (besides in the interior of the left half of the $\lambda$-plane) zeros or (and) poles on the boundary can always be reduced to a "positive real" $\alpha$- or $\beta$-matrix whose determinant does not contain such zeros or (and) poles.

Further, poles on the boundary, originally present in and then removed from the matrix elements, can always separately be realized into purely reactive component structures to be joined to the rest of the network representation, as shown in the foregoing.

(2) Every non-singular "positive real" $\alpha$- or $\beta$-matrix (whose elements have no poles on the boundary) having the general feature that the determinant of the real parts of its elements is > zero for some or all real $\omega$:s can always, by the aid of (12), be translated into a matrix whose elements are the general circuit parameters and this matrix can then always be split up into a product of two matrices each of which has its correspondence in a "positive real" $\alpha$- or $\beta$-matrix.

In one of these product matrices, the "extracted" matrix, say, one element only can be a λ-function, and this function is generated from its real part in such a manner that, besides being a "positive real" function itself, the other matrix, the "reduced" matrix, say, is made to have the specific property that the elements of its corresponding α- or β-matrix have real parts whose determinant, instead of being ≥ zero, is equal to zero along the whole boundary. In analogy with the names of the above mentioned matrices let the corresponding networks be the "extracted" network and the "reduced" network, respectively.

(3) After the "reduced" matrix has been translated into a "positive real" α- or β-matrix whose elements are such that the determinant of their real parts is equal to zero along the whole boundary, then this property holds for every following matrix obtained by a "switching" procedure, according to (7) and (8), until our functions are exhausted of all their zeros and poles, i. e. they have become real constants generally realizable into a component four-terminal resistance network, or possibly a singular matrix having λ-functions as elements is encountered before reaching that point.

(4) It is known (see Brune's article, referred to above, p. 219) that the real part of each element of a "positive real" matrix is an even function of $\omega$, while the imaginary part of each element is an odd function of $\omega$. Thus, each one of our three functions, when referring to the boundary, may be written:

$$F_{(j\omega)} = H_{(\omega^2)} + j\omega J_{(\omega^2)} \tag{69}$$

(5) After inherent poles on the boundary have been removed (as mentioned under point 1), then the imaginary part of each one of our functions is always zero at the origin and at $\infty$.

This fact is of utmost importance, because then from (55) and (56) we see that the determinant of the elements of a "positive real" α- (or β-) matrix, corresponding to a "reduced" matrix, invariably has two zeros (at least) on the boundary (one at the origin and one at $\infty$) making it possible to remove poles at these points from the members of the next family after a switching procedure has been performed.

Then the same feature shows up again and again, and for each time we "switch" generally two poles on the boundary can be removed from each function.

(6) In the meantime invaluable cancellations of common factors take place, because the common denominator of a family of α- or β-functions, whose real parts are such that their determinant is equal to zero along the whole boundary, always becomes a factor in the numerator of the determinant of such functions, i. e. the above mentioned cancellations take place for every time we switch between α- and β-functions, and vice versa, translated from a "reduced" matrix, regardless of the subsequent removal of poles on the boundary from each function during the evaluation procedure.

(7) In addition, a simple method of deriving the λ-function, contained as an element in the "extracted" matrix, from an $\omega$-function, supposed to be its real part along the boundary is known (see O. Brune Sc. D. Thesis M. I. T., 1931, p. 97) and the λ-function obtained in this manner can always be proved to be a "positive real" function, i. e. it can be a driving-point function realizable into a passive, dissipative, finite, two-terminal network. Then, the new driving-point function of the "reduced" network at the end where a dissipative two-terminal network has been bridged across one pair of the main terminals (if considering a prescribed "positive real" α-matrix) or where a dissipative two-terminal network has been connected in series with one of the main terminating leads (if considering a prescribed "positive real" β-matrix) is simply the difference between the originally prescribed driving-point function (having originally existing poles on the boundary removed) at this end, and the generated "positive real" function discussed above.

Said driving-point function of the "reduced" network can as a check also readily be generated from its real part along the boundary.

Let us now consider each point in more detail:

As to point (1) it is clear that because the prescribed functions are elements of a "positive real" matrix, among others, items (i), (ii) and (iii) under the definition of such a matrix are fulfilled. Thus, every component family of functions, arising from poles on the boundary and separated by means of a partial fraction expansion, is always realizable into a passive purely reactive structure, and because any two members of such a family form a constant ratio the method of design is known from the foregoing.

If the determinant of the prescribed matrix has zeros on the boundary, then we may or may not "switch" to the next family and remove the zeros but in most cases the total network representation becomes more complicated if a "switching" is performed in order to "remove" such zeros in the form of poles of the elements of the inverse matrix.

As to the splitting procedure, dealt with in point (2), a matrix containing the four general circuit parameters corresponding to a "positive real" α- or β-matrix may be written:

(a) When the prescribed functions are α-functions:

$$\begin{Vmatrix} A & B \\ C & D \end{Vmatrix} = \begin{Vmatrix} A' & B' \\ C' & D' \end{Vmatrix} \times \begin{Vmatrix} 1 & 0 \\ Y_n & 1 \end{Vmatrix} \tag{70}$$

It is clear that the matrix Equation (70) characterizes the two lower four-terminal networks in chain connection shown in Fig. 42. Transformers contained in the total structure shown in the figure are not shown, however.

Solving for the left one of the product matrices of (70) we get:

$$\begin{Vmatrix} A' & B' \\ C' & D' \end{Vmatrix} = \begin{Vmatrix} A & B \\ C & D \end{Vmatrix} \times \begin{Vmatrix} 1 & 0 \\ -Y_n & 1 \end{Vmatrix} = \begin{Vmatrix} A-BY_n & B \\ C-DY_n & D \end{Vmatrix} \tag{71}$$

As seen from (71) and (12) the driving-point admittance at end 1 and the transfer admittance are not changed by the extraction of the matrix $$\begin{Vmatrix} 1 & 0 \\ Y_n & 1 \end{Vmatrix}$$

At end $n$ the driving-point admittance $\alpha_{nn}'$ of the "reduced" network is, from (71), seen to be:

$$\alpha_{nn}' = \frac{A-BY_n}{B} = \frac{A}{B} - Y_n = \alpha_{nn} - Y_n \tag{72}$$

Letting:

$$\left.\begin{aligned} \alpha_{nn}' &= r_n' + jx_n' \\ Y_n &= Y_{nr} + jY_{nx} \end{aligned}\right\}$$

and, as before, splitting up $\alpha_{nn}$ into its real ($r_n$) and imaginary—($x_n$) parts, we get from (72):

$$r_n' = r_n - Y_{nr}$$

Now $Y_{nr}$ has to be adjusted in such a manner that the determinant $(r_1 r_n' - r_{1n}^2)$ becomes equal to zero, i. e. when solving for $Y_{nr}$ and $r_n'$ by the aid of this determinant equation, we get:

$$Y_{nr} = \frac{r_1 r_n - r_{1n}^2}{r_1} \\ r_n' = \frac{r_{1n}^2}{r_1} \Bigg\} \quad (73)$$

The potential functions $Y_{nr}$ and $r_n'$ of (73) can now readily be proved to have all required properties for being the real parts of two "positive real" functions, and each one of these latter functions, generated by its real part, can be uniquely determined, as no poles on the boundary can come into play, because if present in the prescribed functions they have been removed before the above splitting procedure is started.

$Y_n$ can now be separately realized into a finite dissipative two-terminal network by the aid of known methods (see Brune's article, referred to in the foregoing).

On the other hand, $a_{nn}'$ has now to be considered together with $a_{11}$ and $a_{1n}$ and we are ready to exhaust these functions of their zeros and poles by the aid of a "switching" procedure, etc.

$$h_1 h_n - h_{1n}^2 = \frac{(r_1 r_n - r_{1n}^2)(x_1 x_n - x_{1n}^2) + (x_1 x_n - x_{1n}^2)(r_1 x_n + r_n x_1 - 2 r_{1n} x_{1n})^2 - (x_1 x_n - x_{1n}^2)(r_1 x_n + r_n x_1 - 2 r_{1n} x_{1n})^2}{[(x_1 x_n - x_{1n}^2)^2 + (r_1 x_n + r_n x_1 - r_{1n} x_{1n})^2]^2} \quad (79)$$

(b) When the prescribed functions are $\beta$-functions:

In this case our matrix, split up as:

$$\begin{Vmatrix} A & B \\ C & D \end{Vmatrix} = \begin{Vmatrix} A' & B' \\ C' & D' \end{Vmatrix} \times \begin{Vmatrix} 1 & Z_n \\ 0 & 1 \end{Vmatrix} \quad (74)$$

defines the two lower four-terminal networks in chain connection shown in Fig. 43. Transformers contained in the total structure shown in the figure are not shown, however.

When here solving for the matrix $$\begin{Vmatrix} A' & B' \\ C' & D' \end{Vmatrix}$$

i. e.

$$\begin{Vmatrix} A' & B' \\ C' & D' \end{Vmatrix} = \begin{Vmatrix} A & B \\ C & D \end{Vmatrix} \times \begin{Vmatrix} 1 & -Z_n \\ 0 & 1 \end{Vmatrix} = \begin{Vmatrix} A & B - AZ_n \\ C & D - CZ_n \end{Vmatrix} \quad (75)$$

and when letting:

$$\beta_{nn}' = h_n' + j v_n' \\ Z_n = Z_{nr} + j Z_{nx}$$

we get, after a similar procedure as shown in the foregoing:

$$Z_{nr} = \frac{h_1 h_n - h_{1n}^2}{h_1} \\ h_n' = \frac{h_{1n}^2}{h_1} \Bigg\} \quad (76)$$

Each one of the potential functions $Z_{nr}$ and $h_n'$ can now be proved to be the real part of a "positive real" function ($Z_n$ and $\beta_{nn}'$, respectively) and a similar discussion as given under the preceding case applies here.

It should be pointed out that instead of splitting up $a_{nn}$ or $\beta_{nn}$, respectively, into two "positive real" functions we can as well split up $a_{11}$ or $\beta_{11}$, respectively, into two "positive real" functions and then proceed in an exactly analogous manner.

As to point (3), let us consider a set of prescribed $a$:s (say) and assume that poles on the boundary, if originally present, have been removed, and further that the determinant of the real parts is equal to zero (being so originally or made so by applying the procedure outlined in point (2)).

Then, when forming the $\beta$:s, we get, by the aid of (20), (8), (17) and (55):

$$\beta_{11} = h_1 + j v_1 = \frac{r_n + j x_n}{-(x_1 x_n - x_{1n}^2) + j(r_1 x_n + r_n x_1 - 2 r_{1n} x_{1n})} \\ \beta_{nn} = h_n + j v_n = \frac{r_1 + j x_1}{-(x_1 x_n - x_{1n}^2) + j(r_1 x_n + r_n x_1 - 2 r_{1n} x_{1n})} \\ \beta_{1n} = h_{1n} + j v_{1n} = \frac{r_{1n} + j x_{1n}}{-(x_1 x_n - x_{1n}^2) + j(r_1 x_n + r_n x_1 - 2 r_{1n} x_{1n})} \Bigg\} \quad (77)$$

and solving for the real parts (the $h$:s), we get:

$$h_1 = \frac{-r_n(x_1 x_n - x_{1n}^2) + x_n(r_1 x_n + r_n x_1 - 2 r_{1n} x_{1n})}{(x_1 x_n - x_{1n}^2)^2 + (r_1 x_n + r_n x_1 - 2 r_{1n} x_{1n})^2} \\ h_n = \frac{-r_1(x_1 x_n - x_{1n}^2) + x_1(r_1 x_n + r_n x_1 - 2 r_{1n} x_{1n})}{(x_1 x_n - x_{1n}^2)^2 + (r_1 x_n + r_n x_1 - 2 r_{1n} x_{1n})^2} \\ h_{1n} = \frac{-r_{1n}(x_1 x_n - x_{1n}^2) + x_{1n}(r_1 x_n + r_n x_1 - 2 r_{1n} x_{1n})}{(x_1 x_n - x_{1n}^2)^2 + (r_1 x_n + r_n x_1 - 2 r_{1n} x_{1n})^2} \Bigg\} \quad (78)$$

Then, forming the $h$-determinant, we get:

From (79) it is now clear that as $(r_1 r_n - r_{1n}^2)$ is equal to zero, then $(h_1 h_n - h_{1n}^2)$ is also equal to zero.

Further, had we started out from an $h$-determinant being equal to zero, then the $r$-determinant is naturally also equal to zero, wherefore we can state:

If the determinant of the real parts of the elements of a "positive real" $a$- or $\beta$-matrix is equal to zero (made so or being so originally) then the determinant of the real parts of the elements of its inverse matrix is also equal to zero, and for every time we "switch" we get a matrix having that same property, regardless of whether produced poles on the boundary have in the meantime been removed or not.

As to point (4), it explains itself and thus we proceed to point (5).

Considering the $a$-determinant (say) we see from (55), rewritten below):

$$(a_{11} a_{nn} - a_{1n}^2)_{(j\omega)} = (r_1 r_n - r_{1n}^2) - \\ (x_1 x_n - x_{1n}^2) + j(r_1 x_n + r_n x_1 - 2 r_{1n} x_{1n}) \quad (55)$$

that because the $r$-determinant is equal to zero for all real $\omega$:s and because originally existing poles on the boundary have been removed, none of the $x$:s can have a pole at the origin or at $\infty$. In addition, when knowing that the highest power of $\omega^2$ in the numerator of each one of the $r$:s ($h$:s) always is $\leq$ the one in their denominator, and that the $x$:s ($v$:s) are odd functions of $\omega$, then it is clear that the $a$-determinant of (55) has (at least) two zeros on the boundary,—one at the origin and one at $\infty$, making poles at these points generally to appear in the elements of the $\beta$-matrix, and vice versa if considering the $\beta$-determinant of (56).

Considering the origin, it is clear that each one of the determinants of (55) and (56) is equal to zero for $\omega = 0$, because the determinant of the real parts is zero and each imaginary part has an $\omega$ as a factor in its numerator.

When considering infinity and knowing that originally existing poles there have been removed, then it is evident that the $x$:s and $v$:s of (55) and (56), respectively, if having $\omega$ to the $n^{th}$ power in the denominator, they then have $\omega$ to at most the $(n-1)$th power in the numerator, because they are odd functions of $\omega$.

Thus, due to this feature and because it is known that the power of $\omega$ in the numerator of the $r:s$ and $h:s$, respectively, always is $<$ the power of $\omega$ in the denominator, we see that for $\omega=\infty$ the $\alpha$-determinant and $\beta$-determinant, respectively, again become equal to zero.

The fact that for each time we "switch", after removing poles, the determinant of a set of functions gets one zero at the origin and one at $\infty$ naturally means that if, say:

$$\left.\begin{array}{l}\alpha_{11}\alpha_{nn}=\dfrac{a_r\lambda^r+a_{r-1}\lambda^{r-1}+\ \ldots\ a_1\lambda+a_0}{h_{(\lambda)}{}^2}\\ \text{and}\\ \alpha_{1n}{}^2=\dfrac{b_r\lambda^r+b_{r-1}\lambda^{r-1}+\ \ldots\ b_1\lambda+b_0}{h_{(\lambda)}{}^2}\end{array}\right\} \quad (80)$$

then $a_r$ is always equal to $b_r$, and $a_0$ is always equal to $b_0$, i. e. in each "switching" procedure these terms always cancel out.

The statement "at least" to be found under point (5) refers to the rather unlikely possibility of (55) or (56) having a zero at a finite $\omega$.

When this happens, then two (conjugate) additional poles can generally be removed from each member of the next family decreasing the power of $\lambda$ in the numerator as well as the denominator by two additional units, although the removal of such poles is not necessary.

Such an occurrence, however, does not introduce negative reactance elements, because such elements come only into play when we make (55) or (56) zero at a finite frequency by extracting real quantities and introducing poles at $\infty$ or at the origin.

For (55), say, to become zero at a finite $\omega$, we can deduce a simple relation which then must hold:

From the first two parts of (55) substitute $$r_1 = \frac{r_{1n}{}^2}{r_n}$$

and $$x_1 = \frac{x_{1n}{}^2}{x_n}$$

into the last part, equated to zero, giving:

$$\frac{r_{1n}{}^2}{r_n}x_n + r_n\frac{x_{1n}{}^2}{x_n} - 2r_{1n}x_{1n} = 0$$

which simplifies into:

$$(r_{1n}x_n - r_n x_{1n})^2 = 0$$

i. e. then for some finite real $\omega$:

$$r_{1n}x_n \text{ must be } = r_n x_{1n} \quad (81)$$

Several other conditions can be obtained but they are all fulfilled when (81) is fulfilled.

As to point (6), the proof will not be shown here but it is readily made in the following manner:

Conseder the $\alpha:s$ say, and write (17) as shown below:

$$\left.\begin{array}{l}\alpha_{11}=\dfrac{A_1+jA_1'}{B+jB'}=r_1+jx_1\\ \\ \alpha_{nn}=\dfrac{A_n+jA_n'}{B+jB'}=r_n+jx_n\\ \\ \alpha_{1n}=\dfrac{A_{1n}+jA_{1n}'}{B+jB'}=r_{1n}+jx_{1n}\end{array}\right\} \quad (82)$$

where all quantites are functions of $\omega$.

Then, solve for $r_1$, $r_n$ and $r_{1n}$ and equate the determinant $(r_1r_n - r_{1n}{}^2)$ to zero. Then, form $(\alpha_{11}\alpha_{nn} - \alpha_{1n}{}^2)$ from (82) and substitute into this determinant another expression for its imaginary part, said expression obtained from equating the $r$-determinant to zero.

It then becomes clear that $(B+jB')$ is a factor in the numerator of the $\alpha$-determinant and cancels out.

Should the determinant of the real parts of the $\alpha:s$ be different from zero from beginning, we simply apply the procedure of point (2) and make it equal to zero and then use the same proof, though in this case the factor in the numerator of $(\alpha_{11}\alpha_{nn}'-\alpha_{1n}{}^2)$, or $(\alpha_{11}'\alpha_{nn}-\alpha_{1n}{}^2)$ respectively, is the common denominator of the original functions before the procedure of point (2) was started, and this factor cancels out.

As to point (7), suppose the function:

$$f_{(\lambda)} = \frac{g_{(\lambda)}}{h_{(\lambda)}} = \frac{a_n\lambda^n + a_{n-1}\lambda^{n-1}+\ \ldots\ +a_0}{b_n\lambda^n + b_{n-1}\lambda^{n-1}+\ \ldots\ +b_0} \quad (83)$$

is regular in the right half of the $\lambda$-plane and has no poles on the boundary (if originally present they are simply removed).

The $a:s$ and $b:s$ are real constants. Let the real part of $f_{(\lambda)}$, along the boundary, be:

$$f_{(\omega^2)} = \frac{G_{(\omega^2)}}{H_{(\omega^2)}} = \frac{A_n\omega^{2n}+A_{n-2}\omega^{2n-2}+\ \ldots\ +A_0}{B_n\omega^{2n}+B_{n-2}\omega^{2n-2}+\ \ldots\ +B_0} \quad (84)$$

where the $A:s$ and $B:s$ are real constants.

Then, it is found that real roots of $H_{(\omega^2)}$ are equal to the negative squares of real roots of $h_{(\lambda)}$.

If we know the real roots of $H_{(\omega^2)}$ then, letting such a root be $\sigma_r$, the corresponding root $\lambda_r$ say, of $h_{(\lambda)}$ is found from:

$$\lambda_r = -\sqrt{-\sigma_r} \quad (85)$$

The minus sign in front of the radical simply implies that the $\lambda_r$ falling on the negative real axis should be considered, and the minus sign inside the radical makes the radical itself real, because $\sigma_r$ is always negative.

Besides negative real roots $H_{(\omega^2)}$ may, however, also contain conjugate pairs of complex roots.

In this case it is readily seen that if a pair of such roots be represented by a factor:

$$M_2\omega^4 + M_1\omega^2 + M_0 \quad (86)$$

then, the corresponding factor in $h_{(\lambda)}$ will be given by:

$$+\sqrt{M_2}\lambda^2 + [+\sqrt{M_1 + 2\sqrt{M_0M_2}}]\lambda + \sqrt{M_0} \quad (87)$$

In this manner we can, by the aid of $H_{(\omega^2)}$, equation (85) and the expression (87), determine $h_{(\lambda)}$ but for an arbitrary positive constant factor.

This factor, however, is determined, by a comparison of the coefficients for the highest (say) power of $\omega^2$ in $H_{(\omega^2)}$ and of the highest power of $\lambda$ in the obtained $\lambda$-function, from:

$$B_n = \sum_{s=-\infty}^{+\infty} b_{r+s} b_{r-s} (-1)^s \quad (88)$$

where $B_n$ is the coefficient of the highest power of $\omega^2$ in $H_{(\omega^2)}$ and $b_r$ the coefficient of the highest power of $\lambda$ in $h_{(\lambda)}$ to be found. The factor then to multiply the generated $\lambda$-function by, in order to obtain $h_{(\lambda)}$, is $b_r$ divided by the coefficient for the highest power of $\lambda$ in the generated $\lambda$-function.

The relation which should hold is:

$$B_n = b_n{}^2 \quad (88a)$$

Now $h_{(\lambda)}$ is known and it remains to find $g_{(\lambda)}$. This, however, is simply accomplished by the aid of the equations:

$$A_r = \sum_{s=-\infty}^{+\infty} a_{r+s} b_{r-s} (-1)^s \quad (89)$$

where each $A_r$ is a coefficient of $G_{(\omega^2)}$ in (84), $b_r$ is the coefficient of $\lambda^r$ in $h_{(\lambda)}$ found above, and $a_r$ is the coefficient of $\lambda^r$ in $g_{(\lambda)}$ we are looking for.

Now $g_{(\lambda)}$ is also found and $f_{(\lambda)}$ in (83) is uniquely determined.

The method of generation will be more clear from the illustrating example, shown in the following.

Let us in this item illustrate our general method during one cycle. Then, the following cycles are exactly analogous, although only once we need to extract a positive real function.

Thus, let us assume that each one of a set of $\alpha:s$ (having no poles on the boundary):

$$\left. \begin{array}{l} \alpha_{11} = \dfrac{g_{1(\lambda)}}{h_{(\lambda)}} \\[4pt] \alpha_{nn} = \dfrac{g_{n(\lambda)}}{h_{(\lambda)}} \\[4pt] \alpha_{1n} = \dfrac{g_{1n(\lambda)}}{h_{(\lambda)}} \end{array} \right\} \quad (15)$$

is of the $$\frac{n\text{th}}{n\text{th}}$$

degree in $\lambda$, and that the determinant of their real parts along the boundary is $>$ zero for some, or all, real $\omega:s$. Then the determinant of said $\alpha:s$ is of the $$\frac{2n\text{th}}{2n\text{th}}$$

degree in $\lambda$.

After having "split up" $\alpha_{nn}$, say, the extracted "positive real" function, $Y_n$, is separately generated and realized, leaving:

$$\alpha_{nn}' = \frac{g_{n(\lambda)}'}{h_{(\lambda)} h_{(\lambda)}'}$$

of the $$\frac{(2n)\text{th}}{(2n)\text{th}}$$

degree in $\lambda$.

The new set of functions, corresponding to the "reduced" matrix, is:

$$\left. \begin{array}{l} \alpha_{11} = \dfrac{g_{1(\lambda)}}{h_{(\lambda)}} \\[4pt] \alpha_{nn}' = \dfrac{g_{n(\lambda)}'}{h_{(\lambda)} h_{(\lambda)}'} \\[4pt] \alpha_{1n} = \dfrac{g_{1n(\lambda)}}{h_{(\lambda)}} \end{array} \right\} \quad (90)$$

Their determinant:

$$(\alpha_{11} \alpha_{nn}' - \alpha_{1n}^2) = \frac{\lambda h_{(\lambda)} \Delta_{(\lambda)}}{h_{(\lambda)}^2 h_{(\lambda)}'}$$

which ordinarily would have been of the $$\frac{(3n)\text{th}}{(3n)\text{th}}$$

degree, is due to its zeros at the origin and at $\infty$, only of the $$\frac{(3n-1)\text{th}}{(3n)\text{th}}$$

degree, with a $\lambda$ as a factor in the numerator. In addition, we know that $h$ is a factor in the numerator, i. e. after cancellation of this latter factor the above determinant is of the $$\frac{(2n-1)\text{th}}{(2n)\text{th}}$$

degree only.

Now, we "switch" to obtain the $\beta:s$, by the aid of (8), and get:

$$\left. \begin{array}{l} \beta_{11} = \dfrac{g_{n(\lambda)}'}{\lambda \Delta_{(\lambda)}} = \dfrac{k_1}{\lambda} + k_1' \lambda + \dfrac{g_{1(\lambda)}''}{\Delta_{(\lambda)}} \\[6pt] \beta_{nn} = \dfrac{g_{1(\lambda)} h_{(\lambda)}'}{\lambda \Delta_{(\lambda)}} = \dfrac{k_n}{\lambda} + k_n' \lambda + \dfrac{g_{n(\lambda)}''}{\Delta_{(\lambda)}} \\[6pt] \beta_{1n} = \dfrac{g_{1n(\lambda)} h_{(\lambda)}'}{\lambda \Delta_{(\lambda)}} = \dfrac{k_{1n}}{\lambda} + k_{1n}' \lambda + \dfrac{g_{1n(\lambda)}''}{\Delta_{(\lambda)}} \end{array} \right\} \quad (91)$$

where the $k:s$ and $k':s$ are the residues of the $\beta:s$ at the origin and at $\infty$, respectively.

Before the poles are removed the $\beta:s$ are of the $$\frac{(2n)\text{th}}{(2n-1)\text{th}}$$

degree.

Thus, the members of the component family to the right ($\beta'':s$ say) are of the $$\frac{(2n-2)\text{th}}{(2n-2)\text{th}}$$

degree.

Their determinant:

$$\beta_{11}'' \beta_{nn}'' - \beta_{1n}''^2 = \frac{\lambda \Delta_{(\lambda)} \Delta_{1(\lambda)}}{\Delta_{(\lambda)}^2}$$

instead of being of the $$\frac{(4n-4)\text{th}}{(4n-4)\text{th}}$$

degree, is, due to the zeros at the origin and at $\infty$, and due to the cancellation of $\Delta_{(\lambda)}$, only of the $$\frac{(2n-3)\text{th}}{(2n-2)\text{th}}$$

degree with a $\lambda$ as a factor in the numerator.

Forming the $\alpha'':s$ (from the $\beta'':s$), by the aid of (7), we get:

$$\left. \begin{array}{l} \alpha_{11}'' = \dfrac{g_{n(\lambda)}''}{\lambda \Delta_{1(\lambda)}} = \dfrac{k_1''}{\lambda} + k_1''' \lambda + \dfrac{g_{1(\lambda)}'''}{\Delta_{1(\lambda)}} \\[6pt] \alpha_{nn}'' = \dfrac{g_{1(\lambda)}''}{\lambda \Delta_{1(\lambda)}} = \dfrac{k_n''}{\lambda} + k_n''' \lambda + \dfrac{g_{n(\lambda)}'''}{\Delta_{1(\lambda)}} \\[6pt] \alpha_{1n}'' = \dfrac{g_{1n(\lambda)}''}{\lambda \Delta_{1(\lambda)}} = \dfrac{k_{1n}''}{\lambda} + k_{1n}''' \lambda + \dfrac{g_{1n(\lambda)}'''}{\Delta_{1(\lambda)}} \end{array} \right\} \quad (92)$$

where the $k'':s$ and $k''':s$ are residues.

The $\alpha'':s$ are before the removal of the poles of the $$\frac{(2n-2)\text{th}}{(2n-3)\text{th}}$$

degree, i. e. the members of the component family to the right ($\alpha''':s$ say) are of the $$\frac{(2n-4)\text{th}}{(2n-4)\text{th}}$$

degree.

The determinant:

$$\alpha_{11}''' \times \alpha_{nn}''' - \alpha_{1n}'''^2 = \frac{\lambda \Delta_{1(\lambda)} \Delta_{2(\lambda)}}{\Delta_{1(\lambda)}^2}$$

is, after cancellations of factors, of the $$\frac{(2n-5)\text{th}}{(2n-4)\text{th}}$$

degree with a $\lambda$ as a factor in the numerator.

Here we have completed one cycle!

It should be pointed out that due to the property of the functions characterizing the "reduced" network, the determinant of each set of residues of (91) and (92), as well as of every following set during the evaluation procedure, is singular, i. e. equal to zero. Also the determinant of the constants in the final cycle is singular, due to (79), and consequently every not subdivided component network of the "reduced" network contains a single element.

Note that the determinant of the prescribed "positive real" matrix after removal of poles on the boundary was of the $$\frac{(2n)\text{th}}{(2n)\text{th}}$$

degree in $\lambda$, while the above $\alpha'''$-determinant is of the $$\frac{(2n-5)\text{th}}{(2n-4)\text{th}}$$

degree only, i. e. in one single cycle the power of $\lambda$ in the numerator has decreased 5 units and in the denominator 4 units, in spite of the fact that the power of $\lambda$ in $\alpha_{nn}'$ was stepped up (somewhat artificially) to twice as high a value as the power of $\lambda$ in $\alpha_{nn}$. Then, in each subsequent cycle the power of $\lambda$ goes down 4 units in the numerator as well as in the denominator.

It should be pointed out, that in case the "positive real" $\alpha$- or $\beta$-matrix which corresponds to the "reduced" matrix $$\begin{Vmatrix} A' & B' \\ C' & D' \end{Vmatrix}$$

is singular then no "switching" can be done.

It can readily be proved, however, (see Gewertz, "Network Synthesis", referred to above) that every singular "positive real" matrix always is realizable in one single step,—if $\alpha$-matrix into either one of the structures shown in Fig. 12 and if $\beta$-matrix into either one of the structures shown in Fig. 13, although the transformer shown may or may not be needed in case its ratio is 1:1.

For an illustration, consider a "positive real" $\alpha$-matrix having the elements (the equations in this example will be numbered 1, 2, 3, etc.):

$$\left.\begin{aligned}\alpha_{11} &= \frac{2\lambda^3+5\lambda^2+5\lambda+1}{\lambda^2+2\lambda+2} \\ \alpha_{nn} &= \frac{8\lambda^3+18\lambda^2+18\lambda+1}{\lambda^2+2\lambda+2} \\ \alpha_{1n} &= \frac{3\lambda^3+7\lambda^2+7\lambda-1}{\lambda^2+2\lambda+2}\end{aligned}\right\} \quad (1)$$

After removal of inherent poles on the boundary (here at $\infty$) we get:

$$\left.\begin{aligned}\alpha_{11} &= 2\lambda + \frac{\lambda^2+\lambda+1}{\lambda^2+2\lambda+2} \\ \alpha_{nn} &= 8\lambda + \frac{2\lambda^2+2\lambda+1}{\lambda^2+2\lambda+2} \\ \alpha_{1n} &= 3\lambda + \frac{\lambda^2+\lambda-1}{\lambda^2+2\lambda+2}\end{aligned}\right\} \quad (2)$$

The component family to the left can separately be realized, and letting the members of the component family to the right simply be $\alpha$:s we get when solving for their real and imaginary parts, along the boundary:

$$\left.\begin{aligned}\alpha_{11(j\omega)} &= \frac{\omega^4-\omega^2+2}{\omega^4+4}+j\omega\frac{\omega^2}{\omega^4+4} = r_1+jx_1 \\ \alpha_{nn(j\omega)} &= \frac{2\omega^4-\omega^2+2}{\omega^4+4}+j\omega\frac{2\omega^2+2}{\omega^4+4} = r_n+jx_n \\ \alpha_{1n(j\omega)} &= \frac{\omega^4+\omega^2-2}{\omega^4+4}+j\omega\frac{\omega^2+4}{\omega^4+4} = r_{1n}+jx_{1n}\end{aligned}\right\} \quad (3)$$

Make the extraction to the right, say, and we find the real part of $Y_n$, along the boundary, to be:

$$Y_{nr} = \frac{r_1 r_n - r_{1n}^2}{r_1} = \frac{\omega^8-5\omega^6+10\omega^4}{(\omega^4+4)(\omega^4-\omega^2+2)} \quad (4)$$

Then, the denominator of (4) is, by the aid of the expressions (86) and (87), found to generate the corresponding $\lambda$-expression.

$$(\lambda^2+2\lambda+2)(\lambda^2+1.352193\lambda+1.414213) \quad (5)$$

The proportionality factor is, from above $\lambda$-expression and the denominator of (4), by the aid of (88) found to be 1, i. e. (5) is the denominator of $Y_n$ (as well as of $\alpha_{nn}'$).

Then, denoting the coefficients in the numerator of (4) by $A_4 A_3 \ldots A_0$, we get, by the aid of (89):

$$\left.\begin{aligned}A_0 &= 0 = a_0 b_0 \\ A_1 &= 0 = a_1 b_1 - (a_0 b_2 + a_2 b_0) \\ A_2 &= 10 = a_2 b_2 - (a_1 b_3 + a_3 b_1) + (a_0 b_4 + a_4 b_0) \\ A_3 &= -5 = a_3 b_3 - (a_2 b_4 + a_4 b_2) \\ A_4 &= 1 = a_4 b_4\end{aligned}\right\} \quad (6)$$

The solution of (6) gives:

$$\left.\begin{aligned}a_0 &= 0 \\ a_1 &= 1.673668 \\ a_2 &= 3.273942 \\ a_3 &= 1.310349 \\ a_4 &= 1\end{aligned}\right\} \quad (7)$$

and we have our $Y_n$ as:

$$Y_n = \frac{\lambda^4+1.310349\lambda^3+3.273942\lambda^2+1.673668\lambda}{\lambda^4+3.352193\lambda^3+6.118600\lambda^2+5.532814\lambda+2.828427} \quad (8)$$

This is readily found to be a "positive real" function and can be realized by known methods, (see Brune's article, referred to in the foregoing).

Then, $\alpha_{nn}'$ can be found from:

$$\alpha_{nn}' = \alpha_{nn} - Y_n$$

and is found to be:

$$\alpha_{nn}' = \frac{\lambda^4+3.394037\lambda^3+3.258871\lambda^2+2.506952\lambda+1.414213}{(\lambda^2+2\lambda+2)(\lambda^2+1.352193\lambda+1.414213)} \quad (9)$$

As a check let $$r_n' = \frac{r_{1n}^2}{r_1}$$

generate $\alpha_{nn}'$ in the same way as $Y_{nr}$ generated $Y_n$.

We have:

$$r_n' = \frac{r_{1n}^2}{r_1} = \frac{\omega^8+2\omega^6-3\omega^4-4\omega^2+4}{(\omega^2+4)(\omega^4-\omega^2+2)} \quad (10)$$

The denominator of $\alpha_{nn}'$ is naturally (5) and, by the aid of (89), we get:

$$\left.\begin{aligned}A_0 &= 4 = a_0 b_0 \\ A_1 &= -4 = a_1 b_1 - (a_0 b_2 + a_2 b_0) \\ A_2 &= -3 = a_2 b_2 - (a_1 b_3 + a_3 b_1) + (a_0 b_4 + a_4 b_0) \\ A_3 &= 2 = a_3 b_3 - (a_2 b_4 + a_4 b_2) \\ A_4 &= 1 = a_4 b_4\end{aligned}\right\} (11)$$

The solution of (11) gives:

$$\left.\begin{aligned}a_0 &= 1.414213 \\ a_1 &= 2.506949 \\ a_2 &= 3.258871 \\ a_3 &= 3.394037 \\ a_4 &= 1.0\end{aligned}\right\} \quad (12)$$

and we get our $\alpha_{nn}'$:

$$\alpha_{nn}' = \frac{\lambda^4 + 3.394037\lambda^3 + 3.258871\lambda^2 + 2.506949\lambda + 1.414213}{(\lambda^2 + 2\lambda + 2)(\lambda^2 + 1.352193\lambda + 1.414213)} \quad (13)$$

As required, we have practically a cold check between (9) and (13).

Further, note that the power of $\lambda$ in $Y_n$ and $\alpha_{nn}'$ is twice as high as in $\alpha_{nn}$, which is correct, and if adding $Y_n$ and $\alpha_{nn}'$ they (as they should) give $\alpha_{nn}$.

Now, when forming the determinant $$(\alpha_{11}\alpha_{nn}' - \alpha_{1n}^2)$$

its numerator should be of the fifth degree and its denominator of the sixth degree in $\lambda$. Further, $\lambda$ and $(\lambda^2 + 2\lambda + 2)$ should become factors in the numerator. This actually happens as:

$$(\alpha_{11}\alpha_{nn}' - \alpha_{1n}^2) = \frac{\lambda(1.041841\lambda^4 + 4.534298\lambda^3 + 9.683608\lambda^2 + 10.298620\lambda + 5.397392)}{(\lambda^2 + 2\lambda + 2)^2(\lambda^2 + 1.352193\lambda + 1.414213)}$$

$$= \frac{\lambda(\lambda^2 + 2\lambda + 2)(1.041841\lambda^2 + 2.450616\lambda + 2.698695)}{(\lambda^2 + 2\lambda + 2)^2(\lambda^2 + 1.352193\lambda + 1.414213)} \quad (14)$$

When forming the $\beta$:s, two (at least) poles on the boundary should "fall out", that is, can be removed from the boundary. Then, what remains should, at most, be of the second degree in $\lambda$ (in the numerator as well as in the denominator).

Further, the determinant of the residues of the removed poles should be=0.

We get:

$$\beta_{11} = \frac{\lambda^4 + 3.394037\lambda^3 + 3.258871\lambda^2 + 2.506950\lambda + 1.414213}{\lambda(1.041841\lambda^2 + 2.450616\lambda + 2.698695)} =$$
$$\frac{.524035}{\lambda} + .959839\lambda + \frac{1.041841\lambda^2 + .122598\lambda + 1.222742}{1.041841\lambda^2 + 2.450616\lambda + 2.698695}$$

$$\beta_{nn} = \frac{(\lambda^2 + \lambda + 1)(\lambda^2 + 1.352193\lambda + 1.414213)}{\lambda(1.041841\lambda^2 + 2.450616\lambda + 2.698695)} =$$
$$\frac{\lambda^4 + 2.352193\lambda^3 + 3.766406\lambda^2 + 2.766406\lambda + 1.414213}{\lambda(1.041841\lambda^2 + 2.450616\lambda + 2.698695)} =$$
$$\frac{.524035}{\lambda} + .959839\lambda + \frac{.630132\lambda + 1.482198}{1.041841\lambda^2 + 2.450616\lambda + 2.698695} \quad (15)$$

$$\beta_{1n} = \frac{(\lambda^2 + \lambda - 1)(\lambda^2 + 1.352193\lambda + 1.414213)}{\lambda(1.041841\lambda^2 + 2.450616\lambda + \ldots)} =$$
$$\frac{\lambda^4 + 2.352193\lambda^3 + 1.766406\lambda^2 + 0.062020\lambda - 1.414213}{\lambda(1.041841\lambda^2 + \ldots)} =$$
$$\frac{-.524035}{\lambda} + .959839\lambda + \frac{-.277945\lambda + 1.346228}{1.041841\lambda^2 + 2.450616\lambda + 2.698695}$$

The poles on the boundary removed, from the $\beta$:s do not change said functions' real parts, which are:

$$h_1 = \frac{1.085432\omega^4 - 3.785073\omega^2 + 3.299807}{1.085432\omega^4 + .382296\omega^2 + 7.282954}$$

$$h_n = \frac{4.000000}{1.085432\omega^4 + .382296\omega^2 + 7.282954} \quad (16)$$

$$h_{1n} = \frac{-2.083691\omega^2 + 3.633058}{1.085432\omega^4 + .382296\omega^2 + \ldots}$$

Then, the determinant of the $h$:s should be =0.

$$h_1 h_n - h_{1n}^2 = \frac{4(1.085432\omega^4 - 3.785073\omega^2 + 3.299807) - (-2.083691\omega^2 + 3.633058)^2}{(1.085432\omega^4 + .382296\omega^2 + 1.282954)^2} \quad (17)$$

i. e., it is=0.

Denoting the $\beta$:s of (15), after the two poles have "fallen out," with $\beta''$:s and forming the $\beta''$-determinant, then $\lambda$ and $$(1.041841\lambda^2 + 2.450616\lambda + 2.698695)$$

should become factors in its numerator.

$$\beta_{11}''\beta_{nn}'' - \beta_{1n}''^2 = \frac{\lambda(.656498\lambda^2 + 1.544214\lambda + 1.700558)}{(1.041841\lambda^2 + 2.450616\lambda + 2.698695)^2} = \frac{.630132(1.041841\lambda^2 + 2.450616\lambda + 2.698695)}{(1.041841\lambda^2 + 2.450616\lambda + 2.698695)^2} \quad (18)$$

When "switching" to obtain the $\alpha''$:s, two poles (if as many are left) should again "fall out" from each $\alpha$ leaving a rest which should be a real constant. The determinant of the residues, of the poles, removed from the boundary, should again be=0, and in addition, the determinant of said constants should also be=0. The $\alpha''$:s are found to be $$\alpha_{11}'' = \frac{.630132\lambda + 1.482198}{.630132\lambda}$$

$$\alpha_{nn}'' = \frac{1.041841\lambda^2 + .122598\lambda + 1.222742}{.630132\lambda} \quad (19)$$

$$\alpha_{1n}'' = \frac{-.277945\lambda + 1.346228}{.630132\lambda}$$

$$\alpha_{11}'' = \frac{2.352202}{\lambda} + 1.0$$

$$\alpha_{nn}'' = 1.653369\lambda + \frac{1.940453}{\lambda} + .1945592 \quad (20)$$

$$\alpha_{1n}'' = \frac{2.136422}{\lambda} - .441090$$

i. e., the prescribed functions exactly followed predicted requirements, and the network representation is, for instance, as shown in Fig. 44.

$Y_n$ is given by (8) and can be realized into a dissipative two-terminal network having at most 8 elements.

On the other hand, had the prescribed functions, as given by (1), been $\beta$:s, then we would have to give the extracted "positive real" function (8) an interpretation as an impedance. Otherwise the evaluation procedure of the prescribed matrix would be exactly analogous to the one given in this example, although the network representation in case of a prescribed $\beta$-matrix would, for instance, be as shown in Fig. 45.

It should be added that at any stage of the evaluation procedure the component family to the right of the shown partial fraction expansions may happen to be such that the determinant of the members of said family has become singular.

In this case no further "switching" can be done, but (instead of proceeding until in the final end of the procedure we get a component family whose members are all real constants realizable into a purely resistive component network, the resistance being embodied in one single element) said component family is directly realized into a dissipative structure containing both reactance and resistance elements and this structure comprises one single two-terminal network.

For an illustration, consider the elements of a "positive real" matrix:

$$\alpha_{11} = \frac{\lambda^3 + 20\lambda^2 + 16\lambda + 2}{2\lambda^2 + 3\lambda + 1}$$

$$\alpha_{nn} = \frac{\lambda^3 + 22\lambda^2 + 27\lambda + 8}{2\lambda^2 + 3\lambda + 1}$$

$$\alpha_{1n} = \frac{\lambda^3 + 15\lambda^2 + 14\lambda + 3}{2\lambda^2 + 3\lambda + 1}$$

Removing the poles at $\infty$, as shown below:

$$\alpha_{11} = \frac{\lambda}{2} + \frac{18.5\lambda^2 + 15.5\lambda + 2}{2\lambda^2 + 3\lambda + 1}$$

$$\alpha_{nn} = \frac{\lambda}{2} + \frac{20.5\lambda^2 + 26.5\lambda + 8}{2\lambda^2 + 3\lambda + 1}$$

$$\alpha_{1n} = \frac{\lambda}{2} + \frac{13.5\lambda^2 + 13.5\lambda + 3}{2\lambda^2 + 3\lambda + 1}$$

and applying the general method of this heading to the component family to the right we get, when splitting up $\alpha_{nn}$, say:

$$Y_n = \frac{64.773195\lambda^4 + 156.738687\lambda^3 + 132.085609\lambda^2 + 44.854279\lambda + 4.949749}{(2\lambda^2 + 3\lambda + 1)(6.082763\lambda^2 + 6.419084\lambda + 1.414213)}$$

and $$\alpha_{nn}' = \frac{59.923426\lambda^4 + 136.045613\lambda^3 + 115.673570\lambda^2 + 43.975067\lambda + 6.363963}{(2\lambda^2 + 3\lambda + 1)(6.082763\lambda^2 + 6.419084\lambda + 1.414213)}$$

Then $$\alpha_{11}\alpha_{nn}' - \alpha_{1n}^2 = \frac{\lambda(2\lambda^2 + 3\lambda + 1)(29.305890\lambda^2 + 40.906716\lambda + 14.267979)}{(2\lambda^2 + 3\lambda + 1)^2(6.082763\lambda^2 + 6.419084\lambda + 1.414213)}$$

and after "switching":

$$\beta_{11} = \frac{\alpha_{nn}'}{\alpha_{11}\alpha_{nn}' - \alpha_{1n}^2} = k_1\lambda + \frac{k_1'}{\lambda} + \beta_{11}''$$

$$\beta_{nn} = \frac{\alpha_{11}}{\alpha_{11}\alpha_{nn}' - \alpha_{1n}^2} = k_n\lambda + \frac{k_n'}{\lambda} + \beta_{nn}''$$

$$\beta_{1n} = \frac{\alpha_{1n}}{\alpha_{11}\alpha_{nn}' - \alpha_{1n}^2} = k_{1n}\lambda + \frac{k_{1n}'}{\lambda} + \beta_{1n}''$$

For the above component families not only $$(k_1 k_n - k_{1n}^2) \text{ is } = 0$$

and $(k_1' k_n' - k_{1n}'^2)$ is $=0$ but also $$(\beta_{11}''\beta_{nn}'' - \beta_{1n}''^2)$$

is found to be $=0$, i. e. each one of the three component families is realizable into either one of the component structures shown in Fig. 13. Of these component structures the first one is purely inductive, the second one is purely capacitive and the third one is dissipative but having both resistance and reactance elements.

Naturally, the prescribed functions of this example could as well have been considered as being $\beta$:s, in which case the realization procedure would have been exactly the same though a different network representation would have been obtained.

Note that the above prescribed functions are the same as those used in the foregoing for the two kinds of elements case, bringing in the valuable and interesting fact that two equivalent networks need not necessarily contain the same combination of kinds of network elements.

For our deductions we have often been considering $\alpha$-functions only, but it may be pointed out that, due to the 100% analogy between the inherent features of a "positive real" $\alpha$-matrix and a "positive real" $\beta$-matrix, there is not a single transformation performed on a set of $\alpha$:s which can not as well be performed on a set of $\beta$:s, though naturally the network representation for a set of prescribed $\beta$:s is different from the one for the same set of functions if being $\alpha$:s.

*Definitions:* In this specification and the claims the following terms are to be understood as follows:

A finite network is one having a finite number of meshes.

A two-terminal network is one having only one input terminal and only one output terminal.

A four-terminal network is one having one pair of input terminals and one pair of output terminals.

A passive network is one which under no conditions can generate energy.

A symmetrical four-terminal network is a network whose diagram of connections does not change if turned over 180 degrees in two directions, 90 degrees in respect to each other (note a four-terminal network having equal driving-point functions need not necessarily be symmetrical).

By connecting a two-terminal network in series with one of the main terminating leads of a four-terminal network is to be understood that said series connection is made in such a manner that one terminal of the two-terminal network is joined to one of the main terminals, at one of the two ends, of the four-terminal network, while the other terminal of said two-terminal network is a main terminal of a four-terminal network which now comprises said two-terminal network and said four-terminal network, as clearly shown in Fig. 43 and Fig. 45.

By parallel connection and series connection, respectively, of four-terminal networks is to be understood that the same type of connection is employed at both ends, that is, both the input terminals and the output terminals of the networks under consideration are connected in parallel or in series, respectively, as clearly shown, for example, in Figs. 18 and 19. In Figs. 44 and 45 parallel and series connection, respectively, of component networks, when one of them is a two-terminal network, is also illustrated.

In summary, it will be evident that I have provided a general method for the design of finite four-terminal electrical networks having prescribed characteristics, namely two driving-point functions and a transfer function.

In the beginning of this specification I have described in detail the manner of realizing simple four-terminal networks from various types of positive real matrices or component families whose members are elements of such a matrix having the specific feature that a constant ratio exists between certain or all of its elements These simple networks are well-known structures, such as the T-structure, Π-structure, L-structure, lattice structure, etc.; and while my method of realizing such structures may be new, I do not claim these network structures as my invention.

I have further described under the Heading I methods of finding the network representation of functions characterizing four-terminal networks containing two kinds of elements only. The resultant networks are claimed in my co-pending application Serial No. 609,428.

In the present specification I have further described under II and III methods for finding the network representation of functions characterizing all other kinds of networks including those containing all three kinds of network elements, inductance, capacitance and resistance.

The networks resulting from the procedure set forth under II may not in all cases be passive and for this reason I prefer to use the procedure set forth under III which is a modification of that described under II and in all cases leads to passive structures.

The networks resulting from the application of the principles discussed under II and III have in nearly all cases the novel characteristic that they are formed of a plurality of groups of component networks, the component networks in each group being connected in series or in parallel with each other and the last component network of any one group being composed of all the succeeding groups of component networks.

To make this structure clear, reference is made to Figures 46 and 47 in which this structure is schematically represented. These figures are similar except that in Figure 46 the network was designed from admittance functions and in Figure 47 from impedance functions. In Figure 46 the first group, Group 1, contains the component networks $b'_1$, $b'_2$ and $b'_3$ all connected together in series through transformers at one end. These transformers may, of course, not all be necessary as has been explained in the foregoing. Furthermore, not all of the component networks need be four-terminal networks and there may be more than three in a group, as has also been explained.

It will now be noted that the last component network of Group 1, viz. $b'_3$ comprises all the succeeding groups of component networks. Similarly Group 2 contains the component networks $c'_1$, $c'_2$ and $c'_3$ connected in parallel with each other where $c'_3$ contains all the remaining groups. In the case illustrated Group 3 is the last group and contains the component networks $d'_1$, $d'_2$ and $d'_3$ connected together in series.

It will also be noted that in Figure 46 a four-terminal component network $a'$ is connected in parallel with the remainder of the network. This, of course, corresponds to the structure representing poles on the boundary inherent in the prescribed functions and removed. There is also a two-terminal network $Y_n$ connected across one of the main terminals of the total network. This structure represents the "extracted matrix".

Figure 47 is similar to Figure 46 but the connections of the component networks is opposite and, of course, the two-terminal network $Z_n$ is connected in series with one of the main terminating leads of the entire network.

The structures shown in Figures 46 and 47 represent those of the networks resulting in general from the application of my methods outlined under III although the units $a'$, $a''$, $Y_n$ and $Z_n$ are not always present. So, also, as has been mentioned, the number of component networks within a group and the number of groups may vary, but where there are two or more groups, the component networks of the successive groups are alternately connected in series and in parallel.

The networks resulting from the application of the procedure outlined under II also have the group structure shown in Figures 46 and 47, but in addition each group has a two-terminal network in series or in parallel with it as indicated, for example, in Figures 33 and 34.

In addition to the group structure above mentioned, my networks in many cases also have other distinguishing characteristics in the relationships between the magnitudes of the elements in the several component networks to each other and to the whole structure, as will be evident to those skilled in the art.

Having now described my invention, I claim:

1. A finite, dissipative four-terminal electrical network, of lumped network elements, including a plurality of component networks, said component networks being connected together to form a plurality of successive groups and so that the last component network of any one group includes all the succeeding groups of component networks, the component networks of every alternate group being connected in series and in parallel, respectively.

2. A finite four-terminal electrical network, of lumped network elements, including $n$ groups, $n$ being any positive integer greater than one, each group containing a plurality of component networks of which at least one is a four-terminal network; the successive groups being connected in such a manner that the $n$th group forms the last component network of the $(n-1)$th group, the $(n-1)$th group forms the last component network of the $(n-2)$th group, and so on; the successive groups having alternately their component networks connected in parallel—in series—in parallel—in series—etc., and vice versa.

3. A finite four-terminal electrical network according to claim 2 in which at least one group contains a plurality of four-terminal component networks, characterized by the fact that the parallel and series connection of said four-terminal component networks is made by the aid of transformers.

4. A finite four-terminal electrical network, of lumped network elements, including $n$ groups, $n$ being any positive integer greater than one, each group containing a plurality of component networks, of which at least one is a four-terminal network; the successive groups being connected in such a manner that the $n$th group forms the last component network of the $(n-1)$th group, the $(n-1)$th group forms the last component network of the $(n-2)$th group, and so on; the successive groups having alternately their component networks connected in parallel—in series—in parallel—in series—, etc., and vice versa; each group containing one or more transformers, each transformer forming part of a four-terminal component network, whereby the current entering any one of the component networks is forced to be equal to the current leaving it, at the same end thereof.

5. A finite four-terminal electrical network, of lumped network elements, including $n$ groups, $n$ being any positive integer greater than one, each group containing a plurality of component networks of which at least one is a four-terminal network; the successive groups being connected in such a manner that the $n$th group forms the last component network of the $(n-1)$th group, the $(n-1)$th group forms the last component network of the $(n-2)$th group, and so on; the successive groups having alternately their component networks connected in parallel—in series—in parallel—in series—etc., and vice versa; a group containing $m$ purely reactive component networks, $m$ being any positive integer, connected in parallel with each other, being connected in parallel with the four-terminal network specified above when the first group of that network contains a plurality of component networks connected in series with each other, while a group containing said $m$ purely reactive component networks, connected in series with each other, is connected in series with the four-terminal network specified above when the first group of that network contains a plurality of component networks connected in parallel with each other, respectively.

6. A finite, dissipative four-terminal electrical network, of lumped network elements, including $n$ groups, $n$ being any positive integer greater than one, each group containing a plurality of component networks, of which at least one is a four-terminal network; the successive groups being connected in such a manner that the $n$th group forms the last component network of the $(n-1)$th group, the $(n-1)$th group forms the last component network of the $(n-2)$th group, and so on; the successive groups having alternately their component networks connected in parallel—in series—in parallel—in series—etc., and vice versa; a dissipative two-terminal network being bridged across one pair of the main terminals of the four-terminal network specified above when the first group of that network contains a plurality of component networks connected in series with each other, while a dissipative two-terminal network is connected in series with one of the main terminating leads of the four-terminal network specified above when the first group of that network contains a plurality of component networks connected in parallel with each other, respectively.

7. A finite four-terminal electrical network, of lumped network elements, comprising $n$ groups, $n$ being any positive integer greater than one, each group containing a plurality of component networks; the driving-point functions (short-circuit driving-point admittances or open-circuit driving-point impedances, respectively) and the transfer function (short-circuit transfer admittance or open-circuit transfer impedance, respectively) of each of the successive component networks within a group being substantially equal to the respective terms of the corresponding component family in partial fraction expansions of said group's driving-point functions and transfer function; the component networks within a group being connected in parallel with each other when being network representations of component families in partial fraction expansions of admittance functions, while in series with each other when being network representations of component families in partial fraction expansions of impedance functions; the successive groups, when more than one, being connected together in such a manner that the $n$th group forms the last component network of the $(n-1)$th group, the $(n-1)$th group forms the last component network of the $(n-1)$th group, and so on; the successive groups having alternately their component networks connected in parallel—in series—in parallel—in series—, etc., and vice versa.

8. A finite four-terminal electrical network, of lumped network elements, comprising $n$ groups, $n$ being any positive integer greater than one, each group containing a plurality of component networks; the driving-point functions (short-circuit driving-point admittances or open-circuit driving-point impedances, respectively) and the transfer function (short-circuit transfer admittance or open-circuit transfer impedance, respectively) of each of the successive component networks within a group being substantially equal to the respective terms of the corresponding component family in partial fraction expansions of said group's driving-point functions and transfer function; the component networks within a group being connected in parallel with each other when being network representations of a sum of component families in partial fraction expansions of admittance functions, while in series with each other when being network representations of a sum component families in partial fraction expansions of impedance functions; the successive groups, when more than one, being connected together in such a manner that the $n$th group forms the last component network of the $(n-1)$th group, the $(n-1)$th group forms the last component network of the $(n-2)$th group, and so on; the successive groups having alternately their component networks connected in parallel—in series—in parallel—in series—, etc., and vice versa; a group containing $m$ purely reactive component networks, $m$ being any positive integer, connected in parallel with each other, being connected in parallel with the total four-terminal network specified above when the component networks of the first group of that network are network representations of a sum of impedance component families, while a group containing said $m$ purely reactive component networks, connected in series with each other, is connected in series with the total four-terminal network specified above when the component networks of the first group of that network are network-representations of a sum of admittance component families, respectively.

9. A finite four-terminal electrical network, of lumped network elements, comprising $n$ groups, $n$ being any positive integer greater than one, each group containing a plurality of component networks; the driving-point functions (short-circuit driving-point admittances or open-circuit driving-point impedances, respectively) and the transfer function (short-circuit transfer admittance or open-circuit transfer impedance, respectively) of each of the successive component networks within a group being substantially equal to the respective terms of the corresponding component family in partial fraction expansions of said group's driving-point functions and transfer function; the component networks within a group being connected in parallel with each other when being network representations of a sum of component families in partial fraction expansions of admittance functions, while in series with each other when being network representations of a sum of component families in partial fraction expansions of impedance functions; the successive groups, when more than one, being connected together in such a manner that the $n$th group forms the last component network of the $(n-1)$th group, the $(n-1)$th group forms the last component network of the $(n-2)$th group, and so on; the successive groups having alternately their component networks connected in parallel—in series—in parallel—in series—, etc., and vice versa; a dissipative two-terminal network being bridged across one pair of the main terminals of the total four-terminal network specified above when the component networks of the first group of that network are network representations of a sum of impedance component families, while a dissipative two-terminal network is connected in series with one of the main terminating leads of the total four-terminal network specified above when the component networks of the first group of that network are network representation of a sum of admittance component families, respectively.

10. A finite four-terminal electrical network, of lumped network elements, including $n$ groups, $n$ being any positive integer greater than one, each group containing a plurality of component networks of which at least two are four-terminal networks; the successive groups being connected together in such a manner that the $n$th group forms the last component network of the $(n-1)$th group, the $(n-1)$th group forms the last component network of the $(n-2)$th group, and so on; the successive groups having alternately their component networks connected in parallel—in series—in parallel—in series—etc., and vice versa; a dissipative two-terminal network, containing both resistance and reactance elements, being connected in shunt with the first group of the network specified above when that group contains a plurality of component networks connected in series with each other, or a dissipative two-terminal network of aforesaid character is connected in series with one of the main terminating leads of the first group of the network specified above when that group contains a plurality of component networks connected in parallel with each other, respectively; the last component network of each group being a dissipative four-terminal network, while the remaining component networks of each separate group are purely reactive; each group containing at least two transformers, each being installed at either end of a four-terminal component network.

11. A finite, dissipative four-terminal electrical network, containing lumped network elements, including a plurality of groups of component networks, the component networks of each alternate group being connected in series and in parallel, respectively; said series connected component networks being realizations of the corresponding component families of terms in partial fraction expansions of impedance functions while said parallel connected component networks are realizations of the corresponding component families of terms in partial fraction expansions of admittance functions; the successive groups being connected together in such a manner that each group forms the last component network of the preceding group.

12. A finite, dissipative four-terminal electrical network, containing lumped network elements, including a plurality of groups of component networks, the component networks of each alternate group being connected in series and in parallel, respectively; said series connected component networks being realizations of the corresponding component families of terms in partial fraction expansions of impedance functions, while said parallel connected component networks are realizations of the corresponding component families of terms in partial fraction expansions of admittance functions; the successive groups being connected together in such a manner that each group forms the last component network of the preceding group; a dissipative two-terminal network being bridged across one pair of the main terminals.

13. A finite, dissipative four-terminal electrical network, containing lumped network elements, including a plurality of groups of component networks, the component networks of each alternate group being connected in series and in parallel, respectively; said series connected component networks being realizations of the corresponding component families of terms in partial fraction expansions of impedance functions while said parallel connected component networks are realizations of the corresponding component families of terms in partial fraction expansions of admittance functions; the successive groups being connected together in such a manner that each group forms the last component network of the preceding group; a dissipative two-terminal network being connected in series with one of the main terminating leads.

14. A finite, dissipative four-terminal electrical network, containing lumped network elements, including a plurality of groups of component networks, the component networks of each alternate group being connected in series and in parallel, respectively, the successive groups being connected together in such a manner that each group forms the last component network of the preceding group; at least two of said component networks of each group being four-terminal networks and all not subdivided component networks, except one, being purely reactive, the latter being member of the very last group of component networks and being purely resistive.

15. A finite, dissipative four-terminal electrical network, containing lumped network elements, including a plurality of groups of component networks, the component networks of each alternate group being connected in series and in parallel, respectively, the successive groups being connected together in a manner that each group forms the last component network of the preceding group; at least two of said component networks of each group being four-terminal networks and all not subdivided component networks, except one, being purely reactive, the latter being member of the very last group of component networks and being purely resistive; a dissipative two-terminal network, containing both resistance and reactance elements, being bridged across one pair of the main terminals.

16. A finite, dissipative four-terminal electrical network, containing lumped network elements, including a plurality of groups of component networks, the component networks of each alternate group being connected in series and in parallel, respectively, the successive groups being connected together in such a manner that each group forms the last component network of the preceding group; at least two of said component networks of each group being four-terminal networks and all not subdivided component networks, except one, being purely reactive, the latter being member of the very last group of component networks and being purely resistive; a dissipative two-terminal network, containing both resistance and reactance elements, being connected in series with one of the main terminating leads.

17. A finite, dissipative four-terminal electrical network, containing lumped network elements, including a plurality of groups of component networks, the component networks of each alternate group being connected in series and in parallel, respectively, the successive groups being connected together in such a manner that each group forms the last component network of the preceding group; at least two of said component networks of each group being four-terminal networks and all not subdivided component networks, except one, being purely reactive, the latter being member of the very last group of component networks and being purely resistive, said non-reactive component network being a four-terminal network; a dissipative two-terminal network, containing both resistance and reactance elements, being bridged across one pair of the main terminals.

18. A finite, dissipative four-terminal electrical network, containing lumped network elements, including a plurality of groups of component networks, the component networks of each alternate group being connected in series and in parallel, respectively, the successive groups being connected together in such a manner that each group forms the last component network of the preceding group; at least two of said component networks of each group being four-terminal networks and all not subdivided component networks, except one, being purely reactive, the latter being member of the very last group of component networks and being purely resistive, said non-reactive component network being a four-terminal network; a dissipative two-terminal network, containing both resistance and reactance elements, being connected in series with one of the main terminating leads.

19. A finite, dissipative four-terminal electrical network, containing lumped network elements, comprising a dissipative two-terminal network connected in shunt with a plurality of component networks connected in series with each other, at least two of said component networks being four-terminal networks and one of said component networks being dissipative, said dissipative component network being a four-terminal network.

20. A finite, dissipative four-terminal electrical network, containing lumped network elements, comprising a dissipative two-terminal network connected in series with one of the main terminating leads of a four-terminal network containing a plurality of component networks connected in parallel with each other, at least two of said component networks being four-terminal networks and one of said component networks being dissipative, said dissipative component network being a four-terminal network.

21. A finite, dissipative four-terminal electrical network, containing lumped network elements, comprising a dissipative two-terminal network connected in shunt with a plurality of component networks connected in series with each other, at least two of said component networks being four-terminal networks and one of said component networks being dissipative, said series connection of the four-terminal component networks therewith being made by the aid of transformers.

22. A finite, dissipative four-terminal electrical network, containing lumped network elements, comprising a dissipative two-terminal network connected in series with one of the main terminating leads of a four-terminal network containing a plurality of component networks connected in parallel with each other; at least two of said component networks being four-terminal networks and one of said component networks being dissipative, said parallel connection of the four-terminal component networks therewith being made by the aid of transformers.

23. A finite, dissipative four-terminal electrical network, containing lumped network elements, including a dissipative two-terminal network, containing both resistance and reactance elements, said two-terminal network being bridged across one pair of the main terminals; said four-terminal network also including $n$ groups of component networks, $n$ being any positive integer greater than one, the component networks of each alternate group being connected in series and in parallel, respectively; the successive groups being formed in such a manner that the last component network in each group is split up into a plurality of new component networks, forming the next group, until in the last group the last component network is purely resistive; at least one of said component networks in each group being a four-terminal network; the dissipative parts of the total four-terminal network being limited to said purely resistive component network and to said dissipative two-terminal network; said two-terminal network being connected in shunt with the first one of said $n$ groups of component networks.

24. A finite, dissipative four-terminal electrical network, containing lumped network elements, including a dissipative two-terminal network, containing both resistance and reactance elements, said two-terminal network being connected in series with one of the main terminating leads; said four-terminal network also including $n$ groups of component networks, $n$ being any positive integer greater than one, the component networks of each alternate group being connected in series and in parallel, respectively; the successive groups being formed in such a manner that the last component network in each group is split up into a plurality of new component networks, forming the next group, until in the last group the last component network is purely resistive; at least one of said component networks in each group being a four-terminal network; the dissipative parts of the total four-terminal network being limited to said purely resistive component network and to said dissipative two-terminal network; said two-terminal network being connected in series with one of the main terminating leads of the first one of said $n$ groups of component networks.

25. A finite, dissipative four-terminal electrical network, containing lumped network elements, including a plurality of groups of component networks, the component networks of each alternate group being connected in series and in parallel, respectively; each of said groups containing a plurality of said component networks and each succeeding group of component networks forming the last component network of the preceding group, the last component network of the last group being purely resistive, while the remaining elements in said component networks are purely reactive.

26. A finite, dissipative four-terminal electrical network, containing lumped network elements, including a plurality of groups of component networks, the component networks of each alternate group being connected in series and in parallel, respectively; the last component network of each group being subdivided into a plurality of component networks forming the next group until in the last group the last component network is purely resistive, the resistance being embodied in one single element, all not subdivided component networks, except this latter one, being purely reactive and each containing one single reactance element.

27. A finite, dissipative four-terminal electrical network, containing lumped network elements, comprising a dissipative two-terminal network, containing both resistance and reactance elements, said two-terminal network being bridged across one pair of the main terminals; further comprising a purely reactive network connected in parallel with the rest of the four-terminal network, said rest comprising $n$ groups of component networks, $n$ being any positive integer greater than one, the component networks of each alternate group being connected in series and in parallel, respectively; the successive groups being formed in such a manner that the last component network of each group is split up into a plurality of new component networks, forming the next group, until in the very last group the last component network is a purely resistive network, containing one single resistance element; at least one of said component networks of each group being a four-terminal network; all not subdivided component networks of said groups, except said non-reactive component network, being purely reactive and each containing one single reactance element; said two-terminal network when bridged across one pair of the main terminals of the total four-terminal network it also is connected in shunt with one pair of the main terminals of the first group of said $n$ groups of component networks.

28. A finite, dissipative four-terminal electrical network, containing lumped network elements, comprising a dissipative two-terminal network, containing both resistance and reactance elements, said two-terminal network being connected in series with one of the main terminating leads; further comprising a purely reactive network connected in series with the rest of the four-terminal network, said rest comprising $n$ groups of component networks, $n$ being any positive integer greater than one, the component networks of each alternate group being connected in series and in parallel, respectively; the successive groups being formed in such a manner that the last component network of each group is split up into a plurality of new component networks, forming the next group, until in the very last group the last component network is a purely resistive network, containing one single resistance element; at least one of said component networks of each group being a four-terminal network; all not subdivided component networks of said groups, except said non-reactive component network, being purely reactive and each containing one single reactance element; said two-terminal network when connected in series with one of the main terminating leads of the total four-terminal network it also is connected in series with one of the main terminating leads of the first group of said $n$ groups of component networks.

29. A finite, dissipative four-terminal electrical network, of lumped network elements, comprising three component networks connected in series with each other, one of said component networks containing a single capacitance element, a second one containing a single inductance element while the third one is a dissipative four-terminal network; at least two of the component networks being four-terminal networks of which all, but one, contain each a transformer; a dissipative two-terminal network, containing both resistance and reactance elements, being bridged across one pair of the main terminals.

30. A finite, dissipative four-terminal electrical network, of lumped network elements, comprising three component networks connected in parallel with each other, one of said component networks containing a single capacitance element, a second one containing a single inductance element while the third one is a dissipative four-terminal network; at least two of the component networks being four-terminal networks of which all, but one, contain each a transformer; a dissipative two-terminal network, containing both resistance and reactance elements, being connected in series with one of the main terminating leads.

31. A finite, dissipative four-terminal electrical network, of lumped network elements, comprising a purely reactive network connected in parallel with three component networks connected in series with each other, one of said component networks containing a single capacitance element, a second one containing a single inductance element while the third one is a dissipative four-terminal network; at least two of the component networks being four-terminal networks of which all, but one, contain each a transformer; a dissipative two-terminal network, containing both resistance and reactance elements, being bridged across one pair of the main terminals.

32. A finite, dissipative four-terminal electrical network, of lumped network elements, comprising a purely reactive network connected in series with three component networks connected in parallel with each other, one of said component networks containing a single capacitance element, a second one containing a single inductance element while the third one is a dissipative four-terminal network; at least two of the component networks being four-terminal networks of which all, but one, contain each a transformer; a dissipative two-terminal network, containing both resistance and reactance elements, being connected in series with one of the main terminating leads.

33. A finite, dissipative four-terminal electrical network, containing lumped network elements, comprising a plurality of groups of component networks, the component networks of each alternate group being connected in series and in parallel, respectively; at least one component network of each group being a four-terminal network; the last component network of each group, with the exception of the last group, comprising a plurality of component networks forming the next succeeding group of component networks; the last component network of the last group being purely resistive; each group containing at least one transformer, each such transformer connecting the four-terminal component network of which it is a part to the other component networks of that group.

34. A finite, dissipative four-terminal electrical network, containing lumped network elements, whose driving-point functions, $f_{11(\lambda)}$ and $f_{nn(\lambda)}$, and transfer function, $f_{1n(\lambda)}$, have the general form:

$$f_{11(\lambda)} = \frac{g_{1(\lambda)}}{h_{(\lambda)}}$$
$$f_{nn(\lambda)} = \frac{g_{n(\lambda)}}{h_{(\lambda)}}$$
$$f_{1n(\lambda)} = \frac{g_{1n(\lambda)}}{h_{(\lambda)}}$$

said driving-point functions and transfer function being elements of a positive real matrix and having real parts which are such that the product of the real parts of the two driving-point functions minus the square of the real part of the transfer function is equal to zero for all real values of $\omega$, where $\omega$ is equal to $2\pi$ times frequency; said network comprising $n$ groups of component networks, where $n$ is any positive integer greater than one, the first group being a realization of poles on the boundary present in and subsequently removed from the driving-point functions and transfer function of the total four-terminal network, the second group of component networks being a realization of component families of terms in partial fraction expansions of the elements of a matrix which is the inverse of the matrix whose elements are the remainder of the functions of the total network, after removal of said inherent poles on the boundary, the last member of said second group being subdivided into further component networks forming a third group, said third group being a realization of component families of terms in partial fraction expansions of the elements of a matrix which is the inverse of the matrix whose elements are the remainder of the functions, expanded to obtain the component networks of said second group, after removal of produced poles on the boundary, the $n$th group of component networks being a realization of component families of terms in partial fraction expansions of the elements of a matrix which is the inverse of the matrix whose elements are the remainder of the functions expanded to obtain the component networks of the $(n-1)$th group, after removal of produced poles on the boundary, the last component network of said $n$th group being a realization of the component family of real constants in said last mentioned partial fraction expansions and being purely resistive.

35. A finite, dissipative four-terminal electrical network, containing lumped network elements, whose short-circuit driving-point admittance, $\alpha_{11}$ and $\alpha_{nn}$, and short circuit transfer admittance, $\alpha_{1n}$, have the general form:

$$\alpha_{11} = \frac{g_{1(\lambda)}}{h_{(\lambda)}}$$
$$\alpha_{nn} = \frac{g_{n(\lambda)}}{h_{(\lambda)}}$$
$$\alpha_{1n} = \frac{g_{1n(\lambda)}}{h_{(\lambda)}}$$

said short-circuit admittances being elements of a positive real matrix; said network comprising a dissipative two-terminal network, containing both resistance and reactance elements and being bridged across one pair of the main terminals; further comprising $n$ groups of component networks, where $n$ is any positive integer greater than one, the first group being a realization of poles on the boundary present in the short-circuit admittances of the total four-terminal network and subsequently removed from said admittances by the aid of partial fraction expansions, the second group of component networks being a realization of component families of terms in partial fraction expansions of the elements of a matrix which is the inverse of the matrix whose elements are the remainder of the short-circuit admittances of the total four-terminal network, after removal of said inherent poles on the boundary and extraction of the driving-point admittance characterizing said dissipative two-terminal network, said extraction being made in such a manner that the new set of short-circuit admittances have real parts whose determinant is equal to zero for all real values of $\omega$, where $\omega$ is equal to $2\pi$ times frequency: the last member of said second group being subdivided into further component networks forming a third group, said third group being a realization of component families of terms in partial fraction expansions of the elements of a matrix which is the inverse of the matrix whose elements are the remainder of the functions, expanded to obtain the component networks of said second group, after removal of produced poles on the boundary, the $n$th group of component networks being a realization of component families of terms in partial fraction expansions of the elements of a matrix which is the inverse of the matrix whose elements are the remainder of the functions expanded to obtain the component networks of the $(n-1)$th group, after removal of produced poles on the boundary, the last component network of said $n$th group being a realization of the component family of real constants in said last mentioned partial fraction expansions and being purely resistive.

36. A finite, dissipative four-terminal electrical network, containing lumped network elements, whose open-circuit driving-point impedances, $\beta_{11}$ and $\beta_{nn}$, and open-circuit transfer impedance, $\beta_{1n}$, have the general form:

$$\beta_{11} = \frac{g_{1(\lambda)}}{h_{(\lambda)}}$$
$$\beta_{nn} = \frac{g_{n(\lambda)}}{h_{(\lambda)}}$$
$$\beta_{1n} = \frac{g_{1n(\lambda)}}{h_{(\lambda)}}$$

said open-circuit impedances being elements of a positive real matrix; said network comprising a dissipative two-terminal network, containing both resistance and reactance elements and being connected in series with one of the main terminating leads; further comprising $n$ groups of component networks, where $n$ is any positive integer greater than one, the first group being a realization of poles on the boundary present in the open-circuit impedances of the total four-terminal network and subsequently removed from said impedances by the aid of partial fraction expansions, the second group of component networks being a realization of component families of terms in partial fraction expansions of the elements of a matrix which is the inverse of the matrix whose elements are the remainder of the open-circuit impedances of the total four-terminal network after removal of said inherent poles on the boundary and extraction of the driving-point impedance characterizing said dissipative two-terminal network, said extraction being made in such a manner that the new set of open-circuit impedances have real parts whose determinant is equal to zero for all real values of $\omega$, where $\omega$ is equal to $2\pi$ times frequency, the last member of said second group being subdivided into further component networks forming a third group, said third group being a realization of component families of terms in partial fraction expansions of the elements of a matrix which is the inverse of the matrix whose elements are the remainder of the functions, expanded to obtain the component networks of said second group, after removal of produced poles on the boundary, the $n$th group of component networks being a realization of component families of terms in partial fraction expansions of the elements of a matrix which is the inverse of the matrix whose elements are the remainder of the functions expanded to obtain the component networks of the $(n-1)$th group, after removal of produced poles on the boundary, the last component network of said $n$th group being a realization of the component family of real constants in said last mentioned partial fraction expansions and being purely resistive.

37. A finite, dissipative four-terminal electrical network, of lumped network elements, containing a plurality of dissipative groups, each group containing a plurality of component networks of which only the last one is dissipative; said dissipative component network being a four-terminal network having a transformer installed at one end thereof; the successive groups being interconnected to form a unit in such a manner that the $n$th group forms the dissipative component network of the $(n-1)$th group, the $(n-1)$th group forms the dissipative component network of the $(n-2)$th group, and so on; the successive groups having alternately their component networks connected together in parallel—in series—in parallel—in series—etc., and vice versa; the dissipative component network of the last group being purely resistive, the resistance being embodied in one single element, while all the other not subdivided component networks are purely reactive, each having one single reactance element.

38. A finite, dissipative four-terminal electrical network, of lumped network elements, containing a plurality of dissipative groups, each group containing a plurality of component networks of which only the last one is dissipative; said dissipative component network being a four-terminal network having a transformer installed at one end thereof; the successive groups being interconnected to form a unit in such a manner that the $n$th group forms the dissipative component network of the $(n-1)$th group, the $(n-1)$th group forms the dissipative component network of the $(n-2)$th group, and so on; the successive groups having alternately their component networks connected together in parallel—in series—in parallel—in series—etc., and vice versa; the dissipative component network of the last group being purely resistive, the resistance being embodied in one single element, while all the other not subdivided component networks are purely reactive, each having one single reactance element; a dissipative two-terminal network, containing both resistance and reactance elements, being bridged across one pair of the main terminals at one end of the total four-terminal network specified above when the component networks of the first group of that network are connected in series with each other, while, alternatively, a dissipative two-terminal network, of aforesaid character, is connected in series with one of the main terminating leads of the total four-terminal network specified above when the component networks of the first group of that network are connected in parallel with each other.

39. A finite, dissipative four-terminal electrical network according to claim 37, characterized by the fact that a purely reactive network is connected in parallel with the total four-terminal network specified in said claim when the first group of that network comprises a plurality of component networks connected in series with each other, while alternatively, a purely reactive network is connected in series with the total four-terminal network specified in said claim when the first group of that network comprises a plurality of component networks connected in parallel with each other.

40. A finite, dissipative four-terminal electrical network according to claim 38, characterized by the fact that a purely reactive network is connected in parallel with the total four-terminal network specified in said claim when the first group of that network comprises a plurality of component networks connected in series with each other, while alternatively, a purely reactive network is connected in series with the total four-terminal network specified in said claim when the first group of that network comprises a plurality of component networks connected in parallel with each other.

41. A finite, dissipative four-terminal electrical network, of lumped network elements, including a plurality of groups of component networks, the component networks of each alternate group being connected in series and in parallel, respectively; the last component network in each group, except in the last one, being subdivided into a plurality of component networks, forming the next group; all not subdivided component networks, except the last one in said last group, being purely reactive and each containing one single element; said last component network in the last group containing one single resistance element; at least one of said component networks in each group being a four-terminal network.

42. A finite, dissipative four-terminal electrical network, of lumped network elements, including a dissipative two-terminal network, containing both resistance and reactance elements, said two-terminal network being bridged across one pair of the main terminals; further including $n$ groups of component networks, $n$ being any positive integer greater than one, the component networks of each alternate group being connected in series and in parallel, respectively; the successive groups being connected together in such a manner that each group forms the last component network of the preceding group; at least two of said component networks being four-terminal networks; the dissipative parts of the total four-terminal network being limited to the last component network, being a four-terminal network, in the last group and to said dissipative two-terminal network.

43. A finite, dissipative four-terminal electrical network, of lumped network elements, including a dissipative two-terminal network, containing both resistance and reactance elements, said two-terminal network being connected in series with one of the main terminating leads; further including $n$ groups of component networks, $n$ being any positive integer greater than one, the component networks of each alternate group being connected in series and in parallel, respectively; the successive groups being connected together in such a manner that each group forms the last component network of the preceding group; at least two of said component networks being four-terminal networks; the dissipative parts of the total four-terminal network being limited to the last component network, being a four-terminal network, in the last group and to said dissipative two-terminal network.

44. A finite, dissipative four-terminal electrical network, containing lumped network elements, whose two driving-point functions and transfer function are functions of frequency and elements of a non-singular positive real matrix; said network comprising $n$ groups of component networks, where $n$ is any positive integer greater than one; the driving-point functions, $f_{11(\lambda)}$ and $f_{nn(\lambda)}$, and transfer function, $f_{1n(\lambda)}$, of each one of said $n$ groups having the general form:

$$\left.\begin{array}{l} f_{11(\lambda)} = \dfrac{g_{1(\lambda)}}{h_{(\lambda)}} \\[4pt] f_{nn(\lambda)} = \dfrac{g_{n(\lambda)}}{h_{(\lambda)}} \\[4pt] f_{1n(\lambda)} = \dfrac{g_{1n(\lambda)}}{h_{(\lambda)}} \end{array}\right\}$$

where the $f_{(\lambda)}$:s have such real parts that, when substituting $j\omega$ for $\lambda$, the real part of $f_{11(j\omega)}$ times the real part of $f_{nn(j\omega)}$ minus the square of the real part of $f_{1n(j\omega)}$ is equal to zero for all real values of $\omega$, $j$ being equal to $\sqrt{-1}$ and $\omega$ being equal to $2\pi$ times frequency, the $g_{(\lambda)}$:s and $h_{(\lambda)}$ being integral polynomials in $\lambda$, and $\lambda$ being a function of frequency; the inverse matrix to the one whose elements are said $f_{(\lambda)}$:s also being a positive real matrix having elements which also are driving-point functions, $q_{11(\lambda)}$ and $q_{nn(\lambda)}$, and transfer function, $q_{1n(\lambda)}$, of the corresponding one of said $n$ groups of component networks and related to the first set of said functions, characterizing that group, according to the general formulas:

$$\left.\begin{array}{l} q_{11(\lambda)} = \dfrac{f_{nn(\lambda)}}{f_{11(\lambda)}f_{nn(\lambda)} - f_{1n(\lambda)}^2} = \dfrac{g_{n(\lambda)} h_{(\lambda)}}{g_{1(\lambda)}g_{n(\lambda)} - g_{1n(\lambda)}^2} \\[6pt] q_{nn(\lambda)} = \dfrac{f_{11(\lambda)}}{f_{11(\lambda)}f_{nn(\lambda)} - f_{1n(\lambda)}^2} = \dfrac{g_{1(\lambda)} h_{(\lambda)}}{g_{1(\lambda)}g_{n(\lambda)} - g_{1n(\lambda)}^2} \\[6pt] q_{1n(\lambda)} = \dfrac{f_{1n(\lambda)}}{f_{11(\lambda)}f_{nn(\lambda)} - f_{1n(\lambda)}^2} = \dfrac{g_{1n(\lambda)} h_{(\lambda)}}{g_{1(\lambda)}g_{n(\lambda)} - g_{1n(\lambda)}^2} \end{array}\right\}$$

the driving-point functions and the transfer function of each of the successive component networks being substantially equal to the respective terms of the corresponding component family in the partial fraction expansions:

$$\left.\begin{array}{l} q_{11(\lambda)} = \dfrac{k_1}{\lambda} + k_1'\lambda + \dfrac{g'_{1(\lambda)}}{h'_{(\lambda)}} \\[6pt] q_{nn(\lambda)} = \dfrac{k_n}{\lambda} + k_n'\lambda + \dfrac{g'_{n(\lambda)}}{h'_{(\lambda)}} \\[6pt] q_{1n(\lambda)} = \dfrac{k_{1n}}{\lambda} + k_{1n}'\lambda + \dfrac{g_{1n(\lambda)}'}{h'_{(\lambda)}} \end{array}\right\}$$

where the $k$:s and $k'$:s are residues of the $q_{(\lambda)}$:s at the extracted poles while the $g'_{(\lambda)}$:s and $h'_{(\lambda)}$ are integral polynomials in $_{(\lambda)}$; the last component network of each group being a dissipative four-terminal network which is composed of all the succeeding groups and is the network representation of the component family to the right of said partial fraction expansions of the driving-point functions and transfer function of that group; the component networks within a group being connected in parallel with each other when substantially being network representations of a sum of component families in partial fraction expansions of admittance functions, while in series with each other when substantially being network representations of a sum of component families in partial fraction expansions of impedance functions.

45. A finite, dissipative four-terminal electrical network, of lumped network elements, including a plurality of groups of component networks, at least one of said groups being dissipative and at most one being purely reactive, the component networks of each alternate group being connected in series and in parallel, respectively; only the last component network of each of said dissipative groups being dissipative; every alternate group being preceded by a resistance at one end thereof and each dissipative group having its dissipative component network subdivided into further component networks, forming the next group, until in the last group the dissipative component network is purely resistive; the purely reactive group, present, being connected in parallel with the rest of the total network when the component networks of the first group of this latter network are connected in series with each other, while said purely reactive group, present, is connected in series with the rest of the total network, when the component networks of the first group of said latter network are connected in parallel with each other; at least one component network of each dissipative group being a four-terminal network.

46. A finite, dissipative four-terminal electrical network, of lumped network elements, including a plurality of groups of component networks, at least one of said groups being dissipative and at most one being purely reactive, the component networks of each alternate group being connected in series and parallel, respectively; each of said dissipative groups of series connected component networks having a resistance bridged across one pair of its main terminals; further, each of said dissipative groups having only one dissipative component network which, when not purely resistive, is subdivided into new component networks, forming the next group, until in the last group the dissipative component network is purely resistive; the purely reactive group, present, being connected in parallel with the rest of the total network; at least one component network of each dissipative group being a four-terminal network.

47. A finite, dissipative four-terminal electrical network, of lumped network elements, including a plurality of groups of component networks, at least one of said groups being dissipative and at most one being purely reactive, the component networks of each alternate group being connected in series and in parallel, respectively; each of said dissipative groups of parallel connected component networks having a resistance in series with one of its main terminating leads, further, each of said dissipative groups having only one dissipative component network which, when not purely resistive, is subdivided into new component networks, forming the next group, until in the last group the dissipative component network is purely resistive; the purely reactive group, present, being connected in series with the rest of the total network; at least one component network of each dissipative group being a four-terminal network.

48. A finite, dissipative four-terminal electrical network, of only two kinds of lumped network elements, including a plurality of dissipative groups of component networks, the component networks of each alternate group being connected in series and in parallel, respectively; the first component network of each alternate dissipative group being purely non-reactive and purely reactive, respectively; the last component network in each dissipative group being subdivided into new component networks, forming the next group, until in the last group the last component network is purely resistive, at least one component network of each dissipative group being a four-terminal network.

49. A method of synthesizing any finite, dissipative four-terminal electrical network, of lumped network elements, whose two driving-point functions and transfer function are prescribed functions of frequency and elements of a non-singular positive real matrix; said method characterized by removing all poles on the boundary, present, inherent in said prescribed functions; realizing into purely reactive component structure(s) the component family (families) of said removed poles; when the determinant of the real parts of said prescribed functions is different from zero for any or all real values of $\omega$, where $\omega$ is equal to $2\pi$ times frequency, splitting up the matrix, whose elements are the general circuit parameters obtained from the elements (having inherent poles on the boundary, present, removed) of said non-singular positive real matrix, into a product of two matrices, the reduced matrix and the extracted matrix, respectively, (corresponding to a sum of two positive real matrices); said matrices having the property, respectively, that in the extracted matrix only one element is a function of $\lambda$, where $\lambda$ is a function of frequency, said element being a positive real function with its real part so adjusted that the determinant of the real parts of the elements of the positive real matrix translated from the reduced matrix is necessarily equal to zero, for all real values of $\omega$; realizing the extracted matrix into a dissipative two-terminal network, the extracted network, containing both resistance and reactance elements; realizing the reduced matrix into a dissipative four-terminal network, the reduced network, by forming, by switching, the inverse matrix of the positive real matrix translated from said reduced matrix; expanding the elements of this inverse matrix into partial fractions forming component families of terms realizable into a first group of corresponding component networks; realizing into purely reactive component structures each of those of said component families whose terms correspond to poles on the boundary; continuing said switching and expansion procedure with the component family whose terms do not correspond to poles on the boundary and whose network representation forms the last component network of a first group of component networks; realizing into purely reactive component structures those of the resulting component families whose terms correspond to poles on the boundary; continuing said switching and expansion procedure with the component family whose terms do not correspond to poles on the boundary and whose network representation forms the last component network of a second group of component networks, and so on until the functions are exhausted of all their zeros and poles and a single component family of constant terms remains; realizing said component family of constant terms into a non-reactive component structure; connecting the component structures of each separate group of the reduced network in series with each other when obtained from partial fraction expansions of a family of impedance functions, while in parallel with each other when obtained from partial fraction expansions of a family of admittance functions; connecting the extracted network to the reduced network in accordance with the character of the function whose network representation it is, said connection being made at the end of the reduced network corresponding to the driving-point function which was split up; connecting the component structure(s) obtained from poles on the boundary, present, inherent in the prescribed functions, to each other and to the rest of the total network representation of the prescribed matrix in accordance with the character of the respective functions whose network representation said structure(s) forms (form).

50. A method of synthesizing any finite, dissipative electrical network, of lumped network elements, whose two short-circuit driving-point admittances and short-circuit transfer admittance are prescribed functions of frequency and elements of a non-singular positive real matrix, said method characterized by removing all poles on the boundary, present, inherent in the prescribed admittances; realizing into purely reactive component structure(s) the component family (families) of said removed poles; when the determinant of the real parts of said prescribed admittances is different from zero for any or all real values of $\omega$, where $\omega$ is equal to $2\pi$ times frequency, splitting up the matrix, whose elements are the general circuit parameters obtained from the elements (having inherent poles on the boundary, present, removed) of said non-singular positive real matrix, into a product of two matrices, the reduced matrix and the extracted matrix, respectively, (corresponding to a sum of two positive real matrices); said matrices having the property, respectively, that in the extracted matrix only one element is a function of $\lambda$, where $\lambda$ is a function of frequency, said element being a positive real admittance function with its real part so adjusted that the determinant of the real parts of the elements of the positive real admittance matrix, translated from the reduced matrix, is necessarily equal to zero for all real values of $\omega$; realizing the extracted matrix into a dissipative two-terminal network, the extracted network, containing both resistance and reactance elements; realizing the reduced matrix into a dissipative four-terminal network, the reduced network, also this containing both resistance and reactance elements, by forming, by switching, the inverse matrix of the positive real admittance matrix translated from said reduced matrix; expanding the elements of this inverse matrix into partial fractions forming component families of terms realizable into a first group of corresponding component networks; realizing into purely reactive component structures each of those of said component families whose terms correspond to poles on the boundary; continuing said switching and expansion procedure with the component family whose terms do not correspond to poles on the boundary and whose network representation forms the last component network of a first group of component networks; realizing into purely reactive component structures those of the resulting component families whose terms correspond to poles on the boundary; continuing said switching and expansion procedure with the component family whose terms do not correspond to poles on the boundary and whose network representation forms the last component network of a second group of component networks, and so on until the functions are exhausted of all their zeros and poles and a single component family of constant terms remains; realizing said component family of constant terms into a purely resistive component network; connecting the component structures of the first group, of the reduced network, in series with each other, those of the second group in parallel with each other, those of the third group in series with each other, those of the fourth group in parallel with each other, etc.; connecting the extracted network across the main terminals of the reduced network and at the end of this latter network corresponding to the driving-point admittance function which was split up; connecting the component structure(s) obtained from poles on the boundary, present, inherent in the prescribed admittance functions, in parallel with each other and with the rest of the total network representation of the prescribed matrix.

51. A method of synthesizing any finite, dissipative electrical network, of the lumped network elements, whose two open-circuit driving-point impedances and open-circuit transfer impedance are prescribed functions of frequency and elements of a non-singular positive real matrix; said method characterized by removing all poles on the boundary, present, inherent in the prescribed impedances; realizing into purely reactive component structure(s) the component family (families) of said removed poles; when the determinant of the real parts of said prescribed impedances is different from zero for any or all real values of $\omega$, where $\omega$ is equal to $2\pi$ times frequency, splitting up the matrix, whose elements are the general circuit parameters obtained from the elements (having inherent poles on the boundary, present, removed) of said non-singular positive real matrix, into a product of two matrices, the reduced matrix and the extracted matrix, respectively, (corresponding to a sum of two positive real matrices); said matrices having the property, respectively, that in the extracted matrix only, one element is a function of $\lambda$, where $\lambda$ is a function of frequency, said element being a positive real impedance function with its real part so adjusted that the determinant of the real parts of the elements of the positive real impedance matrix, translated from the reduced matrix, is necessarily equal to zero for all real values of $\omega$; realizing the extracted matrix into a dissipative two-terminal network, the extracted network, containing both resistance and reactance elements; realizing the reduced matrix into a dissipative four-terminal network, the reduced network, also this containing both resistance and reactance elements, by forming, by switching, the inverse matrix of the positive real impedance matrix translated from said reduced matrix; expanding the elements of this inverse matrix into partial fractions forming component families of terms realizable into a first group of corresponding component networks; realizing into purely reactive component structures each of those of said component families whose terms correspond to poles on the boundary; continuing said switching and expansion procedure with the component family whose terms do not correspond to poles on the boundary and whose network representation forms the last component network of a first group of component networks; realizing into purely reactive component structures those of the resulting component families whose terms correspond to poles on the boundary; continuing said switching and expansion procedure with the component family whose terms do not correspond to poles on the boundary and whose network representation forms the last component network of a second group of component networks, and so on until the functions are exhausted of all their zeros and poles and a single component family of constant terms remains; realizing said component family of constant terms into a purely resistive component network; connecting the component structures of the first group, of the reduced network, in parallel with each other, those of the second group in series with each other, those of the third group in parallel with each other, those of the fourth group in series with each other, etc.; connecting the extracted network in series with one of the main terminating leads of the reduced network and at the end of this latter network corresponding to the driving-point impedance function which was split up; connecting the component structure(s) obtained from poles on the boundary, present, inherent in the prescribed impedance functions, in series with each other and with the rest of the total network representation of the prescribed matrix.

CHARLES M:SON GEWERTZ.